US012709064B2

(12) United States Patent
Yang et al.

(10) Patent No.: US 12,709,064 B2
(45) Date of Patent: Aug. 18, 2026

(54) METHOD FOR GENERATING 3D PRINTING DATA, PATH PLANNING METHOD, SYSTEM AND STORAGE MEDIUM

(71) Applicant: JF POLYMERS (SUZHOU) CO., LTD., Suzhou (CN)

(72) Inventors: Zhenan Yang, Suzhou (CN); Yuli Huang, Suzhou (CN); Mingbo Jiang, Suzhou (CN); Xiaofan Luo, Suzhou (CN)

(73) Assignee: JF POLYMERS(SUZHOU) CO., LTD, Suzhou (CN)

( * ) Notice: Subject to any disclaimer, the term of this patent is extended or adjusted under 35 U.S.C. 154(b) by 160 days.

(21) Appl. No.: 18/009,325

(22) PCT Filed: Dec. 1, 2020

(86) PCT No.: PCT/CN2020/133031
§ 371 (c)(1),
(2) Date: Dec. 8, 2022

(87) PCT Pub. No.: WO2021/248851
PCT Pub. Date: Dec. 16, 2021

(65) Prior Publication Data

US 2023/0356467 A1 Nov. 9, 2023

(30) Foreign Application Priority Data

Jun. 10, 2020 (CN) ........................ 202010524406.5

(51) Int. Cl.
*B29C 64/386* (2017.01)
*B29C 64/118* (2017.01)
(Continued)

(52) U.S. Cl.
CPC .......... *B29C 64/386* (2017.08); *B29C 64/118* (2017.08); *B29C 64/232* (2017.08);
(Continued)

(58) Field of Classification Search
CPC ....... B29C 64/386; B33Y 50/00; H04N 1/387
See application file for complete search history.

(56) References Cited

U.S. PATENT DOCUMENTS 6,998,017 B2 * 2/2006 Lindsay ................ D21F 11/006
162/111
11,084,223 B2 * 8/2021 Lewicki ............... B29C 64/393
(Continued)

FOREIGN PATENT DOCUMENTS

CN 106273446 A 1/2017
CN 208343459 U 1/2019
(Continued)

OTHER PUBLICATIONS

Gibson et al., Additive Manufacturing Technologies, excerpt of section 4.4, Second Edition, published by Springer, 2015 (Year: 2015).*

(Continued)

*Primary Examiner* — Xiao S Zhao
*Assistant Examiner* — Nicholas J Chidiac
(74) *Attorney, Agent, or Firm* — IPRTOP LLC

(57) ABSTRACT

A method for generating 3D printing data, a method for planning a path, a system and a storage medium are provided; the method for generating 3D printing data comprises: generating at least one slice pattern based on a projected contour of a model of a to-be-printed object, wherein each slice pattern comprises one or more texture lines, and the one or more texture lines comprise non-closed texture lines whose endpoints are located on the projected contour; and generating 3D printing data based on spatial positions of printing lines of cross-sectional patterns, with the cross-sectional patterns determined based on the at least one slice pattern. wherein the printing lines comprise texture lines. The present disclosure adopts 3D printing to realize structural designs that cannot be achieved using conven-
(Continued)

tional fabrics, thereby increasing design freedom of fabrics in terms of both appearance and functionality.

12 Claims, 15 Drawing Sheets

(51) Int. Cl.

| | |
|---|---|
| ***B29C 64/232*** | (2017.01) |
| ***B29C 64/236*** | (2017.01) |
| ***B29C 64/245*** | (2017.01) |
| ***B33Y 10/00*** | (2015.01) |
| ***B33Y 30/00*** | (2015.01) |
| ***B33Y 50/00*** | (2015.01) |

(52) U.S. Cl.
CPC .......... *B29C 64/236* (2017.08); *B29C 64/245* (2017.08); *B33Y 10/00* (2014.12); *B33Y 30/00* (2014.12); *B33Y 50/00* (2014.12)

(56) References Cited

U.S. PATENT DOCUMENTS

2004/0020614 A1* 2/2004 Lindsay ................. D21H 27/02 162/205
2020/0055252 A1* 2/2020 Lewicki .................. G06F 30/20

FOREIGN PATENT DOCUMENTS

| | | | |
|---|---|---|---|
| CN | 109624311 | A | 4/2019 |
| CN | 109664497 | A | 4/2019 |
| CN | 109664498 | A | 4/2019 |
| CN | 109664499 | A | 4/2019 |
| CN | 109968658 | A | 7/2019 |
| CN | 110789118 | A | 2/2020 |
| CN | 111844757 | A | 10/2020 |
| JP | 2001277369 | A | 10/2001 |
| WO | 2020028431 | A1 | 2/2020 |

OTHER PUBLICATIONS

Nervous System: Kinematics Dress Design and 3D-Printing Process, Cooper Hewitt, Youtube, May 19, 2017, available @ <https://www.youtube.com/watch?v=6EK9MBJiFXU>. (Year: 2017).*

Nervous System Creates Kinematics Dress 3D Printed by Shapeways & Acquired by MoMA, Shapeways Blog, available @ <https://www.shapeways.com/blog/nervous-system-creates-kinematics-dress-3d-printed-by-shapeways-acquired-by-moma>, Dec. 9, 2014 (Year: 2014).*

* cited by examiner

S210 generate a slice pattern based on a predetermined projected contour

S220 repeat the above step for each printing layer of the to-be-printed object at a spatial location of the respective printing layer

METHOD FOR GENERATING 3D PRINTING DATA, PATH PLANNING METHOD, SYSTEM AND STORAGE MEDIUM

CROSS REFERENCE TO RELATED PATENT APPLICATION

The present application is the US national stage of PCT/CN2020/133031 filed on 2020 Dec. 1, which claims the priority of the Chinese patent application No. 202010524406.5 filed on 2020 Jun. 10, which application is incorporated herein by reference.

FIELD OF TECHNOLOGY

The present disclosure relates to 3D printing, in particular to a method for generating 3D printing data, a path planning method, a system and a storage medium.

BACKGROUND

Traditionally, fibers are prepared by a certain weaving process. Restricted by the weaving process, designs of traditional fabrics are not entirely free in terms of appearance and functionality.

In a certain implementation, 3D printing technology can be used to print patterns on existing fabrics to meet some personalized needs; but due to limitations imposed by design tools, printing methods and other factors, the fabrics themselves still cannot be 3D printed, and as a result, not all personalized needs have been met.

SUMMARY

In view of the above-mentioned shortcomings of the related technology, the present disclosure provides a method for generating 3D printing data, a path planning method, a system, and a storage medium to overcome the technical problem of the above-mentioned related technology that 3D printing technology is inapplicable to fabric printing.

To achieve these and other related purposes, a first aspect of the present disclosure provides a method for generating 3D printing data, comprising the steps of: generating at least one slice pattern based on a projected contour of a model of a to-be-printed object, wherein each slice pattern comprises one or more texture lines, and the one or more texture lines comprise non-closed texture lines whose endpoints are located on the projected contour; and generating the 3D printing data based on spatial positions of printing lines of cross-sectional patterns, with the cross-sectional patterns determined based on the at least one slice pattern; wherein for each cross-sectional pattern, its printing lines comprise the one or more texture lines of the corresponding slice pattern.

A second aspect of the present disclosure provides a system for generating 3D printing data, comprising: a generation module for generating at least one slice pattern based on a projected contour of a model of a to-be-printed object, wherein each slice pattern comprises one or more texture lines, and the one or more texture lines comprise non-closed texture lines whose endpoints are located on the projected contour; and a data-converting module, used for generating the 3D printing data based on spatial positions of printing lines of cross-sectional patterns, with the cross-sectional patterns determined based on the at least one slice pattern; wherein for each cross-sectional pattern, its printing lines comprise the one or more texture lines of the corresponding slice pattern.

A third aspect of the present disclosure provides a method for generating a 3D printing model, comprising: generating a slice pattern based on a projected contour, wherein the slice pattern comprises one or more texture lines, and the one or more texture lines comprise non-closed texture lines whose endpoints are located on the projected contour; and repeating the above step for each printing layer of the to-be-printed object at a spatial location of the respective printing layer, wherein the to-be-printed object comprises a predetermined number of printing layers.

A fourth aspect of the present disclosure provides a system for generating a 3D printing model, comprising a generation module, wherein the generation module is used for: generating a slice pattern based on a projected contour of a model of a to-be-printed object; wherein the slice pattern comprises one or more texture lines, and the one or more texture lines comprise non-closed texture lines whose endpoints are located on the projected contour; and repeating the above step for each printing layer of the to-be-printed object at a spatial location of the respective printing layer, wherein the to-be-printed object comprises a predetermined number of printing layers.

A fifth aspect of the present disclosure provides a method for planning a 3D printing path, comprising: obtaining at least one slice pattern of a model of a to-be-printed object, wherein each of the at least one slice pattern comprises at least one texture line; connecting non-closed texture lines of the same slice pattern by auxiliary path lines along and/or outside a projected contour of the model of the to-be-printed object, to form a printing line, wherein the printing line describes the 3D printing path.

A sixth aspect of the present disclosure provides a system for planning a 3D printing path, comprising: an interface module, for obtaining at least one slice pattern of a model of a to-be-printed object, wherein each of the at least one slice pattern comprises at least one texture line; a processing module, for connecting non-closed texture lines in a first slice pattern of the at least one slice pattern by auxiliary path lines along and/or outside a projected contour of the model of the to-be-printed object, to form a printing line, wherein the printing line describes the 3D printing path.

A seventh aspect of the present disclosure provides a 3D printing method comprising: reading 3D printing data, the 3D printing data comprising data instructions corresponding to at least one cross-sectional pattern, wherein the 3D printing data is obtained according to the method for generating 3D printing data as described in the first aspect of the present disclosure; and controlling an energy radiating device of a 3D printing device to radiate energy onto a printing surface along a printing path based on the cross-sectional pattern to obtain a printed cured layer, or, controlling a nozzle device of the 3D printing device to extrude printing materials onto a printing surface along a printing path based on the cross-sectional pattern to obtain a printed cured layer; and repeating the previous steps for different cross-sectional patterns to accumulate printed cured layers to obtain a printed object.

An eighth aspect of the present disclosure provides a 3D printing device comprising: a printing platform, wherein a printed object can be adhered to the printing platform; a driving device, comprising a Z-axis driving mechanism capable of moving up and down relative to the printing platform, and an X-axis driving mechanism and a Y-axis driving mechanism provided on the Z-axis driving mechanism; a nozzle device, provided on the X-axis driving mechanism or the Y-axis driving mechanism, for melting introduced hot-melt materials and extruding them onto the printing platform along the printing path; and a control device, electrically connected to the driving device and nozzle device, for controlling the driving device and nozzle device to perform printing of each layer according to the printing path in order to obtain the printed object on the printing platform, according to 3D printing data read by the control device; wherein the 3D printing data is obtained according to the method for generating 3D printing data as described in the first aspect of the present disclosure.

A ninth aspect of the present disclosure provides a 3D printing device comprising: a container for holding to-be-cured materials; an energy radiating device, provided at a predetermined position on a bottom or top side of the container, configured to radiate energy via a control program to a printing surface inside the container when a printing command is received, in order to mold the to-be-cured materials on the printing surface; a member platform, comprising a member plate, located in the container when the 3D printing device is in a printing state, wherein a cured layer obtained after energy radiation is adhered to the member platform in order to form a printed member from the cured layer; a Z-axis driving mechanism, connected to the member platform, for driving the member platform to move so that a gap between the member platform and the printing surface is filled with the to-be-cured materials; a control device, electrically connected to the energy radiating device and the Z-axis driving mechanism, for controlling the energy radiating device and Z-axis driving mechanism to perform printing of each layer according to a printing path to obtain a printed object on the member plate, based on 3D printing data read by the control device, wherein the 3D printing data is obtained according to the method for generating 3D printing data as described in the first aspect of the present disclosure.

A tenth aspect of the present disclosure provides a 3D printed fabric, wherein the 3D printed fabric is obtained based on a 3D printing method as provided in the seventh aspect of the present disclosure.

An eleventh aspect of the present disclosure provides a fabric structure obtained by 3D printing, comprising: at least one cross-sectional layer; wherein each cross-sectional layer comprises a plurality of first woven filaments that are filled and thread-like, and two endpoints of each first woven filament are located on a contour of the respective cross-sectional layer; wherein when the at least one cross-sectional layer comprises a plurality of cross-sectional layers, the plurality of cross-sectional layers is stacked together, and first woven filaments of at least two cross-sectional layers are crossed with each other.

A twelfth aspect of the present disclosure provides a non-transitory computer-readable storage medium, wherein at least one program is stored on the storage medium, and when the at least one program is called by a processor, the at least one program executes and realizes a method for generating 3D printing data as described in the first aspect of the present disclosure, or a method for generating a 3D printing model as described in the third aspect disclosed in the present disclosure, or a method for planning a 3D printing path as described in the fifth aspect of the present disclosure, or the 3D printing method as described in the seventh aspect of the present disclosure.

In summary, the present disclosure adopts 3D printing to realize structural designs that cannot be achieved using conventional fabrics, thereby increasing design freedom of fabrics in terms of both appearance and functionality. Moreover, the present disclosure improves the printing efficiency and printing quality by reasonably planning the printing path during printing. The products printed by the method herein can have density variations in different parts of their fabric structures, thereby meeting personalized needs.

A person skilled in the art can easily gain insight into other aspects and advantages of the present disclosure from the detailed description below. Only exemplary embodiments of the present disclosure are shown and described in the detailed description below. As will be recognized by those skilled in the art, the contents of the present disclosure enable those skilled in the art to make changes to the specific embodiments disclosed without departing from the spirit and scope of the invention covered by the present disclosure. Accordingly, the descriptions of the accompanying drawings and specification of the present disclosure are exemplary.

BRIEF DESCRIPTION OF THE DRAWINGS

The specific features related to the present disclosure are shown in the appended claims. The features and advantages of the present disclosure can be better understood by referring to the exemplary embodiments and drawings described in detail below. A brief description of the attached drawings is as follows:

DETAILED DESCRIPTION

Figure 1:
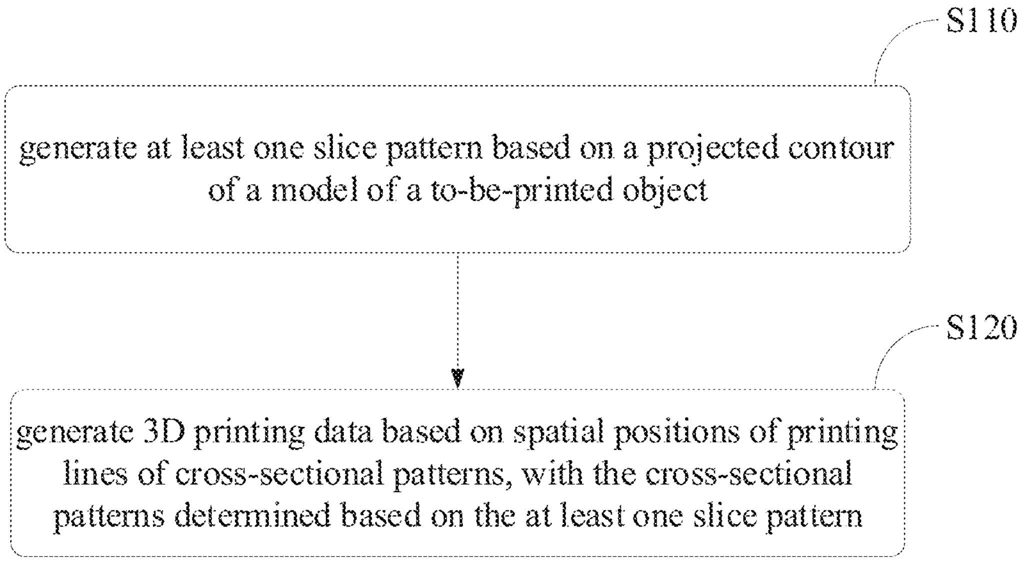
FIG. 1 shows a flowchart illustrating a method for generating 3D printing data according to one embodiment of the present disclosure.

The specific embodiments of the present disclosure are described below. Those familiar with this technology can easily understand other advantages and effects of the present disclosure from the contents disclosed in this specification.

In the following description, referring to the drawings, the drawings describe several embodiments of the present disclosure. It should be understood that other embodiments can also be used to implement the present disclosure, and changes in mechanical composition, structure, electricity and operation can be made without departing from the spirit and scope of the present disclosure. The following detailed description should not be considered as limited, and the scope of the embodiments of the present disclosure is limited only by the claims of the published patent. The terms used herein are only intended to describe specific embodiments and are not intended to limit the present disclosure.

In some embodiments, although the terms "first", "second", and the like are used herein to describe various elements or parameters, these elements or parameters should not be limited by these terms. These terms are only used to distinguish one element or parameter from another. For example, "first woven filaments" may also be referred to as "second woven filaments", and similarly, "second woven filaments" may also be referred to as "first woven filaments" without departing from the scope of various described embodiments. "first woven filaments" and "second woven filaments" are both describing woven filaments, but they are not the same woven filaments unless the context clearly indicates otherwise. Depending on the context, the word "if" used herein can be interpreted as "at . . . " or "when . . . ".

Furthermore, as used herein, the singular forms "one", "a/an" and "the" are intended to include the plural form, unless the context indicates otherwise. It should be further understood that the terms "include" and "comprise" indicate the existence of the described features, steps, operations, elements, components, items, categories, and/or groups, but do not exclude the existence, presence, or addition of one or more other features, steps, operations, elements, components, items, categories, and/or groups. The terms "or" and "and/or" as used herein are interpreted to be inclusive or to mean any one or any combination thereof. Therefore, "A, B or C" or "A, B and/or C" means "any of the following: A; B; C; A and B; A and C; B and C; A, B and C". Exceptions to this definition occur only when combinations of components, functions, steps, or operations are inherently mutually exclusive in some ways.

As mentioned in the Background section, traditional fabrics are made of fibers prepared by a certain weaving process. For example, fibers are spun into yarns and then woven by a loom to form the fabrics. The structure of the traditional fabrics has a uniform density, and their designs are limited by manufacturing processes in terms of appearance and structures.

In some traditional implementations, 3D printing technology can be used to print patterns on traditional fabrics, such as cloth, to achieve some personalized needs; but the printing is only on surfaces of the fabrics, and spatial structures of the fabrics do not have structural or density variations, making them unable to realize more diversified designs and functions.

In view of this, a method for generating 3D printing data is provided in the first aspect of the present disclosure. The method for generating 3D printing data may be performed by a system for generating 3D printing data. The system for generating 3D printing data may be implemented by software and/or hardware in a computer. Of course, it may also be implemented through a computer network system constructed by a plurality of computers. The user may interact with the system for generating 3D printing data directly or through a computer terminal communicatively coupled thereto (e.g., the computer terminal may be connected to the system for generating 3D printing data via the Internet).

The computer comprises a memory, one or more processors, an I/O interface, a network interface, an electronic display, and an input structure. The memory is used to store at least one program. The memory may include high-speed random-access memory, and may also include non-volatile memory, such as one or more of a disk storage device, flash memory, or other non-volatile solid state storage devices.

In some embodiments, the memory may also include memory remote from one or more processors, such as network-attached memory accessible via RF circuits or external ports and communication networks, wherein the communication networks comprise the Internet, one or more intranets, local area networks (LANs), wide area networks (WANs), storage area networks (SANs), and suitable combinations thereof. The computer may further include a memory controller that controls access to the memory by other components of the computer such as a central processing unit and peripheral interfaces. The memory may include high-speed random-access memory, and may also include non-volatile memory, such as one or more disk storage devices, flash memory, or other non-volatile solid state storage devices. The computer may further include a memory controller that controls access to the memory by other components of the computer such as a central processing unit and peripheral interfaces.

The one or more processors may be operably coupled to a network interface to couple the computer to the communication networks in a communicative manner. For example, the network interface may connect the computer to a local area network (e.g., LAN), and/or a wide area network (e.g., WAN). The one or more processors may be operably coupled to an I/O port and an input structure, wherein the I/O port may enable the computer to interact with various other electronic devices, and the input structure may enable a user to interact with the computer. Thus, the input structure may include one or more of buttons, keyboards, mice, touch pads, and the like. In addition, the electronic display may include a touch component that detects user input by the occurrence and/or location of a user touching a screen to facilitate the user's selection of an object, printing material, or other printer setting for printing the object. A display interface of the electronic display may include graphical elements such as windows, menus, buttons, dialog boxes, and the like configured to allow the user to specifically select or control at least one aspect of the printing task, such as a model of the to-be-printed object, the printing material used to print the to-be-printed object, and/or the printer settings for the to-be-printed object.

In the embodiments provided below, a fabric structure will be used as an example, but it should be noted that the scope of present disclosure is not limited to the fabric structure, which can be replaced with any printable object that can be 3D printed, and any method that employs the methods of the present disclosure to generate 3D printed data falls within the scope of the present disclosure.

It should be understood that the execution of 3D printing is preceded by the execution of slicing, that is, a 3D model in a 3D file (such as STL files) is divided into multiple horizontal layers of slices, wherein the thickness of each layer of slice is a thickness at which the 3D printer can perform printing. The execution of 3D printing is also preceded by calculating a simulated printing path, and then generating G-codes (codes in a 3D printing language) based on which the 3D printer performs the 3D printing. There must be a high connectivity between adjacent layers of materials printed during 3D printing. As a result, in a fused-deposition-molding-based printing device for example, its printing nozzle must be continuously fed with materials, and the nozzle' moving path must be determined through simulation in advance. As mentioned above, slicing related data generates the G-code that allows the actual printing to be performed.

FIG. 1 shows a flowchart illustrating a method for generating 3D printing data according to an exemplary embodiment of the present disclosure. The method includes S110: generating at least one slice pattern based on a projected contour of a model of a to-be-printed object.

It should be understood that the model of the to-be-printed object is a three-dimensional model of the to-be-printed fabric, and the projected contour is a projection of the contour of the to-be-printed fabric; that is, the projected contour is the boundary represented by the projection of the contour of the model of the to-be-printed object, with the projection in a plane perpendicular to the Z-axis direction (i.e. the vertical direction). The contour of the to-be-printed fabric may be predetermined or may be drawn ad hoc according to design requirements of the to-be-printed object. For example, if one or more alternative contours of the to-be-printed fabric are pre-stored in a memory of a system for generating 3D printing data, a desired contour can be selected from the alternative contours of the to-be-printed fabric. Again, depending on the design requirements of the to-be-printed object, a contour may be drawn ad hoc to serve as the contour of the to-be-printed fabric.

The number of slice patterns included in the at least one slice pattern corresponds to the number of printing layers of the to-be-printed object. The to-be-printed object is conceptually sliced into different printing layers (corresponding to the slices of the model of the to-be-printed object), which are sequentially printed to obtain the object. It should be understood that a slice pattern in some embodiments denotes a pattern corresponding to each slice resulted from the slicing of the 3D model of the to-be-printed object; the slicing is generally performed in the Z-axis direction (i.e., the vertical direction) of the 3D model of the to-be-printed object, generating layers of patterns. In the present disclosure, since the 3D model of the to-be-printed fabric is formed by generating a corresponding pattern layer by layer, the at least one slice pattern is essentially equated with the layers of patterns generated during the generation of the 3D printing data. It should be noted that the at least one slice pattern does not necessarily correspond to the layers of patterns of the final 3D model of the to-be-printed fabric; in some embodiments, the at least one slice pattern includes only patterns generated during intermediate steps in the process of generating the layers of patterns of the final 3D model of the to-be-printed fabric, as will be described in detail later.

A projected contour of the model of the to-be-printed object is used as a boundary, and at least one slice pattern is generated within the boundary. Each of the at least one slice pattern comprises at least one texture line.

The texture line includes lines in the slice pattern, which can be straight lines or curved lines according to actual needs. The texture line may be predetermined or may be drawn ad hoc according to design requirements of the to-be-printed object. For example, if one or more alternative texture lines are pre-stored in the memory of the system for generating 3D printing data, a desired texture line can be selected from the alternative texture lines. As another example, depending on the design requirements of the to-be-printed object, various straight or curved lines may be drawn ad hoc to serve as the at least one texture line. It should be understood that any figure or shape can be made up of line segments, and each line segment has a starting point and an ending point, which are collectively referred to as endpoints in some embodiments. For the sake of simplicity, lines segments are referred to as lines hereinafter. When a line extends from the starting point and returns to the starting point, the line constitutes a closed line, as opposed to a non-closed line which extends from the starting point and does not return to that starting point, that is, at least one of the starting point and ending point of a non-closed line is exposed (meaning not covered by itself). In the present disclosure, the endpoints of each non-closed texture line are located on the projected contour.

In an exemplary embodiment, the system for generating 3D printing data uses the projected contour of a model of the to-be-printed object as a boundary, and generates the at least one slice pattern, comprising a first slice pattern and a second slice pattern, within the boundary. The first slice pattern comprises first textures lines, and the second slice pattern comprises second textures lines, and projections of the first texture lines onto a plane where the second slice pattern is located partially overlap the second texture lines. Herein, the first slice pattern and the second slice pattern refer to different slice patterns. Herein, when slice patterns partially overlap, one or more texture lines of one slice pattern intersect those of another slice pattern.

Here, the system for generating 3D printing data first determines the projected contour of the model of the to-be-printed object, then uses the projected contour of the model of the to-be-printed object as a boundary, and generates texture lines in each slice pattern within the boundary, with the endpoints of each non-closed texture line located on the boundary.

Figure 2A:
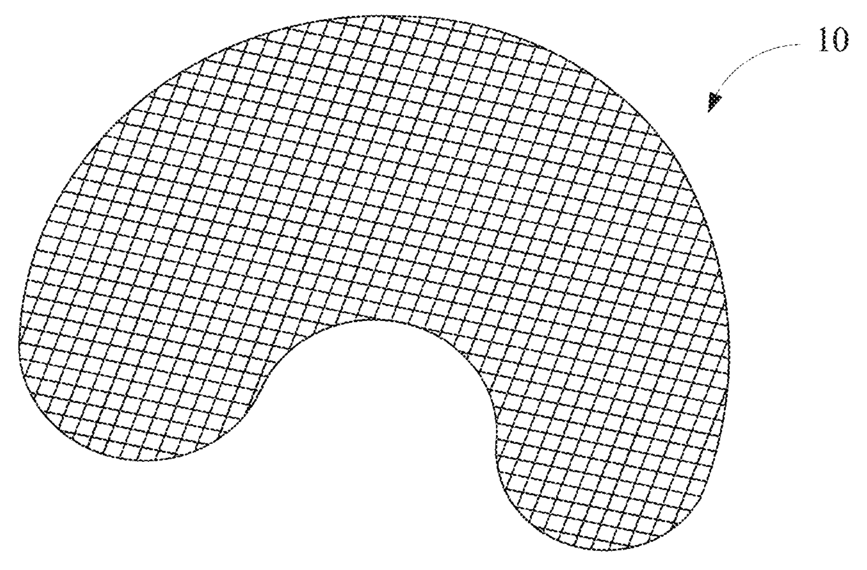
FIG. 2A shows a schematic structural diagram of a slice pattern according to one embodiment of the present disclosure.

FIG. 2A shows a schematic structural diagram of a slice pattern according to one embodiment of the present disclosure. As shown in FIG. 2A, in one embodiment, the number of the at least one slice pattern 10 is one, and in order to form an interlaced fabric structure after the printing based on 3D printing data obtained according to the present method, texture lines in the slice pattern 10 form an interlaced shape, and the endpoints of each non-closed texture line are located on the projected contour of the model of the to-be-printed object.

Figure 2B:
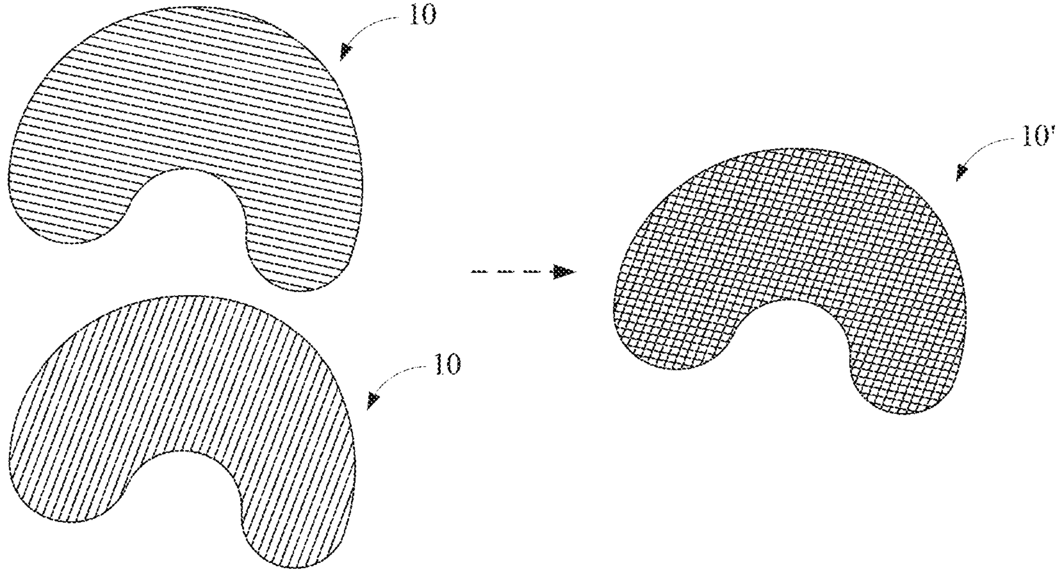
FIG. 2B shows a schematic structural diagram of a slice pattern according to one embodiment of the present disclosure.

FIG. 2B shows a schematic structural diagram of a slice pattern according to another embodiment of the present disclosure. As shown in FIG. 2B, in one embodiment, the number of the at least one slice pattern 10 is two; texture lines in the same slice pattern 10 do not overlap, and the endpoints of each non-closed texture line are located on the projected contour of the model of the to-be-printed object; but in order to form an interlaced fabric structure after the printing based on 3D printing data obtained according to the present method, texture lines in a slice pattern are spatially interlaced with texture lines in another slice pattern to form the interlaced structure. The at least one slice pattern includes a first slice pattern and a second slice pattern, the first slice pattern comprises first textures lines, and the second slice pattern comprises second textures lines, and projections 10' of the first texture lines onto a plane where the second slice pattern is located partially overlap the second texture lines. In some other embodiments, when the number of the at least one slice pattern 10 is two, texture lines in the same slice pattern 10 may also intersect with each other, which is also able to achieve the technical effect where the projections 10' of the first texture lines onto a plane where the second slice pattern is located partially overlap the second texture lines.

In an exemplary embodiment, the method for generating 3D printing data further includes selecting a texture plane, and generates the at least one slice pattern from the texture plane according to the projected contour, wherein the texture plane is a single-layer texture plane or a multi-layer texture plane.

The number of texture planes used in the printing corresponds to the number of the printing layers of the to-be-printed object, and the number of the printing layers is within a range including 1 to 20, depending on characteristics of the fabric structure. When the number of the printing layers is 1, that means a single-layer texture plane is selected. When the number of the printing layers is greater than 1, that means a multi-layer texture plane is selected, and the multi-layer texture plane includes a plurality of single-layer texture planes, and the number of the texture planes included in the multi-layer texture plane is the exact number of the printing layers.

The texture planes may be predetermined or may be drawn ad hoc according to design requirements of the to-be-printed object. For example, if one or more alternative texture planes are pre-stored in the memory of the system for generating 3D printing data, a desired texture plane can be selected from the alternative texture planes. As another example, depending on the design requirements of the to-be-printed object, various straight or curved lines may be drawn ad hoc to form the texture planes.

After selecting a single-layer texture plane or a multi-layer texture plane, the single-layer texture plane or multi-layer texture plane is cut according to the projected contour of the model of the to-be-printed object, resulting in a corresponding number of slice patterns that are portions of the single-layer texture plane or multi-layer texture plane.

Figure 3A:
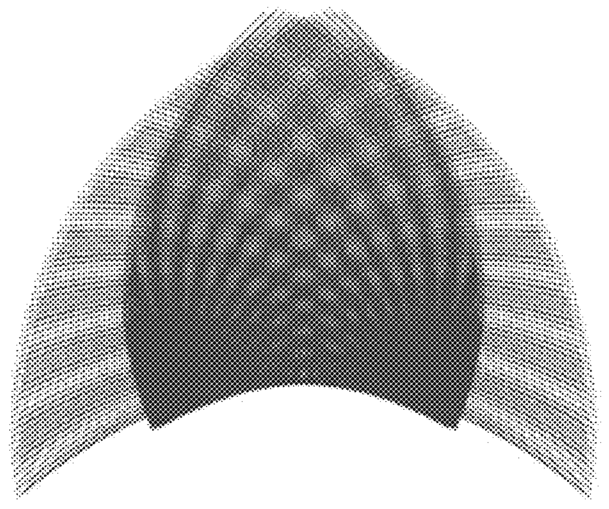
FIG. 3A shows a schematic structural diagram of a texture plane according to one embodiment of the present disclosure.

FIG. 3A shows a schematic structural diagram of a texture plane according to an exemplary embodiment of the present disclosure. As shown in FIG. 3A, the number of texture plane used is 1; that is, a single-layer texture plane is selected. In order to form an interlaced fabric structure after the printing based on the 3D printing data obtained according to the present method, texture lines in each texture plane forms an interlaced shape.

Figure 3B:
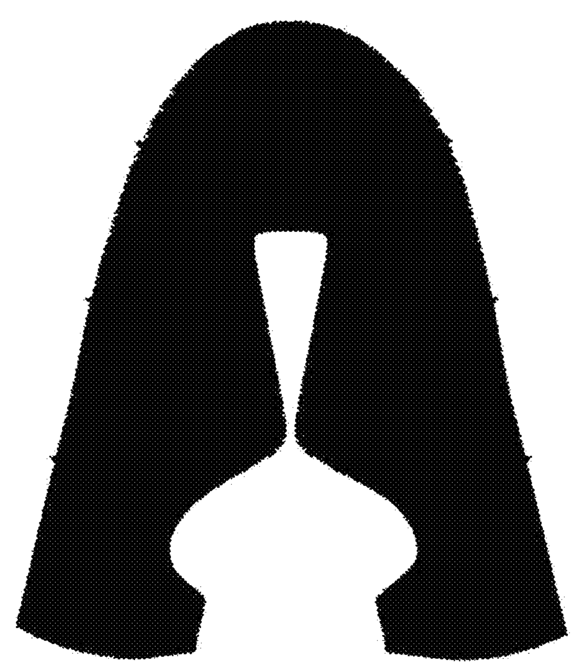
FIG. 3B shows a schematic structural diagram of a projection of a model of a to-be-printed object according to one embodiment of the present disclosure.
Figure 3C:
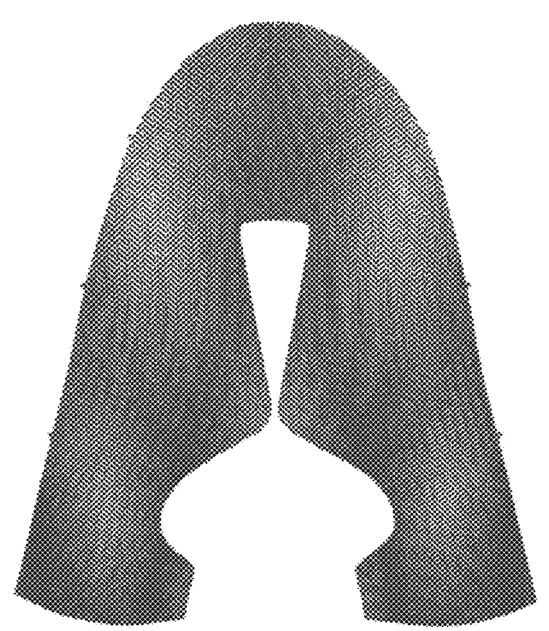
FIG. 3C shows a slice pattern obtained based on FIG. 3A and FIG. 3B.

Refer to FIG. 3B and FIG. 3C. FIG. 3B shows a schematic structural diagram of a projection of a model of a to-be-printed object according to one embodiment of the present disclosure; FIG. 3C shows a slice pattern obtained based on FIG. 3A and FIG. 3B. Here, the single-layer texture plane in FIG. 3A is cut according to the projected contour of the model of the to-be-printed object shown in FIG. 3B; that is, only portions of FIG. 3A that correspond to the black area in FIG. 3B are retained, resulting in the slice pattern as shown in FIG. 3C.

In another embodiment, the system for generating 3D printing data generates at least two texture patterns, and adjusts the horizontal positions of the at least two texture patterns so that their projections onto a same plane partially overlap, to obtain a single-layer texture plane. In this case, each texture pattern comprises a plurality of straight lines and/or at least one curved line, and the texture patterns may be predetermined or may be drawn ad hoc according to design requirements of the to-be-printed object. For example, if one or more alternative texture patterns are pre-stored in the memory of the system for generating 3D printing data, a desired texture line can be selected from the alternative texture patterns. As another example, depending on the design requirements of the to-be-printed object, various straight or curved lines may be drawn ad hoc to serve as the texture patterns. After at least two texture patterns have been generated, horizontal positions of the at least two texture patterns are adjusted so that the two texture patterns are interlaced in the same plane, to obtain a single-layer texture plane. The method of adjustment includes, but is not limited to, rotational or translational movement of the at least two texture patterns in the plane in which they are located. Each texture pattern may include a plurality of straight lines, or may include at least one curved line, or may include at least one straight line and at least one curved line.

The steps for obtaining a single-layer texture plane is detailed below with an example.

Figure 4:
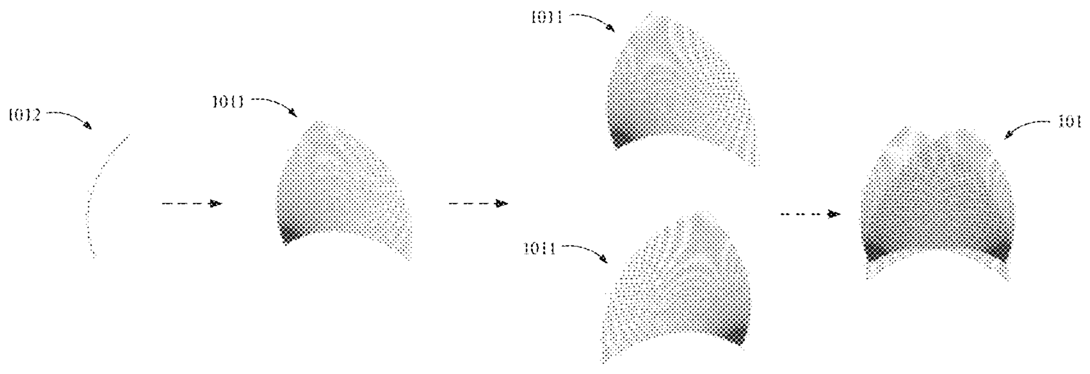
FIG. 4 is a schematic diagram showing a process of generating a single-layer texture plane according to one embodiment of the present disclosure.

FIG. 4 is a schematic diagram showing a process of generating a single-layer texture plane according to one embodiment of the present disclosure. As shown in FIG. 4, the system for generating 3D printing data first selects a texture line 1012 and generates a texture pattern 1011 based on the texture line 1012. After repeating the above step to obtain two texture patterns 1011, horizontal positions of the two texture patterns 1011 are adjusted so that the two texture patterns are interlaced to obtain a single-layer texture plane 101.

It should be understood that, although this example the generation of a single-layer texture plane by two groups of texture patterns 1011, in practice, the number of the texture patterns can also be configured according to the actual design needs as three groups, four groups, five groups, six groups, seven groups, eight groups, nine groups, ten groups, etc., and the horizontal positions of these texture patterns can be adjusted so that their projections onto a same plane partially overlap to form the fabric interlaced structure of the fabric. In addition, although a curved line is used as the texture line 1012 in this example, in practical application, the length, shape, and number of the curved line can be adjusted according to the design requirements, and in some implementations, the curved line can also be replaced with a straight line, and when the texture line is a straight line, the length, shape, and number of the texture line can also be adjusted according to the design requirements, which will not be repeated here.

In one embodiment, after obtaining a single-layer texture plane, if the number of printing layers is one, the single-layer texture plane is cut according to the projected contour of the model of the to-be-printed object to obtain a slice pattern.

In another embodiment, when the number of printing layers is greater than one, the system for generating 3D printing data generates at least two single-layer texture planes and adjusts the spatial positions of the at least two single-layer texture planes so that projections of the texture lines of the at least two single-layer texture planes onto the same plane partially overlap to obtain multiple-layer texture planes, each of texture patterns comprising a plurality of straight lines and/or at least one curved line.

Herein, the step of obtaining a single-layer texture plane may be repeated to generate a plurality of single-layer texture planes. In order to form an interlaced fabric structure after the printing based on the 3D printing data obtained according to the present method, texture lines in a single-layer texture plane are spatially interlaced with texture lines in another single-layer texture plane, but texture lines in the same single-layer texture plane do not intersect with each other, thereby forming an interlaced structure. Therefore, when the texture lines in the same single-layer texture plane do not intersect with each other, spatial positions of the plurality of single-layer texture planes may be adjusted by manners including, but not limited to, rotational or translational movement of each single-layer texture plane in the plane in which it is located, so that the projections of the plurality of single-layer texture planes onto a same plane partially overlap, thereby obtaining a multi-layer texture plane.

In one embodiment, the system for generating 3D printing data further includes adjusting distances between texture planes, the distances are adjustable according to requirements of fabric design, and the distances range from 0.1 mm to 0.4 mm.

After obtaining the multi-layer texture plane, the at least one slice pattern (more than one in this case) is obtained by cutting the multi-layer texture plane according to the projected contour of the model of the to-be-printed object.

Referring again to FIG. 1, in step S120, the system for generating 3D printing data generates the 3D printing data based on spatial positions of printing lines of cross-sectional patterns, with the cross-sectional patterns determined based on the at least one slice pattern. The printing lines comprise the texture lines.

Herein, each cross-sectional pattern corresponds to a pattern of a layer printed by the 3D printing device during the execution of the printing task. In the present disclosure, the lines in each cross-sectional pattern are defined as printing lines.

In an exemplary embodiment, the system for generating 3D printing data directly uses each slice pattern as a cross-sectional pattern, in which case the printing lines of a cross-sectional pattern include the texture lines of the corresponding slice pattern.

In another exemplary embodiment, the system for generating 3D printing data further processes each slice pattern to optimize a printing path.

The system for generating 3D printing data connects non-closed texture lines in the same slice pattern by auxiliary path lines along the projected contour to obtain a corresponding cross-sectional pattern. At this point, the printing lines of the cross-sectional pattern further include the auxiliary path lines in addition to the texture lines of the corresponding slice pattern.

It should be understood that in some non-surface-exposure 3D printing devices, a cured layer is usually formed by a point-by-point method, resulting in points that need to be connected by a printing path to finally form the cured layer. If the printing path is not planned properly, the printing efficiency and printing quality may be negatively impacted. For example, for SLA printing devices, an improper printing path may result in repeated scanning of certain areas, making printing less efficient and creating over-cured areas. Another example is that for fused-deposition-molding-based printing devices, unreasonable printing paths can cause frequent nozzle pullbacks and empty walks (i.e., nozzles moving without printing materials extruded). Therefore, in one embodiment, in each slice pattern, non-closed texture lines are connected to each other by auxiliary path lines to form printing lines, i.e., the printing lines include both the auxiliary path lines and texture lines, and the printing lines are used to describe the printing path of a corresponding cross-sectional layer.

Here, since endpoints of each non-closed texture line in a slice pattern are located on the projected contour of the model of the to-be-printed object, a printing path can be planned for a corresponding slice pattern by connecting the non-closed texture lines along the projected contour, to obtain the cross-sectional pattern.

The following is an example to illustrate the step of connecting the non-closed texture lines in the same slice pattern by the auxiliary path lines along the projected contour to obtain a corresponding cross-sectional pattern.

Figure 5:
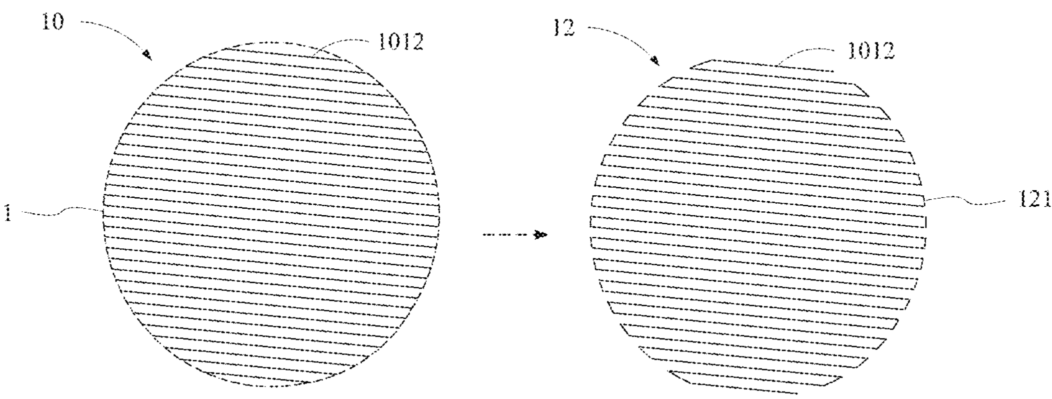
FIG. 5 is a schematic diagram showing a process of connecting various non-closed texture lines in the same slice pattern by auxiliary path lines along a projected contour according to one embodiment of the present disclosure.

FIG. 5 is a schematic diagram showing a process of connecting various non-closed texture lines in the same slice pattern by auxiliary path lines along a projected contour according to one embodiment of the present disclosure. As shown in FIG. 5, the slice pattern 10 includes a number of texture lines 1012, and the endpoints of each non-closed texture line fall on the projected contour 11 of the model of the to-be-printed object, with the projected contour 11 delineated by the dashed line. The system for generating 3D printing data connects the endpoints of each non-closed texture line along the projected contour by auxiliary path lines 121. The connected texture lines 1012 and the auxiliary path lines 121 form a continuous printing line, thereby forming a cross-sectional pattern 12.

In an embodiment, the system for generating 3D printing data assigns a serial number to each non-closed texture line of the slice pattern according to a spatial position of the respective non-closed texture line, and connects endpoints of non-closed texture lines with adjacent serial numbers by auxiliary path lines along the projected contour so that the non-closed texture lines in the slice pattern together form a continuous printing line.

Herein, the system for generating 3D printing data assigns a serial number to each non-closed texture line of the slice pattern according to a spatial position of the respective non-closed texture line, wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints. After determining the spatial position of each non-closed texture line, the system for generating 3D printing data defines a serial number of each non-closed texture line based on the spatial position of each non-closed texture line. The serial numbers may be assigned to non-closed texture lines in an order corresponding to spatial positions of the non-closed texture lines. For example, values of serial numbers assigned to the non-closed texture lines are positively correlated to X coordinates of the spatial positions of the non-closed texture lines, Y coordinates of the spatial positions of the non-closed texture lines, or respective sums of X coordinates and Y coordinates of the spatial positions of the non-closed texture lines. In some embodiments, the serial numbers are integers.

After assigning the serial number to each non-closed texture line, the system for generating 3D printing data connects non-closed texture lines with adjacent serial numbers by auxiliary path lines along the projected contour of the model of the to-be-printed object so that non-closed texture lines and auxiliary path lines form a continuous line, i.e., a printing line.

In this case, to improve the printing efficiency, each auxiliary path line is used to connect two closer endpoints of two non-closed texture lines with adjacent serial numbers, for example, two left endpoints of the two non-closed texture lines with the adjacent serial numbers.

In one embodiment, assuming that the two endpoints of each non-closed texture line are denoted with S and E respectively, and each non-closed texture line is denoted with its serial number, the system for generating 3D printing data initiates a search starting from one endpoint En of a non-closed texture line n, to look for an endpoint Sn+1 of a non-closed texture line n+1, wherein the endpoint Sn+1 is closer to the endpoint En than any other endpoint of the non-closed texture line n+1, and then the system connects the endpoint En and the endpoint Sn+1 by an auxiliary path line. Similarly, the system for generating 3D printing data then initiates a search starting from an endpoint En+1 of the non-closed texture line n+1, to look for an endpoint Sn+2 of a non-closed texture line n+2, wherein the endpoint Sn+2 is closer to the endpoint En+1 than any other endpoint of the non-closed texture line n+2, and then the system connects the endpoint En+1 and the endpoint Sn+2 by an auxiliary path line.

In another embodiment, after assigning a serial number to each non-closed texture line in the slice pattern based on its spatial location, the direction of each non-closed texture line may be further defined based on magnitudes of the coordinates of its endpoints; for example, among the two endpoints of each non-closed texture line, the one whose X or Y coordinate has a smaller magnitude is the ending point E and the one whose X or Y coordinate has a larger magnitude is the starting point S; for another example, among the two endpoints of each non-closed texture line, the one whose X or Y coordinate has a larger magnitude is the ending point E and the one whose X or Y coordinate has a smaller magnitude is the starting point S. For example, endpoints on a first side of the non-closed texture lines are defined as starting points and endpoints on a second side are defined as ending points. Then, directions of each two adjacent non-closed texture lines can be configured to be opposite; for example, the non-closed texture lines n, n+2, n+4, n+6 . . . are selected and their directions are reversed. Alternatively, directions of all the non-closed texture lines with an even serial number are reversed; or directions of all the non-closed texture lines with an odd serial number are reversed.

The reversion means the starting point and the ending point of each reversed non-closed texture line are swapped. Then starting points and ending points of each two adjacent non-closed texture lines are connected by auxiliary path lines to form a continuous printing line.

In an embodiment, the system for generating 3D printing data classifies texture lines in each slice pattern into different groups according to spatial positions of the texture lines; connects endpoints of the non-closed texture lines in a first group by auxiliary path lines along the projected contour so that the non-closed texture lines in the first group form a continuous texture line of the first group; and connects continuous texture lines of different groups by auxiliary path lines so that the continuous texture lines of the different groups form a continuous printing line.

It should be understood that when the contour of the model of the to-be-printed object is irregularly shaped, the corresponding projected contour is also irregularly shaped, which may cause difficulty of planning the printing path in the corresponding slice pattern; for example, in the process of generating the slice pattern, a texture line may be cut into two or more non-closed texture lines by the projected contour; although the resulted non-closed texture lines are not connected to each other, after extending them, there are situations where the extended lines overlap because they are originally of the same texture line, in which case the non-closed texture lines cannot be connected using the method shown in FIG. 5.

Therefore, in some embodiments, texture lines in each slice pattern are classified into different groups according to spatial positions of the texture lines; wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints.

After determining the spatial position of each non-closed texture line, the non-closed texture lines are classified into different groups based on predetermined rules. The predetermined rules include, but are not limited to: based on the spatial positions of the non-closed texture lines, non-closed texture lines whose X coordinates are similar (meaning their numerical values are close) are grouped together; or based on the spatial positions of the non-closed texture lines, non-closed texture lines whose Y coordinates are similar are grouped together.

Then, the system for generating 3D printing data further connects non-closed texture lines of the same group by auxiliary path lines along the projected contour and turn them into a continuous texture line, and then connects continuous texture lines of different groups by auxiliary path lines so that the continuous texture lines of the different groups form a continuous printing line.

Of course, in some embodiments, the spatial positions of the texture lines in each slice pattern can also be used to determine serial numbers of the non-closed texture lines, and to classify the texture lines so that the non-closed texture lines form a continuous printing line.

For example, the system for generating 3D printing data first defines the direction and serial number of each non-closed texture line based on the spatial position of the respective non-closed texture line in the slice pattern, and making the directions of each two non-closed texture lines with adjacent serial numbers opposite to each other; wherein the direction of each non-closed texture line is used to determine the starting point and ending point of the respective non-closed texture line. Then auxiliary path points are configured between the ending point of a first non-closed texture line, and the starting point of a second non-closed texture line adjacent to the first non-closed texture line, in an equidistant manner or an equal division manner; in the equidistant manner, auxiliary path points are sequentially generated between the first non-closed texture line and the second non-closed texture line, with a constant distance between each two adjacent auxiliary path points, and no auxiliary path points are generated when the total distance between the non-closed texture lines is smaller than the constant distance between the auxiliary path points; in the equal division manner, auxiliary path points are generated between the first non-closed texture line and the second non-closed texture line, with the auxiliary path points equally divide the total distance between the non-closed texture lines, and the distances between each two adjacent auxiliary path points are also constant in this case. Further, the system for generating 3D printing data performs printing path planning for the slice pattern to generate a cross-sectional pattern based on the auxiliary path points, the starting point and ending point of each non-closed texture line, the projected contour of the model of the to-be-printed object, and each non-closed texture line in the slice pattern.

Further, the system for generating 3D printing data performs printing path planning for the slice pattern to generate a cross-sectional pattern based on the auxiliary path points, the starting point and ending point of each non-closed texture line, the projected contour of the model of the to-be-printed object, and each non-closed texture line in the slice pattern in the following manner: projecting auxiliary path points and starting points and ending points of the non-closed texture lines onto the projected contour of the model of the to-be-printed object to obtain projected path points, projected starting points and projected ending points, respectively, and connecting the projected ending point of a first non-closed texture line and the projected starting point of a second non-closed texture line adjacent to the first non-closed texture line to obtain connecting lines between adjacent non-closed texture lines. These connecting lines are auxiliary path lines. A connecting line between the ending point of a first non-closed texture line and the starting point of a second non-closed texture line adjacent to the first non-closed texture line passes through projected path points between the ending point of the first non-closed texture line and the starting point of the second non-closed texture line. The auxiliary path lines and non-closed texture lines in each slice pattern together constitute a printing line.

In some cases, when using auxiliary path lines to connect non-closed texture lines into a printing line, there may be a possibility of long auxiliary path lines along the projected contour of the model of the to-be-printed object, and to avoid negative impact of such long auxiliary path lines on the cured structure during printing, the system for generating 3D printing data further removes auxiliary path lines whose lengths exceed a predetermined length threshold.

Non-closed texture lines that are no longer joined into a continuous printing line after the above removal may be joined by generating auxiliary path lines outside of the projected contour, as will be described later.

The steps of further processing each slice pattern to generate a corresponding cross-sectional pattern are exemplarily illustrated below.

FIGS. 6A to 6H are schematic diagrams showing a process of further processing each slice pattern to generate a cross-sectional pattern according to one embodiment of the present disclosure.

Figure 6A:
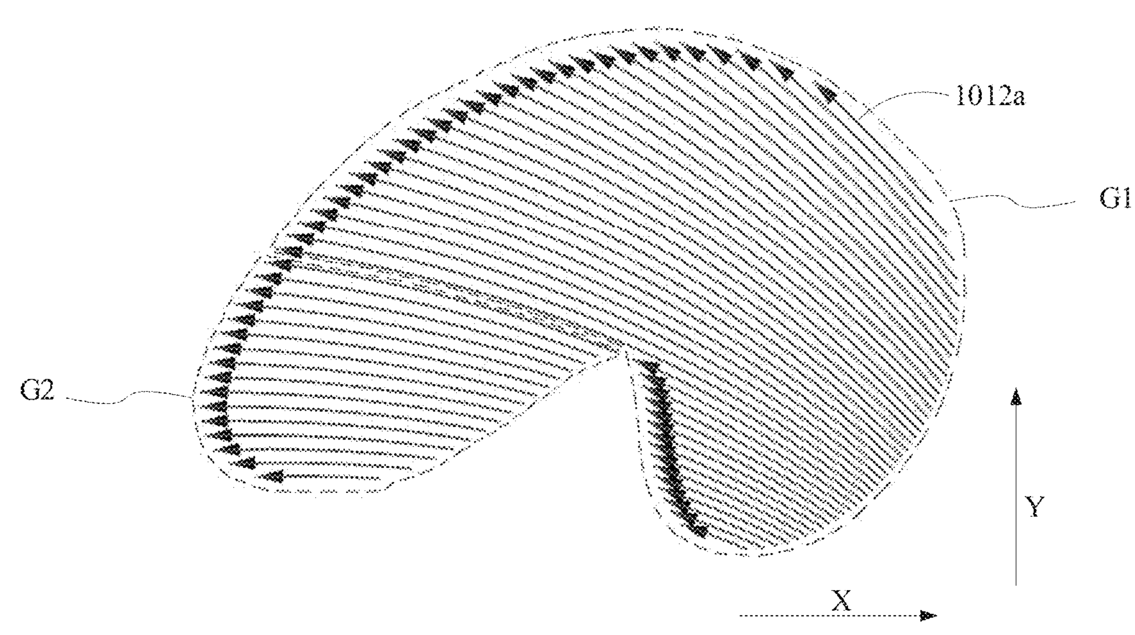
FIGS. 6A to 6H are schematic diagrams showing a process of further processing each slice pattern to generate a cross-sectional pattern according to one embodiment of the present disclosure.
Figure 6B:
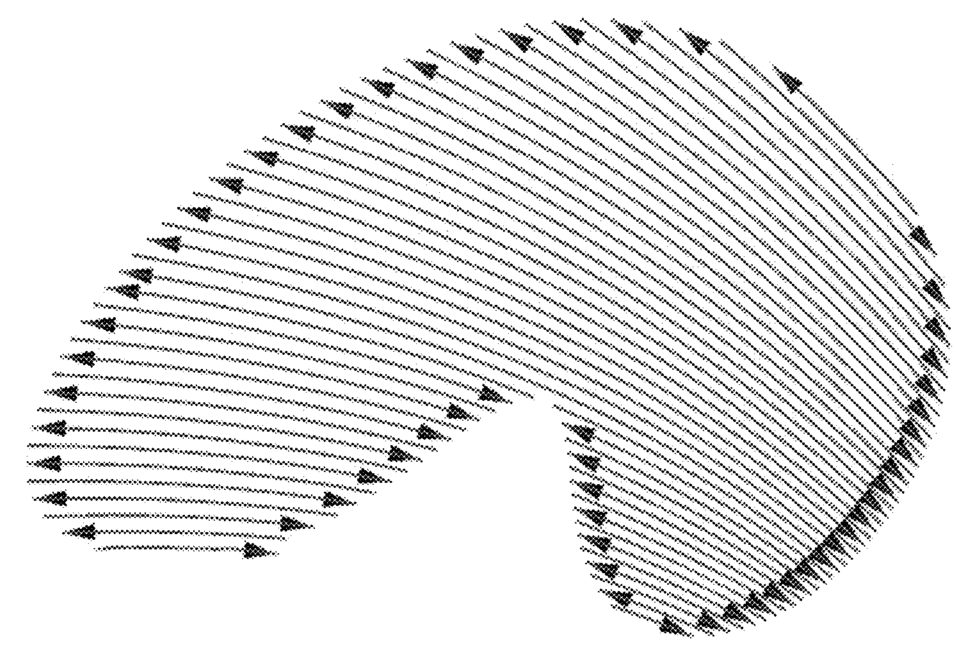
Figure 6C:
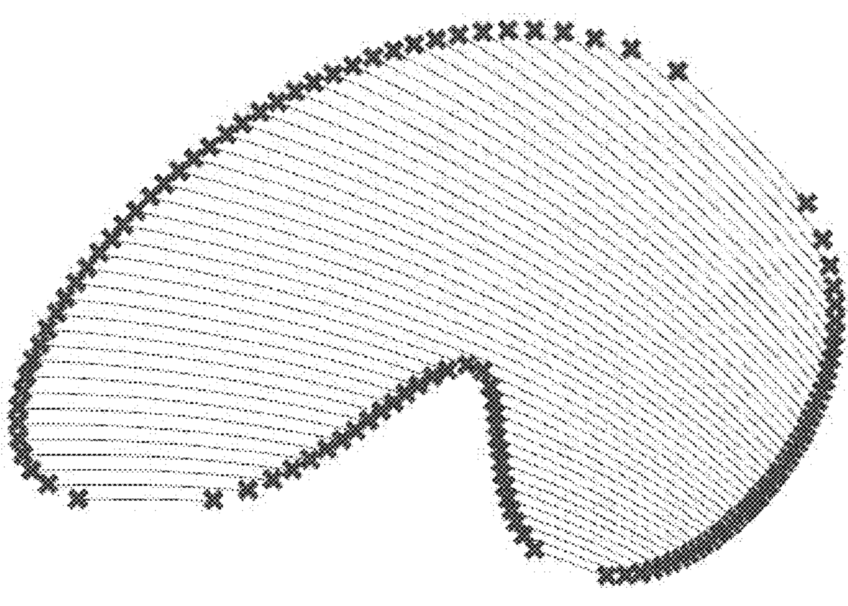

Here, the system for generating 3D printing data assigns serial numbers and directions to non-closed texture lines of the slice pattern and classifies the non-closed texture lines, according to spatial positions of the non-closed texture lines, thereby obtaining the processed slice pattern as shown in FIG. 6A. The serial number of each non-closed texture line is determined based on the Y coordinate of the right endpoint of each non-closed texture line. Specifically, the coordinates of the two endpoints of each non-closed texture line are first defined in a coordinate system, and the non-closed texture line whose right endpoint has the largest Y coordinate is defined as a base non-closed texture line (i.e., 1012A in FIG. 6A), and non-closed texture lines whose right endpoints have X coordinates close to the X coordinate of the right endpoint of the base non-closed texture line 1012A are classified together as a group, for example, the G1 group. Non-closed texture lines whose right endpoints have X coordinates relatively far from the X coordinate of the right endpoint of the base non-closed texture line are classified together as a group, for example, the G2 group. Among the two endpoints of each non-closed texture line, the one whose X coordinate has a larger magnitude is the starting point and the one whose X coordinate has a smaller magnitude is the ending point, thereby obtaining the direction of the respective non-closed texture line. Non-closed texture lines in the same group are ordered from 1 to N according to the magnitude of Y coordinates of their right endpoints, which means that serial number 1 is assigned to the non-closed texture line whose right endpoint has the largest Y coordinate. As a result, serial numbers, directions, and classification of the non-closed texture lines in a slice pattern are obtained. Serial numbers of non-closed texture lines from different groups can also be numbered consecutively or renumbered as groups. Hereinafter, serial numbers of non-closed texture lines from different groups are numbered consecutively, that is, the last serial number in group G1 and the first serial number in group G2 are consecutive.

Figure 6D:
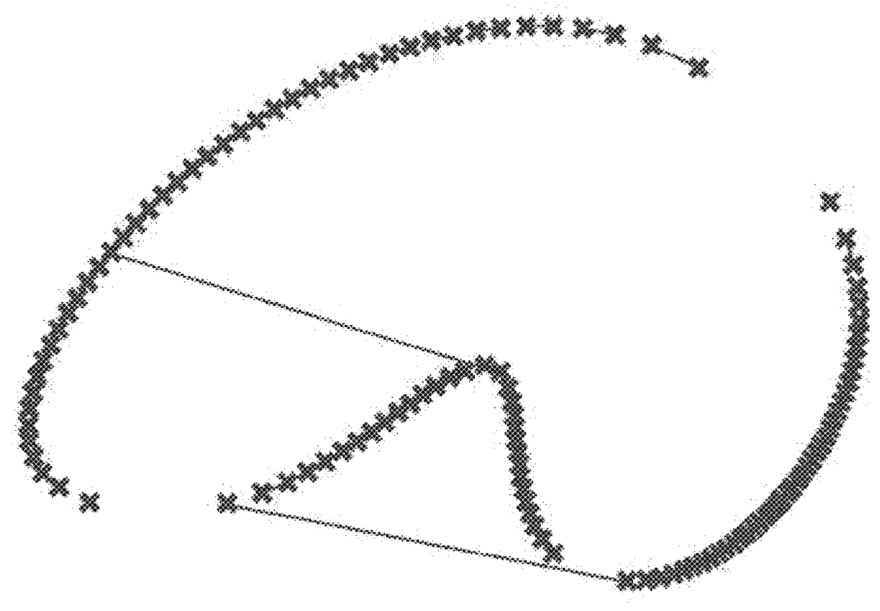
Figure 6E:
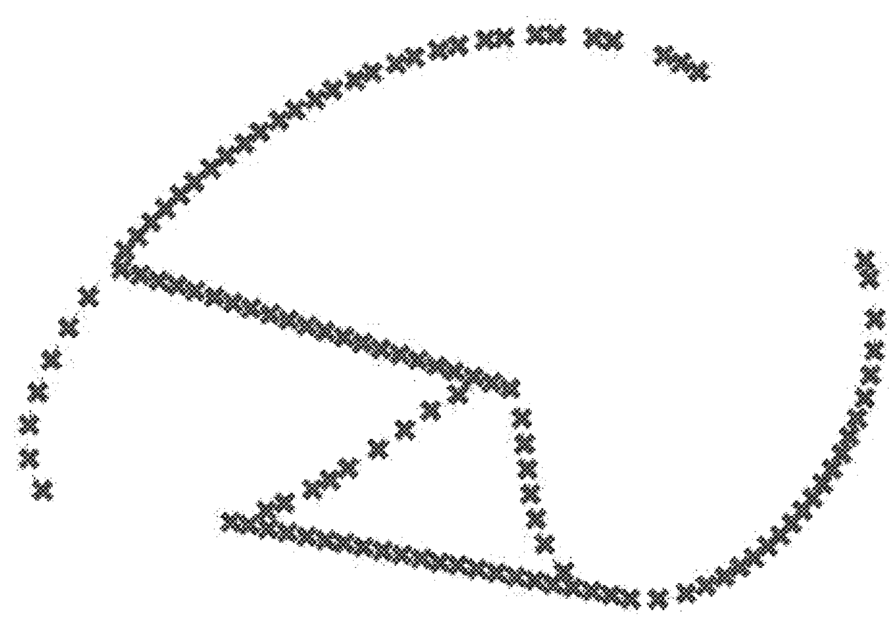
Figure 6F:
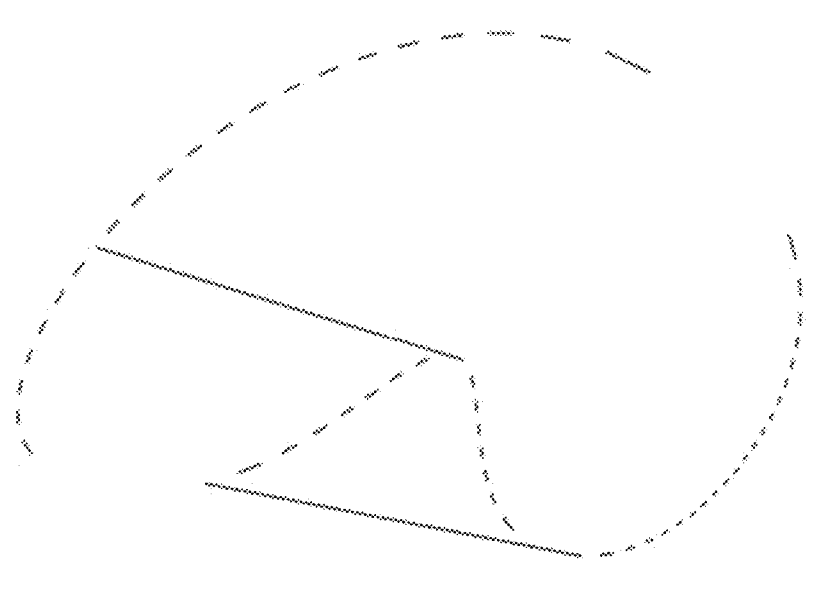
Figure 6G:
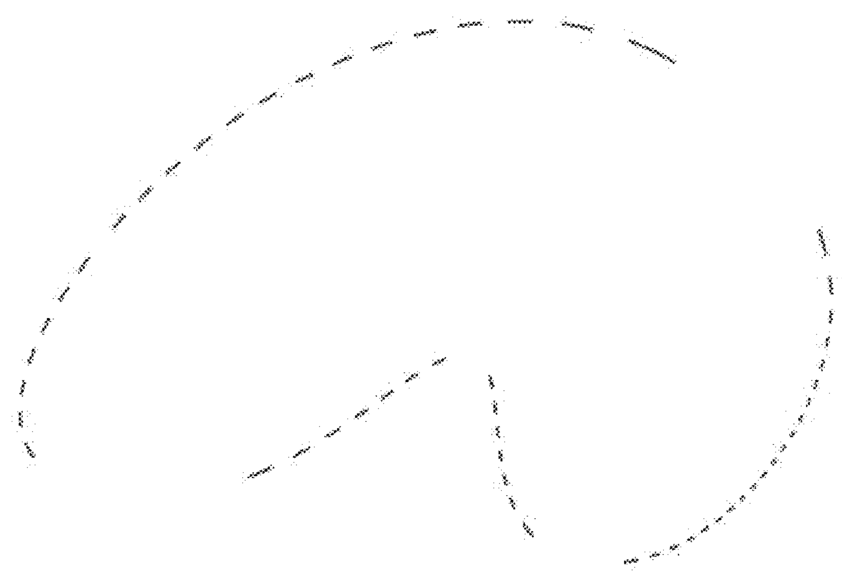
Figure 6H:
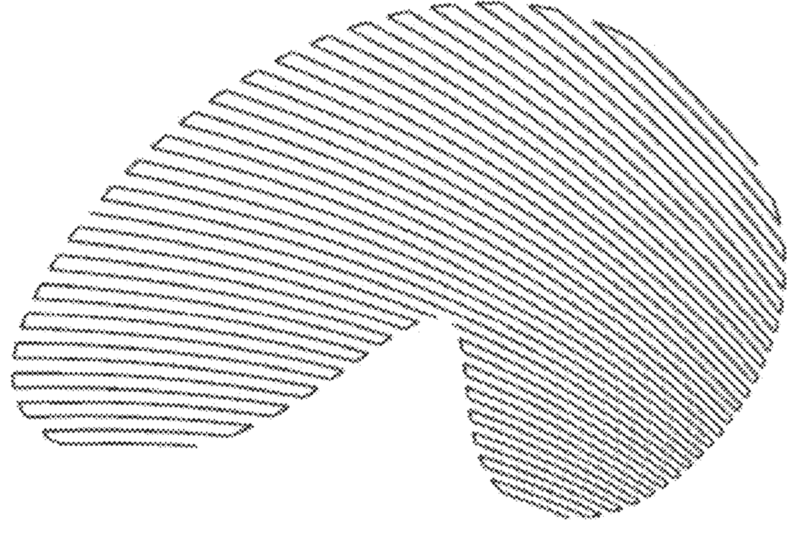

Referring again to FIG. 6*b*, the system for generating 3D printing data causes each two non-closed texture lines with adjacent serial numbers in the same group to be in opposite directions so that non-closed texture lines in the same group are interconnected in a head-to-tail manner. Referring again to FIG. 6C, where the endpoints of a non-closed texture line are identified with the symbol "x". As shown in FIG. 6D, the system for generating 3D printing data connects the ending point of the Nth non-closed texture line to the starting point of the (N+1)th non-closed texture line by a line segment. As shown in FIG. 6E, the system for generating 3D printing data generates equidistant auxiliary path points along the line segment between the ending point of the Nth non-closed texture line and the starting point of the (N+1)th non-closed texture line, with the auxiliary path points also identified with "x". It should be noted here that only auxiliary path points are shown in FIG. 6E for the sake of simplicity, but in practice, endpoints of non-closed textures line and auxiliary path points may both be shown. Further, the system for generating 3D printing data projects "x" points (i.e., endpoints of non-closed texture lines and auxiliary path points) onto the projected contour of the model of the to-be-printed object to obtain a projected point corresponding to each "x" point. As shown in FIG. 6F, the projected points corresponding to the ending point of a first non-closed texture line and the starting point of a second non-closed texture line are connected by an auxiliary path line, wherein the first non-closed texture line and the second non-closed texture line have adjacent serial numbers, the process is repeated for each two adjacent non-closed texture lines. As shown in FIG. 6G, improper auxiliary path lines within the projected contour are removed by manual means or by a preset length threshold, and the respective non-closed texture lines are superimposed with the auxiliary path lines shown in FIG. 6*g* to obtain a printing line as shown in FIG. 6*h*.

In other cases, where the system for generating 3D printing data is unable to connect the non-closed texture lines in the same slice pattern along the projected contour, they can also be connected by generating such auxiliary path lines outside the projected contour.

The system for generating 3D printing data connects non-closed texture lines in the same slice pattern by auxiliary path lines outside the projected contour to obtain a corresponding cross-sectional pattern.

In one embodiment, the endpoints of two non-closed texture lines may be connected outside the projected contour of the model of the to-be-printed object by means of manual drawing by an operator.

In another embodiment, the system for generating 3D printing data can enlarge the projected contour (i.e., the original contour) of the model of the to-be-printed object by outward shifting each point of the original contour in a direction normal to the original contour at the respective point, thus generating a virtual contour outside the original contour, then mapping endpoints (i.e., the original endpoints) of not-yet-connected non-closed texture lines of the original contour onto the virtual contour to determine mapped endpoints, then connect each of the original endpoints to the corresponding mapped endpoint by auxiliary path lines, and connect the mapped endpoints with each other by auxiliary path lines, thereby joining all the non-closed texture lines into a continuous texture line.

The process of the system for generating 3D printing data connecting the non-closed texture lines in the same slice pattern by auxiliary path lines outside the projected contour will be exemplarily illustrated by an example below.

Figure 7A:
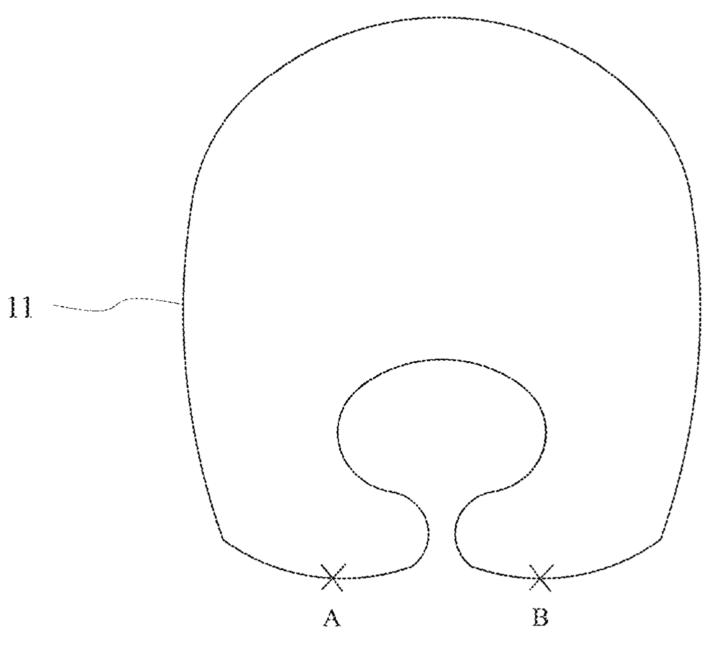
FIGS. 7A to 7C are schematic diagrams showing a process of connecting endpoints of two non-closed texture lines by auxiliary path lines outside a projected contour according to one embodiment of the present disclosure.
Figure 7B:
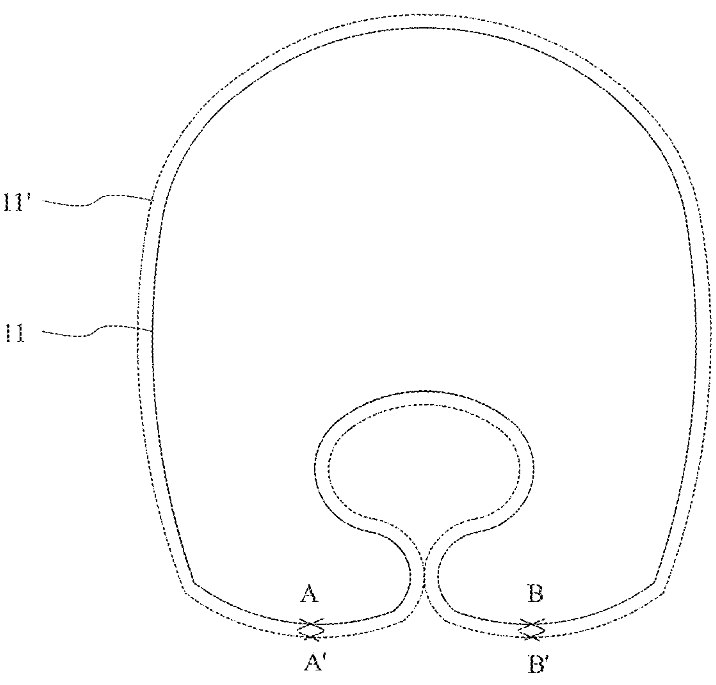
Figures 7C, 8:
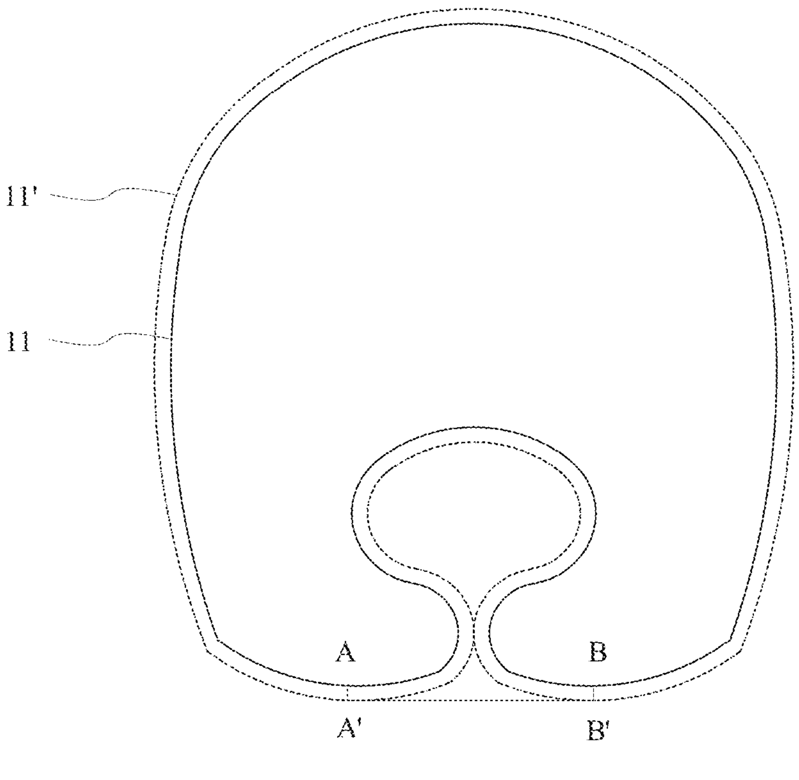
FIG. 8 is a flowchart illustrating a method for generating a 3D printing model according to one embodiment of the present disclosure.

FIGS. 7A to 7C are schematic diagrams showing a process of connecting endpoints of two non-closed texture lines by auxiliary path lines outside a projected contour according to one embodiment of the present disclosure. Referring first to FIG. 7A, it is assumed that points A and B are endpoints of two non-closed texture lines to be connected. As shown in FIG. 7B, the system for generating 3D printing data first outwardly shifts each point of the original contour 11 in a direction normal to the original contour 11 at the respective point, thus generating a virtual contour 11' outside the original contour 11, and the points A and B on the original contour 11 correspond to points A' and B' on the virtual contour 11', respectively. As shown in FIG. 7C, the system for generating 3D printing data connects point A to point A', point B to point B', and A' to point B', such that A-A', A'-B', and B'-B form a connecting path from point A to point B; lines used to connect the points are auxiliary path lines.

Herein, the system for generating 3D printing data generates 3D printing data according to the spatial position of each printing line in the cross-sectional pattern after determining the cross-sectional pattern according to the above-mentioned manner. It should be understood that a printing line include individual printing points, so that in one embodiment, the spatial position of a printing line may be described by coordinates of individual printing points of the printing line in the plane in which the corresponding cross-sectional pattern is located. The system for generating 3D printing data generates 3D printing data based on the coordinates of each printing point, with the 3D printing data being a data set corresponding to printing instructions for controlling printing by a 3D printing device, so that the 3D printing device recognizes the printing instructions in the data set and forms a cured layer corresponding to each cross-sectional pattern layer by layer based on the printing instructions. The printing instructions include G-code instructions and the like.

The method for generating 3D printing data in the first aspect of the present disclosure uses interlacing between layers to achieve a fabric structure, or generates an interlaced fabric structural pattern in a layer. As a result, the pattern of each layer can be configured according to various cosmetic and functional requirements, increasing the freedom of design while simplifying and shortening the process from design to production, which is suitable for large-scale production. In addition, the method for generating 3D printing data can optimize printing paths, further improving printing efficiency and printing quality.

Figure 15:
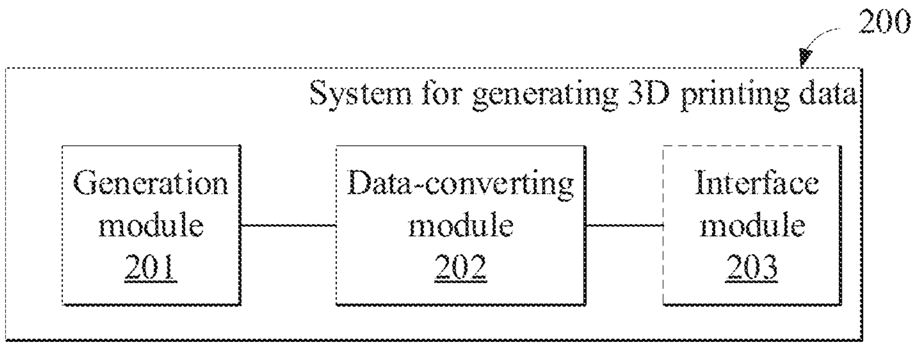
FIG. 15 shows a block diagram of a system for generating 3D printing data according to one embodiment of the present disclosure.

FIG. 15 shows a block diagram of a system for generating 3D printing data according to one embodiment of the present disclosure. As shown, the system 200 for generating 3D printing data includes: a generation module 201, and a data-converting module 202.

The generation module 201 is used for generating at least one slice pattern based on a projected contour of the model of the to-be-printed object.

It should be understood that the model of the to-be-printed object is a three-dimensional model of the to-be-printed fabric, and the projected contour is a projection of the contour of the to-be-printed fabric; that is, the projected contour is the boundary represented by the projection of the contour of the model of the to-be-printed object, with the projection in a plane perpendicular to the Z-axis direction (i.e. the vertical direction). The contour of the to-be-printed fabric may be predetermined or may be drawn ad hoc according to design requirements of the to-be-printed object. For example, the system for generating 3D printing data further includes a memory, and one or more alternative contours of the to-be-printed fabric are pre-stored in the memory. A desired contour can be selected from the alternative contours of the to-be-printed fabric. Again, depending on the design requirements of the to-be-printed object, a contour may be drawn ad hoc to serve as the contour of the to-be-printed fabric.

The number of slice patterns included in the at least one slice pattern corresponds to the number of printing layers of the to-be-printed object. It should be understood that a slice pattern in some embodiments denotes a pattern corresponding to each slice resulted from the slicing of the 3D model of the to-be-printed object; the slicing is generally performed in the Z-axis direction (i.e., the vertical direction) of the 3D model of the to-be-printed object, generating a number of layers of patterns. In the present disclosure, since the 3D model of the to-be-printed fabric is formed by generating a corresponding pattern layer by layer, the at least one slice pattern is essentially equated with the layers of patterns generated during the generation of the 3D printing data. It should be noted that the at least one slice pattern does not necessarily correspond to the layers of patterns of the final 3D model of the to-be-printed fabric; in some embodiments, the at least one slice pattern includes only patterns generated during intermediate steps in the process of generating the layers of patterns of the final 3D model of the to-be-printed fabric, as will be described in detail later.

A projected contour of the model of the to-be-printed object is used as a boundary, and at least one slice pattern is generated within the boundary. Each of the at least one slice pattern comprises at least one texture line.

The texture line includes lines in the slice pattern, which can be straight lines or curved lines according to actual needs. The texture line may be predetermined or may be drawn ad hoc according to design requirements of the to-be-printed object. For example, the system for generating 3D printing data further includes a memory, and one or more alternative texture lines are pre-stored in the memory of the system for generating 3D printing data. A desired texture line can be selected from the alternative texture lines. As another example, depending on the design requirements of the to-be-printed object, various straight or curved lines may be drawn ad hoc to serve as the at least one texture line. It should be understood that any figure or shape can be made up of line segments, and each line segment has a starting point and an ending point, which are collectively referred to as endpoints in some embodiments. For the sake of simplicity, lines segments are referred to as lines herein. When a line extends from the starting point and returns to the starting point, the line constitutes a closed line, as opposed to a non-closed line which extends from the starting point and does not return to that starting point, that is, at least one of the starting point and ending point of a non-closed line is exposed (meaning not covered by itself). In the present disclosure, the endpoints of each non-closed texture line are located on the projected contour.

In an exemplary embodiment, the generation module uses the projected contour as a boundary, and generates the at least one slice pattern, comprising a first slice pattern and a second slice pattern, within the boundary, wherein the first slice pattern comprises first texture lines, the second slice pattern comprises second textures lines, and projections of the first texture lines onto a plane where the second slice pattern is located partially overlap the second texture lines.

Here, the generation module first determines the projected contour of the model of the to-be-printed object, then uses the projected contour of the model of the to-be-printed object as a boundary, and generates texture lines in each slice pattern within the boundary, with the endpoints of each non-closed texture line located on the boundary.

FIG. 2A shows a schematic structural diagram of a slice pattern according to one embodiment of the present disclosure. As shown in FIG. 2A, in one embodiment, the number of the at least one slice pattern 10 is one, and in order to form an interlaced fabric structure after the printing based on 3D printing data obtained according to the present method, texture lines in the slice pattern 10 forms an interlaced shape, and the endpoints of each non-closed texture line are located on the projected contour of the model of the to-be-printed object.

FIG. 2B shows a schematic structural diagram of a slice pattern according to one embodiment of the present disclosure. As shown in FIG. 2B, in one embodiment, the number of the at least one slice pattern 10 is two; texture lines in the same slice pattern 10 do not overlap, and the endpoints of each non-closed texture line are located on the projected contour of the model of the to-be-printed object; but in order to form an interlaced fabric structure after the printing based on 3D printing data obtained according to the present method, the texture lines in different slice patterns spatially overlap to form the interlaced structure. The at least one slice pattern includes a first slice pattern and a second slice pattern, the first slice pattern comprises first textures lines, and the second slice pattern comprises second textures lines, and projections 10' of the first texture lines onto a plane where the second slice pattern is located partially overlap the second texture lines. In some other embodiments, when the number of the at least one slice pattern 10 is two, texture lines in the same slice pattern 10 may also overlap, which is also able to achieve the technical effect where the projections 10' of the first texture lines onto a plane where the second slice pattern is located partially overlap the second texture lines.

In an exemplary embodiment, the generation module further selects a texture plane, and generates the at least one slice pattern from the texture plane according to the projected contour, wherein the texture plane is a single-layer texture plane or a multi-layer texture plane.

The number of texture planes used in the printing corresponds to the number of the printing layers of the to-be-printed object, and the number of the printing layers is within a range including 1 to 20, depending on characteristics of the fabric structure. When the number of the printing layers is 1, that means a single-layer texture plane is selected. When the number of the printing layers is greater than 1, that means a multi-layer texture plane is selected, and the multi-layer texture plane includes a plurality of single-layer texture planes, and the number of the texture planes included in the multi-layer texture plane is the exact number of the printing layers.

The texture planes may be predetermined or may be drawn ad hoc according to design requirements of the to-be-printed object. For example, the system for generating 3D printing data further includes a memory, and one or more alternative texture planes are pre-stored in the memory of the system. A desired texture plane can be selected from the alternative texture planes. As another example, depending on the design requirements of the to-be-printed object, various straight or curved lines may be drawn ad hoc to serve as the texture planes.

After selecting a single-layer texture plane or a multi-layer texture plane, the single-layer texture plane or multi-layer texture plane is cut according to the projected contour of the model of the to-be-printed object, resulting in a corresponding number of slice patterns that are portions of the single-layer texture plane or multi-layer texture plane.

FIG. 3A shows a schematic structural diagram of a texture plane according to an exemplary embodiment of the present disclosure. As shown in FIG. 3A, the number of texture plane used is 1; that is, a single-layer texture plane is selected. In order to form an interlaced fabric structure after the printing based on the 3D printing data obtained according to the present method, texture lines in the texture plane forms an interlaced shape.

Referring to FIG. 3B and FIG. 3C, FIG. 3B shows a schematic diagram of the structure of the projection of the model of the to-be-printed object in the present disclosure in one embodiment, and FIG. 3C shows the slice pattern obtained according to FIG. 3A and FIG. 3B in the present disclosure. Here, the single-layer texture plane in FIG. 3A is cut according to the projected contour of the model of the to-be-printed object shown in FIG. 3B; that is, only portions of FIG. 3A that correspond to the black area in FIG. 3B are retained, resulting in the slice pattern as shown in FIG. 3C.

In another embodiment, the generation module generates at least two texture patterns, and adjusts the horizontal position of the at least two texture patterns so that their projections onto a same plane partially overlap, to obtain a single-layer texture plane. wherein each texture pattern comprises a plurality of straight lines and/or at least one curved line, and The texture patterns may be predetermined or may be drawn ad hoc according to design requirements of the to-be-printed object. For example, the system for generating 3D printing data further includes a memory, and one or more alternative texture patterns are pre-stored in the memory. A desired texture pattern can be selected from the alternative texture patterns. As another example, depending on the design requirements of the to-be-printed object, various straight or curved lines may be drawn ad hoc to form the texture patterns. After at least two texture patterns have been generated, horizontal positions of the at least two texture patterns are adjusted so that the two texture patterns are interlaced in the same plane, to obtain a single-layer texture plane. The method of adjustment includes, but is not limited to, rotational or translational movement of the at least two texture patterns in the plane in which they are located. Each texture pattern may include a plurality of straight lines, or may include at least one curved line, or may include at least one straight line and at least one curved line.

The steps for obtaining a single-layer texture plane are detailed below with an example.

FIG. 4 is a schematic diagram showing a process of generating a single-layer texture plane according to one embodiment of the present disclosure. As shown in FIG. 4, the generation module first selects a texture line 1012 and generates a texture pattern 1011 based on the texture line 1012. After repeating the above steps to obtain two texture patterns 1011, the horizontal positions of the two texture patterns 1011 are adjusted so that the two texture patterns are interlaced in the same plane, to obtain a single-layer texture plane 101.

It should be understood that, although in the above example a single-layer texture plane is formed by two texture patterns 1011, in practice, the number of texture patterns used can also be adjusted according to actual design needs; for example, three, four, five, six, seven, eight, nine, or ten texture patterns may be used, and horizontal positions of these texture patterns are adjusted so that their projections onto a same plane partially overlap, to obtain a fabric with an interlaced structure. In addition, although in FIG. 4 a certain curved line is used as the texture line 1012, in practical applications, the length, shape, and number of the curved line can be adjusted according to design requirements; and in some embodiment, the curved line can also be replaced with a straight line, and when the texture line is a straight line, the length, shape, and number of the texture line can also be adjusted according to the design requirements.

In one embodiment, after obtaining a single-layer texture plane, if the number of printing layers is one, the single-layer texture plane is cut according to the projected contour of the model of the to-be-printed object to obtain a slice pattern.

In another embodiment, when the number of printing layers is greater than one, the generation module generates at least two single-layer texture planes and adjusts the spatial positions of the at least two single-layer texture planes so that their projections onto a same plane partially overlap, to obtain a multi-layer texture plane; wherein each texture pattern includes a plurality of straight lines and/or at least one curved line.

Herein, the step of obtaining a single-layer texture plane may be repeated to generate a plurality of single-layer texture planes. In order to form an interlaced fabric structure after the printing based on the 3D printing data obtained according to the present method, texture lines in a single-layer texture plane are spatially interlaced with texture lines in another single-layer texture plane, but texture lines in the same single-layer texture plane do not intersect with each other, thereby forming an interlaced shape. Therefore, when the texture lines in the same single-layer texture plane are not interlaced with each other, spatial positions of the plurality of single-layer texture planes may be adjusted by manners including, but not limited to, rotational or translational movement of each single-layer texture plane in the plane in which it is located, so that their projections onto a same plane partially overlap, thereby obtaining a multi-layer texture plane.

In one embodiment, the generation module further adjusts distances between texture planes, the distances are adjustable according to requirements of fabric design, and the distances range from 0.1 mm to 0.4 mm.

After obtaining the multi-layer texture plane, the at least one slice pattern (more than one in this case) is obtained by cutting the multi-layer texture plane according to the projected contour of the model of the to-be-printed object.

A data-converting module 202 of the system generates the 3D printing data based on spatial positions of printing lines of cross-sectional patterns, with the cross-sectional patterns determined based on the at least one slice pattern. The printing lines comprise the texture lines.

Herein, a cross-sectional pattern corresponds to a pattern of a layer printed by the 3D printing device during the execution of the printing task. In the present disclosure, the lines in each cross-sectional pattern are defined as printing lines.

In an exemplary embodiment, the generation module directly uses each slice pattern as a cross-sectional pattern, in which case the printing lines of a cross-sectional pattern include the texture lines of the corresponding slice pattern.

In another exemplary embodiment, the generation module further processes each slice pattern to optimize a printing path.

The generation module connects non-closed texture lines in the same slice pattern by auxiliary path lines along the projected contour to obtain a corresponding cross-sectional pattern. At this point, the printing lines of the cross-sectional pattern further include the auxiliary path lines in addition to the texture lines of the corresponding slice pattern.

It should be understood that in some non-surface-exposure 3D printing devices, a cured layer is usually formed by a point-by-point method, resulting in points that need to be connected by a printing path to finally form the cured layer. If the printing path is not planned properly, the printing efficiency and print quality may be negatively impacted. For example, for SLA printing devices, an improper printing path may result in repeated scanning of certain areas, making printing less efficient and creating over-cured areas. Another example is that for fused-deposition-molding-based printing devices, unreasonable printing paths can cause frequent nozzle pullbacks and empty walks (i.e., nozzles moving without printing materials extruded). Therefore, in one embodiment, in each slice pattern, non-closed texture lines are connected to each other by auxiliary path lines to form a printing line, i.e., the printing line includes both the auxiliary path lines and the texture lines, and the printing line is used to describe the printing path of a corresponding cross-sectional layer.

Here, since endpoints of each non-closed texture line in a slice pattern are located on the projected contour of the model of the to-be-printed object, a printing path can be planned for a corresponding cross-sectional pattern by connecting the non-closed texture lines along the projected contour.

The following is an example to illustrate the step of connecting the non-closed texture lines in the same slice pattern by the auxiliary path lines along the projected contour to obtain a corresponding cross-sectional pattern.

FIG. 5 is a schematic diagram showing a process of connecting various non-closed texture lines in the same slice pattern by auxiliary path lines along a projected contour according to one embodiment of the present disclosure. As shown in FIG. 5, the slice pattern 10 includes a number of texture lines 1012, and the endpoints of each non-closed texture line fall on the projected contour 11 of the model of the to-be-printed object, with the projected contour 11 delineated by the dashed line. The generation module connects the endpoints of each non-closed texture line along the projected contour by auxiliary path lines 121, and the texture lines 1012 and the auxiliary path lines 121 form a continuous printing line, thereby forming a cross-sectional pattern 12.

In an embodiment, the generation module assigns a serial number to each non-closed texture line of the slice pattern according to a spatial position of the respective non-closed texture line, and connects endpoints of non-closed texture lines with adjacent serial numbers by auxiliary path lines along the projected contour so that the non-closed texture lines in the slice pattern together form a continuous printing line.

Herein, the generation module assigns a serial number to each non-closed texture line of the slice pattern according to a spatial position of the respective non-closed texture line, wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints. After determining the spatial position of each non-closed texture line, the generation module defines a serial number of each non-closed texture line based on the spatial position of each non-closed texture line. For example, values of serial numbers assigned to non-closed texture lines are positively correlated to X coordinates of the spatial positions of the non-closed texture lines, Y coordinates of the spatial positions of the non-closed texture lines, or respective sums of X coordinates and Y coordinates of the spatial positions of the non-closed texture lines.

After assigning the serial number to each non-closed texture line, the generation module connects non-closed texture lines with adjacent serial numbers by auxiliary path lines along the projected contour of the model of the to-be-printed object so that non-closed texture lines and the auxiliary path lines form a continuous line, i.e., a printing line.

In this case, to improve the printing efficiency, each auxiliary path line is used to connect two closer endpoints of two non-closed texture lines with adjacent serial numbers, for example, two left endpoints of the two non-closed texture lines with the adjacent serial numbers.

In one embodiment, assuming that the two endpoints of each non-closed texture line are denoted with S and E respectively, and each non-closed texture line is denoted with its serial number, the generation module initiates a search starting from one endpoint En of a non-closed texture line n, to look for an endpoint Sn+1 of a non-closed texture line n+1, wherein the endpoint Sn+1 is closer to the endpoint En than any other endpoint of the non-closed texture line n+1, and then the system connects the endpoint En and the endpoint Sn+1 by an auxiliary path line. Similarly, the system for generating 3D printing data then initiates a search starting from an endpoint En+1 of the non-closed texture line n+1, to look for an endpoint Sn+2 of a non-closed texture line n+2, wherein the endpoint Sn+2 is closer to the endpoint En+1 than any other endpoint of the non-closed texture line n+2, and then the system connects the endpoint En+1 and the endpoint Sn+2 by an auxiliary path line.

In another embodiment, after assigning a serial number to each non-closed texture line in the slice pattern based on its spatial location, the direction of each non-closed texture line may be further defined based on magnitudes of the coordinates of its endpoints; for example, among the two endpoints of each non-closed texture line, the one whose X or Y coordinate has a smaller magnitude is the ending point E and the one whose X or Y coordinate has a larger magnitude is the starting point S; for example, among the two endpoints of each non-closed texture line, the one whose X or Y coordinate has a larger magnitude is the ending point E and the one whose X or Y coordinate has a smaller magnitude is the starting point S. For example, endpoints on a first side of the non-closed texture lines are defined as starting points and endpoints on a second side are defined as ending points. Then, directions of each two adjacent non-closed texture lines can be configured to be opposite; for example, the non-closed texture lines n, n+2, n+4, n+6 . . . are selected and their directions are reversed. Alternatively, directions of all the non-closed texture lines with an even serial number are reversed; or directions of all the non-closed texture lines with an odd serial number are reversed.

The reversion means the starting point and the ending point of each reversed non-closed texture line are swapped. Then starting points and ending points of each two adjacent non-closed texture lines are connected by auxiliary path lines to form a continuous printing line.

In an embodiment, the generation module classifies texture lines in each slice pattern into different groups according to spatial positions of the texture lines, connects endpoints of non-closed texture lines in a first group by auxiliary path lines along the projected contour so that the non-closed texture lines in the first group form a continuous texture line of the first group, and connects continuous texture lines of different groups by auxiliary path lines so that the continuous texture lines of the different groups form a continuous printing line.

It should be understood that when the contour of the model of the to-be-printed object is irregularly shaped, the corresponding projected contour is also irregularly shaped, which may cause difficulty of planning the printing path in the corresponding slice pattern; for example, in the process of generating the slice pattern, a texture line may be cut into two or more non-closed texture lines by the projected contour; although the resulted non-closed texture lines are not connected to each other, after extending them, there are situations where the extended lines overlap because they are originally of the same texture line, in which case the non-closed texture lines cannot be connected using the method shown in FIG. 5.

Therefore, in some embodiments, texture lines in each slice pattern are classified into different groups according to spatial positions of the texture lines; wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints.

After determining the spatial position of each non-closed texture line, the non-closed texture lines are classified into different groups based on predetermined rules. The predetermined rules include, but are not limited to: based on the spatial positions of the non-closed texture lines, non-closed texture lines whose X coordinates are similar (meaning their numerical values are close) are grouped together; or based on the spatial positions of the non-closed texture lines, non-closed texture lines whose Y coordinates are similar are grouped together.

Then, the generation module further connects non-closed texture lines of the same group by auxiliary path lines along the projected contour and turn them into a continuous texture line, and then connects continuous texture lines of different groups by auxiliary path lines so that the continuous texture lines of the different groups form a continuous printing line.

Of course, in some embodiments, the spatial positions of the texture lines in each slice pattern can also be used to determine serial numbers of the non-closed texture lines, and to classify the texture lines so that the non-closed texture lines form a continuous printing line.

For example, the generation module first defines the direction and serial number of each non-closed texture line based on the spatial position of the respective non-closed texture line in the slice pattern, and making the directions of each two non-closed texture lines with adjacent serial numbers opposite to each other; wherein the direction of each non-closed texture line is used to determine the starting point and ending point of the respective non-closed texture line. Then auxiliary path points are configured between the ending point of a first non-closed texture line, and the starting point of a second non-closed texture line adjacent to the first non-closed texture line, in an equidistant manner or an equal division manner; in the equidistant manner, auxiliary path points are sequentially generated between the first non-closed texture line and the second non-closed texture line, with a constant distance between each two adjacent auxiliary path points, and no auxiliary path points are generated when the total distance between the non-closed texture lines is smaller than the constant distance between the auxiliary path points; in the equal division manner, auxiliary path points are generated between the first non-closed texture line and the second non-closed texture line, with the auxiliary path points equally divide the total distance between the non-closed texture lines, and the distances between each two adjacent auxiliary path points are also constant in this case. Further, the generation module performs printing path planning for the slice pattern to generate a cross-sectional pattern based on the auxiliary path points, the starting point and ending point of each non-closed texture line, the projected contour of the model of the to-be-printed object, and each non-closed texture line in the slice pattern, whose detailed process is as follows:

- projecting auxiliary path points and starting points and ending points of the non-closed texture lines onto the projected contour of the model of the to-be-printed object to obtain projected path points, projected starting points and projected ending points, respectively, and connecting the projected ending point of a first non-closed texture line and the projected starting point of a second non-closed texture line adjacent to the first non-closed texture line to obtain connecting lines between adjacent non-closed texture lines. These connecting lines are auxiliary path lines. A connecting line between the ending point of a first non-closed texture line and the starting point of a second non-closed texture line adjacent to the first non-closed texture line passes through projected path points between the ending point of the first non-closed texture line and the starting point of the second non-closed texture line. The auxiliary path lines and non-closed texture lines in each slice pattern together constitute a printing line.

In some cases, when using auxiliary path lines to connect non-closed texture lines into a printing line, there may be a possibility of long auxiliary path lines along the projected contour of the model of the to-be-printed object, and to avoid negative impact of such long auxiliary path lines on the cured structure during printing, the generation module further removes auxiliary path lines whose lengths exceed a predetermined length threshold.

Non-closed texture lines that are no longer joined into a continuous printing line after the above removal may be joined by generating auxiliary path lines outside of the projected contour, as will be described later.

The steps of further processing each slice pattern to generate a corresponding cross-sectional pattern are exemplarily illustrated below.

FIGS. 6A to 6H are schematic diagrams showing a process of further processing each slice pattern to generate a cross-sectional pattern according to one embodiment of the present disclosure.

Here, the generation module assigns serial numbers and directions to non-closed texture lines of the slice pattern and classifies the non-closed texture lines, according to spatial positions of the non-closed texture lines, The serial number of each non-closed texture line is determined based on the Y coordinate of the right endpoint of each non-closed texture line. Specifically, the coordinates of the two endpoints of each non-closed texture line are first defined in a coordinate system, and the non-closed texture line corresponding whose right endpoint has the largest Y coordinate is defined as a base non-closed texture line (i.e., 1012A in FIG. 6A), and non-closed texture lines whose right endpoints have X coordinates close to the X coordinate of the right endpoint of the base non-closed texture line 1012A are classified together as a group, for example, the G1 group. Non-closed texture lines whose right endpoints have X coordinates relatively far from the X coordinate of the right endpoint of the base non-closed texture line are classified together as a group, for example, the G2 group. Among the two endpoints of each non-closed texture line, the one whose X coordinate has a larger magnitude is the starting point and the one whose X coordinate has a smaller magnitude is the ending point, thereby obtaining the direction of the respective non-closed texture line. Non-closed texture lines in the same group are ordered from 1 to N according to the magnitude of Y coordinates of their right endpoints, which means that serial number 1 is assigned to the non-closed texture line whose right endpoint has the largest Y coordinate. As a result, serial numbers, directions, and classification of the non-closed texture lines in a slice pattern are obtained. Serial numbers of non-closed texture lines from different groups can also be numbered consecutively or renumbered as groups. Hereinafter, serial numbers of non-closed texture lines from different groups are numbered consecutively, that is, the last serial number in group G1 and the first serial number 24 in group G2 are consecutive.

Referring again to FIG. 6*b*, the generation module causes each two non-closed texture lines with adjacent serial numbers in the same group to be in opposite directions so that non-closed texture lines in the same group are interconnected in a head-to-tail manner. Referring again to FIG. 6C, where the endpoints of a non-closed texture line are identified with the symbol "x". As shown in FIG. 6D, the generation module connects the ending point of the Nth non-closed texture line to the starting point of the (N+1)th non-closed texture line by a line segment. As shown in FIG. 6E, the generation module generates equidistant auxiliary path points along the line segment between the ending point of the Nth non-closed texture line and the starting point of the (N+1)th non-closed texture line, with the auxiliary path points also identified with "x". It should be noted here that only auxiliary path points are shown in FIG. 6E for the sake of simplicity, but in practice, endpoints of non-closed textures line and auxiliary path points may both be shown. Further, the generation module projects "x" points (i.e., endpoints of non-closed texture lines and auxiliary path points) onto the projected contour of the model of the to-be-printed object to obtain a projected point corresponding to each "x" point. As shown in FIG. 6F, the projected points corresponding to the ending point of a first non-closed texture line and the starting point of a second non-closed texture line are connected by an auxiliary path line, wherein the first non-closed texture line and the second non-closed texture line have adjacent serial numbers; the process is repeated for each two adjacent non-closed texture lines. In FIG. 6G, improper auxiliary path lines within the projected contour are removed by manual means or automatically with a preset length threshold; then the non-closed texture lines are superimposed with the auxiliary path lines shown in FIG. 6G to obtain printing lines as shown in FIG. 6H.

In other cases, where it is not possible for the generation module to connect all the non-closed texture lines in the same slice pattern along the projected contour, they can also be connected by generating auxiliary path lines outside the projected contour.

To this end, in an exemplary embodiment, the generation module connects the non-closed texture lines in the same slice pattern by auxiliary path lines outside the projected contour to obtain a corresponding cross-sectional pattern.

In one embodiment, the endpoints of two non-closed texture lines may be connected outside the projected contour of the model of the to-be-printed object by means of manual drawing by an operator.

In another embodiment, the generation module can enlarge the projected contour (i.e., the original contour) of the model of the to-be-printed object by outward shifting each point of the original contour in a direction normal to the original contour at the respective point, thus generating a virtual contour outside the original contour, then mapping endpoints (i.e., the original endpoints) of not-yet-connected non-closed texture lines of the original contour onto the virtual contour to obtain the mapped endpoints, then connect each of the original endpoints to a corresponding mapped endpoint by auxiliary path lines, and connect the mapped endpoints with each other by auxiliary path lines, thereby joining all the non-closed texture lines into a continuous texture line.

The process of connecting the non-closed texture lines in the same slice pattern by the generation module by auxiliary path lines outside the projected contour will be exemplarily illustrated by an example below.

FIGS. 7A to 7C are schematic diagrams showing a process of connecting endpoints of two non-closed texture lines by auxiliary path lines outside a projected contour according to one embodiment of the present disclosure. Referring first to FIG. 7A, it is assumed that points A and B are endpoints of two non-closed texture lines to be connected. As shown in FIG. 7B, the generation module first outward shifting each point of the original contour 11 in a direction normal to the original contour 11 at the respective point, thus generating a virtual contour 11' outside the original contour 11, and the points A and B on the original contour 11 correspond to points A' and B' on the virtual contour 11', respectively. As shown in FIG. 7C, the generation module connects point A to point A', point B to point B', and A' to point B', such that A-A', A'-B', and B'-B form a connecting path from point A to point B; lines used to connect the points are auxiliary path lines.

Herein, the data-converting module generates 3D printing data according to the spatial position of each printing line in the cross-sectional pattern after the generation module determines the cross-sectional pattern according to the above-mentioned manner. It should be understood that a printing line include individual printing points, so that in one embodiment, the spatial position of a printing line may be described by coordinates of individual printing points of the printing line in the plane in which the corresponding cross-sectional pattern is located. The data-converting module generates 3D printing data based on the coordinates of each printing point, with the 3D printing data being a data set corresponding to printing instructions for controlling printing by a 3D printing device, so that the 3D printing device recognizes the printing instructions in the data set and forms a cured layer corresponding to each cross-sectional pattern layer by layer based on the printing instructions. The printing instructions include G-code instructions and the like.

In an exemplary embodiment, referring again to FIG. 15, the system for generating 3D printing data further comprises an interface module 203, which is used to communicate with other systems or devices so as to send the 3D printing data obtained by the data-converting module to the other systems or devices. For example, the interface module may be communicatively connected to a 3D printing device so as to send the 3D printing data to the 3D printing device so that the 3D printing device prints an object based on the 3D printing data. Further, for example, the interface module may be communicatively connected to other computer systems so as to send the 3D printing data to the other computer systems.

The system for generating 3D printing data in the first aspect of the present disclosure uses interlacing between layers to achieve a fabric structure, or generates an interlaced fabric structural pattern in a layer. As a result, the pattern of each layer can be configured according to various cosmetic and functional requirements, increasing the freedom of design while simplifying and shortening the process from design to production, which is suitable for large-scale production. In addition, the system for generating 3D printing data can optimize printing paths, further improving printing efficiency and printing quality.

In some cases, the step of generating 3D printing data based on cross-sectional patterns in the method for generating 3D printing data of the present disclosure can be omitted in some embodiments, in which case the model of the to-be-printed object is directly generated based on existing 3D printing data.

In view of this, the third aspect of the present disclosure provides a method for generating a 3D printing model. The method for generating a 3D printing model may be performed by a system for generating a 3D printing model. The system for generating a 3D printing model may be implemented by software and/or hardware in a computer. Of course, it may also be implemented through a computer network constructed by a plurality of computers. The user may interact with the system for generating a 3D printing model directly or through a computer terminal communicatively coupled thereto (e.g., the computer terminal may be connected to the system for generating a 3D printing model via the Internet).

The computer comprises a memory, one or more processors, an I/O interface, a network interface, an electronic display, and an input structure.

The memory is used to store at least one program. The memory may include high-speed random-access memory, and may also include non-volatile memory, such as one or more disk storage devices, flash memory, or other non-volatile solid state storage devices.

In some embodiments, the memory may also include memory remote from one or more processors, such as network-attached memory accessible via RF circuits or external ports and communication networks, wherein the communication networks comprise one or more of the Internet, one or more intranets, local area networks (LANs), wide area networks (WANs), storage area networks (SANs), and suitable combinations thereof. The computer may further include a memory controller that controls access to the memory by other components of the computer such as a central processing unit and peripheral interfaces. The memory may include high-speed random access memory, and may also include non-volatile memory, such as one or more disk storage devices, flash memory, or other non-volatile solid state storage devices. The computer may further include a memory controller that controls access to the memory by other components of the computer such as a central processing unit and peripheral interfaces.

The one or more processors may be operably coupled to a network interface to couple the computer to the communication networks in a communicative manner. For example, the network interface may connect the computer to a local area network (e.g., LAN), and/or a wide area network (e.g., WAN). The one or more processors may be operably coupled to an I/O port and an input structure, wherein the I/O port may enable the computer to interact with various other electronic devices, and the input structure may enable a user to interact with the computer. Thus, the input structure may include one or more of buttons, keyboards, mice, touch pads, and the like. In addition, the electronic display may include a touch component that facilitates user input by the occurrence and/or location of a user touching a screen to facilitate the user's selection of an object, printing material, or other printer setting for printing the object. A display interface of the electronic display may include graphical elements such as windows, menus, buttons, dialog boxes, and the like configured to allow the user to specifically select or control at least one aspect of the printing task, such as a model of the to-be-printed object, the printing material used to print the to-be-printed object, and/or the printer settings for the to-be-printed object.

In the embodiments provided below, a fabric structure will be used as an example, but it should be noted that the scope of present disclosure is not limited to the fabric structure, which can be replaced with any printable object that can be 3D printed. Any method that employs the methods of the present disclosure to generate a 3D printing model falls within the scope of the present disclosure.

FIG. 8 shows a flowchart illustrating a method for generating a 3D printing model according to an exemplary embodiment of the present disclosure.

As shown, in step S210, the system for generating a 3D printing model generates a slice pattern based on a predetermined projected contour.

It should be understood that a slice pattern in some embodiments denotes a pattern corresponding to each slice resulted from the slicing of the 3D model of the to-be-printed object; the slicing is generally performed in the Z-axis direction (i.e., the vertical direction) of the 3D model of the to-be-printed object, generating layers of patterns. In the present disclosure, since the 3D model of the to-be-printed fabric is formed by generating a corresponding pattern layer by layer, the at least one slice pattern is essentially equated with the layers of patterns generated during the generation of the 3D printing model. It should be noted that the at least one slice pattern does not necessarily correspond to the layers of patterns of the final 3D model of the to-be-printed fabric; in some embodiments, the at least one slice pattern includes only patterns generated during intermediate steps in the process of generating the layers of patterns of the final 3D model of the to-be-printed fabric, as will be described in detail later. The predetermined projected contour is the projection of the contour of the to-be-printed object onto a slice layer; that is, the projected contour is the boundary represented by the projection of the contour of the model of the to-be-printed object, with the projection in a plane perpendicular to the Z-axis direction (i.e., the vertical direction). The contour of the to-be-printed object may be predetermined or may be drawn ad hoc according to design requirements of the to-be-printed object. For example, if one or more alternative contours of the to-be-printed object are pre-stored in a memory of a system for generating a 3D printing model, a desired contour can be selected from the alternative contours of the to-be-printed object. Again, depending on the design requirements of the to-be-printed object, a contour may be drawn ad hoc to serve as the contour of the to-be-printed object.

A projected contour of the to-be-printed object is used as a boundary, and at least one slice pattern is generated within the boundary. Each of the at least one slice pattern comprises at least one texture line.

The texture line includes lines in the slice pattern, which can be straight lines or curved lines according to actual needs. The texture line may be predetermined or may be drawn ad hoc according to design requirements of the to-be-printed object. For example, if one or more alternative texture lines are pre-stored in the memory of the system for generating a 3D printing model, a desired texture line can be selected from the alternative texture lines. As another example, depending on the design requirements of the to-be-printed object, various straight or curved lines may be drawn ad hoc to serve as the at least one texture line. It should be understood that any figure or shape can be made up of line segments, and each line segment has a starting point and an ending point, which are collectively referred to as endpoints in some embodiments. For the sake of simplicity, lines segments are referred to as lines hereinafter. When a line extends from the starting point and returns to the starting point, the line constitutes a closed line, as opposed to a non-closed line which extends from the starting point and does not return to that starting point, i.e., when at least one of the ends of the start and endpoints of the line is exposed. In the present disclosure, the endpoints of each non-closed texture line are located on the projected contour.

In an exemplary embodiment, the system for generating a 3D printing model uses a contour of the to-be-printed object as projected onto a current slice layer as a boundary, and generates a slice pattern within the boundary.

It should be understood that in some embodiments, the shape of the contour for each slice layer of the model of the to-be-printed object may vary, so that when generating a slice pattern for each layer, the system for generating a 3D printing model uses the projected contour of the model of the to-be-printed object onto the current slice layer as a boundary and generates the slice pattern within the boundary.

Here, the system for generating a 3D printing model first determines a projected contour of the model of the to-be-printed object for a current slice layer, then uses the projected contour of the model of the to-be-printed object onto the current slice layer as a boundary, and generates texture lines in the current slice layer within the boundary, with the endpoints of each non-closed texture line located on the boundary.

In one embodiment, the number of the at least one slice pattern is one, and in order to form an interlaced fabric structure after the printing based on the 3D printing model obtained according to the present method, texture lines in the slice pattern forms an interlaced shape, and the endpoints of each non-closed texture line are located on the projected contour of the model of the to-be-printed object onto the current slice layer.

In another embodiment, the number of the at least one slice pattern is two; texture lines in the same slice pattern are not interlaced with each other, and the endpoints of each non-closed texture line are located on the projected contour of the model of the to-be-printed object onto the current slice layer; but in order to form an interlaced fabric structure after the printing based on the 3D printing model obtained according to the present method, the texture lines in different slice patterns spatially overlap to form the interlaced structure. The at least one slice pattern includes a first slice pattern and a second slice pattern, the first slice pattern comprises first textures lines, and the second slice pattern comprises second textures lines, and projections of the first texture lines onto a plane where the second slice pattern is located partially overlap the second texture lines. In some other embodiments, when the number of the at least one slice pattern is two, texture lines in the same slice pattern may also overlap, which is also able to achieve the technical effect where the projections of the first texture lines onto a plane where the second slice pattern is located partially overlap the second texture lines.

In an exemplary embodiment, the system for generating a 3D printing model further selects a texture plane, and generates the at least one slice pattern from the texture plane according to the projected contour of the model of the to-be-printed object onto the current slice layer.

The texture plane may be predetermined or may be drawn ad hoc according to design requirements of the to-be-printed object. For example, one or more alternative texture planes are pre-stored in the memory of the system for generating a 3D printing model, and a desired texture plane can be selected from the alternative texture planes. As another example, depending on the design requirements of the to-be-printed object, various straight or curved lines may be drawn ad hoc to serve as the texture plane.

After selecting the texture plane, the texture plane is cut according to the projected contour of the model of the to-be-printed object onto the current slice layer, thereby generating the corresponding slice pattern.

In one embodiment, in order to form an interlaced fabric structure after the printing based on the 3D printing model obtained according to the present method, texture lines in each texture plane forms an interlaced shape. The system for generating a 3D printing model crops the texture plane according to the projected contour of the model of the to-be-printed object onto the current slice layer, thereby obtaining a corresponding slice pattern.

In another embodiment, the system for generating a 3D printing model generates at least two texture patterns from a plurality of straight lines and/or at least one curved line, and adjusts horizontal positions of the at least two texture patterns such that their projections onto a same plane partially overlap, to obtain the texture plane.

The texture patterns may be predetermined or may be drawn ad hoc according to design requirements of the to-be-printed object. For example, if one or more alternative texture patterns are pre-stored in the memory of the system for generating a 3D printing model, a desired texture pattern can be selected from the alternative texture patterns. As another example, depending on the design requirements of the to-be-printed object, various straight or curved lines may be drawn ad hoc to form the texture patterns. After at least two texture patterns have been generated, horizontal positions of the at least two texture patterns are adjusted so that their projections onto a same plane partially overlap, to obtain a single-layer texture plane. The method of adjustment includes, but is not limited to, rotating or translating in the planes in which the at least two texture patterns are located. Each texture pattern may include a plurality of straight lines, or may include at least one curved line, or may include at least one straight line and at least one curved line.

The steps for obtaining a texture plane is detailed below with an example.

The system for generating a 3D printing model first selects a texture line and generates a texture pattern based on the texture line. After repeating the above step to obtain two texture patterns, horizontal positions of the two texture patterns are adjusted so that the two texture patterns are interlaced to obtain a texture plane.

It should be understood that, although this example to generate a texture plane by two texture patterns for example, but in practice, the number of the texture patterns can also be configured according to the actual design needs as three, four, five, six, seven, eight, nine, ten, etc., and horizontal positions of these texture patterns are adjusted so that they are interlaced in the same plane, to obtain a fabric with an interlaced structure. In addition, although a curved line is used as the texture line in this example, in practical application, the length, shape, and number of the curved line can be adjusted according to the design requirements, and in some implementations, the curved line can also be replaced with a straight line, and when the texture line is a straight line, the length, shape, and number of the texture line can also be adjusted according to the design requirements, which will not be repeated here.

In one embodiment, after obtaining a texture plane, the texture plane is cut according to the projected contour of the model of the to-be-printed object to obtain a corresponding slice pattern.

Referring again to FIG. 8, step S220 includes: repeating the above step for each printing layer of the to-be-printed object at a spatial location of the respective printing layer, wherein the to-be-printed object comprises a predetermined number of printing layers. The predetermined number of printing layers is within a range including 1 to 20, depending on characteristics of the fabric structure. When the predetermined number of layers is 1, it corresponds to one layer of slice pattern. When the predetermined number is greater than 1, that means multiple layers of slice patterns are included.

Here, when the predetermined number of printing layers is greater than 1, the system for generating a 3D printing model repeats the steps of S210 to generate multiple layers of slice patterns corresponding to the predetermined number of printing layers.

In an embodiment, in order to form an interlaced fabric structure after the printing based on the 3D printed model obtained according to the present method, the system for generating a 3D printing model further adjusts spatial positions of the multiple layers of slice patterns so that texture lines in different layers of slice patterns partially overlap when projected onto the same plane. The spatial positions of the multiple layers of slice patterns can be adjusted by, for example, rotational or translational movement of each slice pattern in the plane in which it is located, so that their projections onto a same plane partially overlap.

In an exemplary embodiment, when the predetermined number of printing layers is greater than 1, the slice patterns are parallel to each other. The system for generating a 3D printing model further adjusts the distances between the slice patterns, the distances are adjustable according to requirements of fabric design, and the distances range from 0.1 mm to 0.4 mm.

In an exemplary embodiment, the system for generating a 3D printing model further performs a connecting step. The connecting step comprises: determining a cross-sectional pattern based on a slice pattern. The system for generating a 3D printing model repeats the connecting step for each printing layer of the to-be-printed object at a spatial location of the respective printing layer, to obtain the 3D printing model corresponding to the model of the to-be-printed object.

Here, a cross-sectional pattern corresponding to each slice pattern is determined based on the slice pattern, and each cross-sectional pattern corresponds to a pattern of a layer printed by the 3D printing device during the execution of the printing task. The system for generating a 3D printing model determines a cross-sectional pattern for each slice pattern at spatial locations, which is repeated for the predetermined number of times, so as to obtain a 3D printing model corresponding to the model of the to-be-printed object based on the cross-sectional patterns. In the present disclosure, the lines in the cross-sectional patterns are defined as printing lines.

In an exemplary embodiment, the system for generating a 3D printing model directly uses each slice pattern as a cross-sectional pattern, in which case the printing lines of a cross-sectional pattern include the texture lines of the corresponding slice pattern.

The system for generating a 3D printing model may also connect non-closed texture lines in the same slice pattern by auxiliary path lines outside the projected contour to obtain a corresponding cross-sectional pattern. At this point, the printing lines of the cross-sectional pattern further include the auxiliary path lines in addition to the texture lines of the corresponding slice pattern.

It should be understood that in some non-surface-exposure 3D printing devices, a cured layer is usually formed by a point-by-point method, resulting in points that need to be connected by a printing path to finally form the cured layer. If the printing path is not planned properly, the printing efficiency and print quality may be negatively impacted. For example, for SLA printing devices, an improper printing path may result in repeated scanning of certain areas, making printing less efficient and creating over-cured areas. Another example is that for fused-deposition-molding-based printing devices, unreasonable printing paths can cause frequent nozzle pullbacks and empty walks (i.e., nozzles moving without printing materials extruded). Therefore, in one embodiment, in each slice pattern, non-closed texture lines are connected to each other by auxiliary path lines to form a printing line, i.e., the printing line includes both the auxiliary path lines and texture lines, and the printing line is used to describe the printing path of a corresponding cross-sectional layer.

Here, since endpoints of each non-closed texture line in a slice pattern are located on the projected contour of the model of the to-be-printed object onto the current slice layer, a printing path can be planned for a corresponding cross-sectional pattern by connecting the non-closed texture lines along the projected contour.

The following is an example to illustrate the step of connecting the non-closed texture lines in the same slice pattern by the auxiliary path lines along the projected contour to obtain a corresponding cross-sectional pattern.

In one embodiment, a number of texture lines are included in the slice pattern and the endpoints of each non-closed texture line fall on the projected contour of the model of the to-be-printed object onto the current slice layer. The system for generating a 3D printing model connects the endpoints of each non-closed texture line along the projected contour by auxiliary path lines, and the texture lines and the auxiliary path lines form a continuous printing line, thereby forming a cross-sectional pattern.

In an embodiment, the system for generating a 3D printing model assigns a serial number to each non-closed texture line of the slice pattern according to a spatial position of the respective non-closed texture line, and connects endpoints of non-closed texture lines with adjacent serial numbers by auxiliary path lines along the projected contour so that the non-closed texture lines in the slice pattern together form a continuous printing line.

Herein, the system for generating a 3D printing model assigns a serial number to each non-closed texture line of the slice pattern according to a spatial position of the respective non-closed texture line, wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints. After determining the spatial position of each non-closed texture line, the system for generating a 3D printing model defines a serial number of each non-closed texture line based on the spatial position of each non-closed texture line. For example, values of serial numbers assigned to non-closed texture lines are positively correlated to X coordinates of the spatial positions of the non-closed texture lines, Y coordinates of the spatial positions of the non-closed texture lines, or respective sums of X coordinates and Y coordinates of the spatial positions of the non-closed texture lines.

After assigning the serial number to each non-closed texture line, the system for generating a 3D printing model connects non-closed texture lines with adjacent serial numbers by auxiliary path lines along the projected contour of the model of the to-be-printed object onto the current slice layer so that non-closed texture lines and auxiliary path lines form a continuous line, i.e., a printing line.

In this case, to improve the printing efficiency, each auxiliary path line is used to connect two closer endpoints of two non-closed texture lines with adjacent serial numbers, for example, two left endpoints of the two non-closed texture lines with the adjacent serial numbers.

In one embodiment, assuming that the two endpoints of each non-closed texture line are denoted with S and E respectively, and each non-closed texture line is denoted with its serial number, the system for generating a 3D printing model initiates a search starting from one endpoint En of a non-closed texture line n, to look for an endpoint Sn+1 of a non-closed texture line n+1, wherein the endpoint Sn+1 is closer to the endpoint En than any other endpoint of the non-closed texture line n+1, and then the system connects the endpoint En and the endpoint Sn+1 by an auxiliary path line. Similarly, the system for generating a 3D printing model then initiates a search starting from an endpoint En+1 of the non-closed texture line n+1, to look for an endpoint Sn+2 of a non-closed texture line n+2, wherein the endpoint Sn+2 is closer to the endpoint En+1 than any other endpoint of the non-closed texture line n+2, and then the system connects the endpoint En+1 and the endpoint Sn+2 by an auxiliary path line.

In another embodiment, after assigning a serial number to each non-closed texture line in the slice pattern based on its spatial location, the direction of each non-closed texture line may be further defined based on magnitudes of the coordinates of its endpoints; for example, among the two endpoints of each non-closed texture line, the one whose X or Y coordinate has a smaller magnitude is the ending point E and the one whose X or Y coordinate has a larger magnitude is the starting point S; for example, among the two endpoints of each non-closed texture line, the one whose X or Y coordinate has a larger magnitude is the ending point E and the one whose X or Y coordinate has a smaller magnitude is the starting point S. For example, endpoints on a first side of the non-closed texture lines are defined as starting points and endpoints on a second side are defined as ending points. Then, directions of each two adjacent non-closed texture lines can be configured to be opposite; for example, the non-closed texture lines n, n+2, n+4, n+6 . . . are selected and their directions are reversed. Alternatively, directions of all the non-closed texture lines with an even serial number are reversed; or directions of all the non-closed texture lines with an odd serial number are reversed.

The reversion means the starting point and the ending point of each reversed non-closed texture line are swapped. Then starting points and ending points of each two adjacent non-closed texture lines are connected by auxiliary path lines to form a continuous printing line.

In an embodiment, the system for generating a 3D printing model classifies texture lines in each slice pattern into different groups according to spatial positions of the texture lines, connects endpoints of non-closed texture lines in a first group by auxiliary path lines along the projected contour so that the non-closed texture lines in the first group form a continuous texture line of the first group, and connects continuous texture lines of different groups by auxiliary path lines so that the continuous texture lines of the different groups form a continuous printing line.

It should be understood that when the contour of the model of the to-be-printed object is irregularly shaped, the corresponding projected contour is also irregularly shaped, which may cause difficulty of planning the printing path in the corresponding slice pattern; for example, in the process of generating the slice pattern, a texture line may be cut into two or more non-closed texture lines by the projected contour in the current slice layer; although the resulted non-closed texture lines are not connected to each other, after extending them, there are situations where the extended lines overlap because they are originally of the same texture line, in which case the non-closed texture lines are relatively complex.

Therefore, in some embodiments, texture lines in each slice pattern are classified into different groups according to spatial positions of the texture lines; wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints.

After determining the spatial position of each non-closed texture line, the non-closed texture lines are classified into different groups based on predetermined rules. The predetermined rules include, but are not limited to: based on the spatial positions of the non-closed texture lines, non-closed texture lines whose X coordinates are similar (meaning their numerical values are close) are grouped together; or based on the spatial positions of the non-closed texture lines, non-closed texture lines whose Y coordinates are similar are grouped together.

Then, the system for generating a 3D printing model further connects non-closed texture lines of the same group by auxiliary path lines along the projected contour for the current slice and turn them into a continuous texture line, and then connects continuous texture lines of different groups by auxiliary path lines so that the continuous texture lines of the different groups form a continuous printing line.

Of course, in some embodiments, the spatial positions of the texture lines in each slice pattern can also be used to determine serial numbers of the non-closed texture lines, and to classify the texture lines so that the non-closed texture lines form a continuous printing line.

For example, the system for generating a 3D printing model first defines the direction and serial number of each non-closed texture line based on the spatial position of the respective non-closed texture line in the slice pattern, and making the directions of each two non-closed texture lines with adjacent serial numbers opposite to each other; wherein the direction of each non-closed texture line is used to determine the starting point and ending point of the respective non-closed texture line. Then auxiliary path points are configured between the ending point of a first non-closed texture line, and the starting point of a second non-closed texture line adjacent to the first non-closed texture line, in an equidistant manner or an equal division manner; in the equidistant manner, auxiliary path points are sequentially generated between the first non-closed texture line and the second non-closed texture line, with a constant distance between each two adjacent auxiliary path points, and no auxiliary path points are generated when the total distance between the non-closed texture lines is smaller than the constant distance between the auxiliary path points; in the equal division manner, auxiliary path points are generated between the first non-closed texture line and the second non-closed texture line, with the auxiliary path points equally divide the total distance between the non-closed texture lines, and the distances between each two adjacent auxiliary path points are also constant in this case. Further, the system for generating a 3D printing model performs printing path planning for the slice pattern to generate a cross-sectional pattern based on the auxiliary path points, the starting point and ending point of each non-closed texture line, the projected contour of the model of the to-be-printed object onto the current slice layer, and each non-closed texture line in the slice pattern, whose detailed process is as follows:

projecting auxiliary path points and starting points and ending points of the non-closed texture lines onto the projected contour of the model of the to-be-printed object onto the current slice layer to obtain projected path points, projected starting points and projected ending points, respectively, and connecting the projected ending point of a first non-closed texture line and the projected starting point of a second non-closed texture line adjacent to the first non-closed texture line to obtain connecting lines between adjacent non-closed texture lines. These connecting lines are auxiliary path lines. A connecting line between the ending point of a first non-closed texture line and the starting point of a second non-closed texture line adjacent to the first non-closed texture line passes through projected path points between the ending point of the first non-closed texture line and the starting point of the second non-closed texture line. The auxiliary path lines and non-closed texture lines in each slice pattern together constitute a printing line.

In some cases, when using auxiliary path lines to connect non-closed texture lines into a printing line, there may be a possibility of long auxiliary path lines along the projected contour of the model of the to-be-printed object onto the current slice layer, and to avoid negative impact of such long auxiliary path lines on the cured structure during printing, the generation module further removes auxiliary path lines whose lengths exceed a predetermined length threshold.

Non-closed texture lines that are no longer joined into a continuous printing line after the above removal may be joined by generating auxiliary path lines outside of the projected contour, as will be described later.

The steps of further processing each slice pattern to generate a corresponding cross-sectional pattern are exemplarily illustrated below.

In one embodiment, the system for generating a 3D printing model assigns serial numbers and directions to non-closed texture lines of the slice pattern and classifies the non-closed texture lines, according to spatial positions of the non-closed texture lines, thereby obtaining the processed slice pattern. In one embodiment, the serial number of each non-closed texture line is determined based on the Y coordinate of the right endpoint of each non-closed texture line. Specifically, the coordinates of the two endpoints of each non-closed texture line are first defined 2 in a coordinate system, and the non-closed texture line corresponding whose right endpoint has the largest Y coordinate is defined as a base non-closed texture line, and non-closed texture lines whose right endpoints have X coordinates close to the X coordinate of the right endpoint of the base non-closed texture line are classified together as a group, for example, the G1 group. Non-closed texture lines whose right endpoints have X coordinates relatively far from the X coordinate of the right endpoint of the base non-closed texture line are classified together as a group, for example, the G2 group. Among the two endpoints of each non-closed texture line, the one whose X coordinate has a larger magnitude is the starting point and the one whose X coordinate has a smaller magnitude is the ending point, thereby obtaining the direction of the respective non-closed texture line. Non-closed texture lines in the same group are ordered from 1 to N according to the magnitude of Y coordinates of their right endpoints, which means that serial number 1 is assigned to the non-closed texture line whose right endpoint has the largest Y coordinate. As a result, serial numbers, directions and classification of the non-closed texture lines in a slice pattern are obtained. Serial numbers of non-closed texture lines from different groups can also be numbered consecutively or renumbered as groups. Hereinafter, serial numbers of non-closed texture lines from different groups are numbered consecutively, that is, the last serial number in group G1 and the first serial number 21 in group G2 are consecutive.

The system for generating a 3D printing model causes each two non-closed texture lines with adjacent serial numbers in the same group to be in opposite directions so that non-closed texture lines in the same group are interconnected in a head-to-tail manner. The system for generating a 3D printing model identifies the endpoints of each non-closed texture line with "x", and connects the ending point of the Nth non-closed texture line to the starting point of the (N+1)th non-closed texture line by a line segment. The system for generating a 3D printing model generates equidistant auxiliary path points along the line segment between the ending point of the Nth non-closed texture line and the starting point of the (N+1)th non-closed texture line, with the auxiliary path points also identified with "x". Further, the system for generating a 3D printing model projects "x" points (i.e., endpoints of non-closed texture lines and auxiliary path points) onto the projected contour on the current slice layer to obtain a projected point corresponding to each "x" point. The system for generating a 3D printing model connects the projected point corresponding to the ending point of a first non-closed texture line and the projected point corresponding to the starting point of a second non-closed texture line by an auxiliary path line, wherein the first non-closed texture line and the second non-closed texture line have adjacent serial numbers, the process is repeated for each two adjacent non-closed texture lines. The system for generating a 3D printing model also removes improper auxiliary path lines within the projected contour by manual means or automatically with a preset length threshold, and then superimposes the non-closed texture lines with the auxiliary path lines to obtain printing lines.

In other cases, where the system for generating a 3D printing model is unable to connect the non-closed texture lines in the same slice pattern along the projected contour, they can also be connected by generating such auxiliary path lines outside the projected contour.

The system for generating a 3D printing model connects non-closed texture lines in the same slice pattern by auxiliary path lines outside the projected contour to obtain a corresponding cross-sectional pattern.

In one embodiment, the endpoints of two non-closed texture lines may be connected outside the projected contour of the model of the to-be-printed object onto the current slice layer by means of manual drawing by an operator.

In another embodiment, the system for generating a 3D printing model can enlarge the projected contour (i.e., the original contour) of the model of the to-be-printed object onto the current slice layer by outward shifting each point of the original contour in a direction normal to the original contour at the respective point, thus generating a virtual contour outside the original contour, then mapping endpoints (i.e., the original endpoints) of not-yet-connected non-closed texture lines of the original contour onto the virtual contour to obtain the mapped endpoints, then connect each of the original endpoints to its corresponding mapped endpoint by auxiliary path lines, and then connect the mapped endpoints with each other by auxiliary path lines, thereby joining all the non-closed texture lines into a continuous texture line.

The process of the system for generating a 3D printing model connecting the non-closed texture lines in the same slice pattern by auxiliary path lines outside the projected contour will be exemplarily illustrated by an example below.

In one embodiment, it is assumed that points A and B are endpoints of two non-closed texture lines to be connected. The system for generating a 3D printing model first outwardly shifts each point of the original contour in a direction normal to the original contour at the respective point for each slice layer, thus generating a virtual contour outside the original contour, and the points A and B on the original contour correspond to points A' and B' on the virtual contour, respectively. The system for generating a 3D printing model connects point A to point A', point B to point B', and A' to point B', such that A-A', A'-B', and B'-B form a connecting path from point A to point B; lines used to connect the points are auxiliary path lines.

After determining each cross-sectional pattern according to the above manner, a 3D printing model corresponding to the model of the to-be-printed object based on the cross-sectional patterns is obtained.

In summary, the method for generating a 3D printing model in the present disclosure uses interlacing between layers to achieve a fabric structure, or generates an interlaced fabric structural pattern in a layer. As a result, the pattern of each layer can be configured according to various cosmetic and functional requirements, increasing the freedom of design while simplifying and shortening the process from design to production, which is suitable for large-scale production. In addition, the method for generating a 3D printing model can optimize printing paths, further improving printing efficiency and printing quality.

Figure 16:
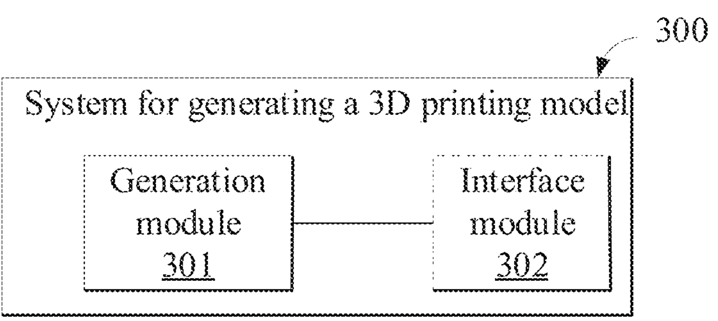
FIG. 16 shows a block diagram of a system for generating a 3D printing model according to one embodiment of the present disclosure.

FIG. 16 shows a block diagram of a system for generating 3D printing model according to one embodiment of the present disclosure. As shown in FIG. 16, the system for generating a 3D printing model 300 comprises a generation module 301.

The generation module 301 generates a slice pattern based on a projected contour of a model of a to-be-printed object.

It should be understood that a slice pattern in some embodiments denotes a pattern corresponding to each slice resulted from the slicing of the 3D model of the to-be-printed object; the slicing is generally performed in the Z-axis direction (i.e., the vertical direction) of the 3D model of the to-be-printed object, generating layers of patterns. In the present disclosure, since the 3D model of the to-be-printed fabric is formed by generating a corresponding pattern layer by layer, the at least one slice pattern is essentially equated with the layers of patterns generated during the generation of the 3D printing model. It should be noted that the at least one slice pattern does not necessarily correspond to the layers of patterns of the final 3D model of the to-be-printed fabric; in some embodiments, the at least one slice pattern includes only patterns generated during intermediate steps in the process of generating the layers of patterns of the final 3D model of the to-be-printed fabric, as will be described in detail later. The predetermined projected contour is the projection of the contour of the to-be-printed object onto a slice layer; that is, the projected contour is the boundary represented by the projection of the contour of the model of the to-be-printed object, with the projection in a plane perpendicular to the Z-axis direction (i.e. the vertical direction). The contour of the to-be-printed object may be predetermined or may be drawn ad hoc according to design requirements of the to-be-printed object. For example, if one or more alternative contours of the to-be-printed object are pre-stored in a memory of the system for generating a 3D printing model, a desired contour can be selected from the alternative contours of the to-be-printed object. Again, depending on the design requirements of the to-be-printed object, a contour may be drawn ad hoc to serve as the contour of the to-be-printed object.

A projected contour of the to-be-printed object is used as a boundary, and at least one slice pattern is generated within the boundary. Each of the at least one slice pattern comprises at least one texture line.

The texture line includes lines in the slice pattern, which can be straight lines or curved lines according to actual needs. The texture line may be predetermined or may be drawn ad hoc according to design requirements of the to-be-printed object. For example, if one or more alternative texture lines are pre-stored in the memory of the system for generating a 3D printing model, a desired texture line can be selected from the alternative texture lines. As another example, depending on the design requirements of the to-be-printed object, various straight or curved lines may be drawn ad hoc to serve as the at least one texture line. It should be understood that any figure or shape can be made up of line segments, and each line segment has a starting point and an ending point, which are collectively referred to as endpoints in some embodiments. For the sake of simplicity, lines segments are referred to as lines hereinafter. When a line extends from the starting point and returns to the starting point, the line constitutes a closed line, as opposed to a non-closed line which extends from the starting point and does not return to that starting point, i.e., when at least one of the ends of the start and endpoints of the line is exposed. In the present disclosure, the endpoints of each non-closed texture line are located on the projected contour.

In an exemplary embodiment, the generation module uses a contour of the to-be-printed object as projected onto a current slice layer as a boundary, and generates a slice pattern within the boundary.

It should be understood that in some embodiments, the shape of the contour for each slice layer of the model of the to-be-printed object may vary, so that when generating a slice pattern for each layer, the generation module uses the projected contour of the model of the to-be-printed object onto the current slice layer as a boundary and generates the slice pattern within the boundary.

Here, the generation module first determines a projected contour of the model of the to-be-printed object for a current slice layer, then uses the projected contour of the model of the to-be-printed object onto the current slice layer as a boundary, and generates texture lines in the current slice layer within the boundary, with the endpoints of each non-closed texture line located on the boundary.

In one embodiment, the number of the at least one slice pattern is one, and in order to form an interlaced fabric structure after the printing based on the 3D printing model obtained according to the present method, texture lines in the slice pattern forms an interlaced shape, and the endpoints of each non-closed texture line are located on the projected contour of the model of the to-be-printed object onto the current slice layer.

In another embodiment, the number of the at least one slice pattern is two; texture lines in the same slice pattern are not interlaced with each other, and the endpoints of each non-closed texture line are located on the projected contour of the model of the to-be-printed object onto the current slice layer; but in order to form an interlaced fabric structure after the printing based on the 3D printing model obtained according to the present method, the texture lines in different slice patterns spatially overlap to form the interlaced structure. The at least one slice pattern includes a first slice pattern and a second slice pattern, the first slice pattern comprises first textures lines, and the second slice pattern comprises second textures lines, and projections of the first texture lines onto a plane where the second slice pattern is located partially overlap the second texture lines. In some other embodiments, when the number of the at least one slice pattern 10 is two, texture lines in the same slice pattern 10 may also overlap, which is also able to achieve the technical effect where the projections 10' of the first texture lines onto a plane where the second slice pattern is located partially overlap the second texture lines.

In an exemplary embodiment, the generation module further selects a texture plane, and generates the at least one slice pattern from the texture plane according to the projected contour of the model of the to-be-printed object onto the current slice layer.

The texture planes may be predetermined or may be drawn ad hoc according to design requirements of the to-be-printed object. For example, if one or more alternative texture planes are pre-stored in the memory of the system for generating a 3D printing model, a desired texture plane can be selected from the alternative texture planes. As another example, depending on the design requirements of the to-be-printed object, various straight or curved lines may be drawn ad hoc to serve as the texture planes.

After selecting the texture plane, the texture plane is cut according to the projected contour of the model of the to-be-printed object onto the current slice layer, thereby generating the corresponding slice pattern.

In one embodiment, in order to form an interlaced fabric structure after the printing based on the 3D printing model obtained according to the present method, texture lines in each texture plane forms an interlaced shape. The generation module crops the texture plane according to the projected contour of the model of the to-be-printed object onto the current slice layer, thereby obtaining a corresponding slice pattern.

In another embodiment, the generation module generates at least two texture patterns based on a plurality of straight lines and/or at least one curved line, and adjusts the horizontal position of the at least two texture patterns so that their projections onto a same plane partially overlap, to obtain the texture plane.

The texture pattern may be predetermined or may be drawn ad hoc according to design requirements of the to-be-printed object. For example, if one or more alternative texture patterns are pre-stored in the memory of the system for generating a 3D printing model, a desired texture line can be selected from the alternative texture patterns. As another example, depending on the design requirements of the to-be-printed object, various straight or curved lines may be drawn ad hoc to form the texture patterns. After at least two texture patterns have been generated, horizontal positions of the at least two texture patterns are adjusted so that their projections onto a same plane partially overlap, to obtain a single-layer texture plane. The method of adjustment includes, but is not limited to, rotational or translational movement of the at least two texture patterns in the plane in which they are located. Each texture pattern may include a plurality of straight lines, or may include at least one curved line, or may include at least one straight line and at least one curved line.

The steps for obtaining a single-layer texture plane is detailed below with an example.

The generation module first selects a texture line and generates a texture pattern based on the texture line. After repeating the above step to obtain two texture patterns, horizontal positions of the two texture patterns are adjusted so that the two texture patterns are interlaced to obtain a texture plane.

It should be understood that, although this example to generate a texture plane by two texture patterns for example, but in practice, the number of the texture patterns can also be configured according to the actual design needs as three, four, five, six, seven, eight, nine, ten, etc., and horizontal positions of these texture patterns are adjusted so that they are interlaced in the same plane, to obtain a fabric with an interlaced structure. In addition, although a curved line is used as the texture line in this example, in practical application, the length, shape, and number of the curved line can be adjusted according to the design requirements, and in some implementations, the curved line can also be replaced with a straight line, and when the texture line is a straight line, the length, shape, and number of the texture line can also be adjusted according to the design requirements, which will not be repeated here.

In one embodiment, after obtaining a texture plane, the texture plane is cut according to the projected contour of the model of the to-be-printed object onto the current slice layer, to obtain a corresponding slice pattern.

The generation module repeats the above step for each printing layer of the to-be-printed object at a spatial location of the respective printing layer.

The to-be-printed object comprises a predetermined number of printing layers. The predetermined number of the printing layers is within a range including 1 to 20, depending on characteristics of the fabric structure. When the predetermined number of the printing layers is 1, that means one layer of slice pattern is generated. When the predetermined number is greater than 1, that means multiple layers of slice patterns are included.

Here, when the predetermined number of the printing layers is greater than 1, the generation module repeats the steps of generating a slice pattern, to generate multiple layers of slice patterns corresponding to the predetermined number of printing layers.

In an embodiment, in order to form an interlaced fabric structure after the printing based on the 3D printed model obtained according to the present method, the generation module further adjusts spatial positions of the multiple layers of slice patterns so that texture lines in different layers of slice patterns partially overlap when projected onto the same plane. The spatial positions of the multiple layers of slice patterns can be adjusted by, for example, rotational or translational movement of each slice pattern in the plane in which it is located, so that texture lines in different layers of slice patterns partially overlap when projected onto a same plane.

In an exemplary embodiment, when the predetermined number of printing layers is greater than 1, the slice patterns are parallel to each other, the generation module further adjusts the distances between the slice patterns, and the distances are adjustable according to requirements of fabric design, and the distances range from 0.1 mm to 0.4 mm.

In an exemplary embodiment, the generation module further performs a connecting step. The connecting step comprises: determining a cross-sectional pattern based on a slice pattern. The generation module repeats the connecting step for each printing layer of the to-be-printed object at a spatial location of the respective printing layer, to obtain the 3D printing model corresponding to the model of the to-be-printed object.

Here, a cross-sectional pattern corresponding to each slice pattern is first determined based on the slice pattern, and each cross-sectional pattern corresponds to a pattern of a layer printed by the 3D printing device during the execution of the printing task. The generation module determines a cross-sectional pattern for each slice pattern at spatial locations, which is repeated for the predetermined number of times, so as to obtain a 3D printing model corresponding to the model of the to-be-printed object based on the cross-sectional patterns. In the present disclosure, the lines in each cross-sectional pattern are defined as printing lines.

In an exemplary embodiment, the generation module directly uses each slice pattern as a cross-sectional pattern, in which case the printing lines of a cross-sectional pattern include the texture lines of the corresponding slice pattern.

The generation module may also connect non-closed texture lines in the same slice pattern by auxiliary path lines along the projected contour to obtain a cross-sectional pattern corresponding to the slice pattern. At this point, the printing lines of the cross-sectional pattern further include the auxiliary path lines in addition to the texture lines of the corresponding slice pattern.

It should be understood that in some non-surface-exposure 3D printing devices, a cured layer is usually formed by a point-by-point method, resulting in points that need to be connected by a printing path to finally form the cured layer. If the printing path is not planned properly, the printing efficiency and print quality may be negatively impacted. For example, for SLA printing devices, an improper printing path may result in repeated scanning of certain areas, making printing less efficient and creating over-cured areas. Another example is that for fused-deposition-molding-based printing devices, unreasonable printing paths can cause frequent nozzle pullbacks and empty walks (i.e., nozzles moving without printing materials extruded). Therefore, in one embodiment, in each slice pattern, non-closed texture lines are connected to each other by auxiliary path lines to form a printing line, i.e., the printing line includes both the auxiliary path lines and texture lines, and the printing line is used to describe the printing path of a corresponding cross-sectional layer.

Here, since endpoints of each non-closed texture line in a slice pattern are located on the projected contour of the model of the to-be-printed object onto the current slice layer, a printing path can be planned for a corresponding cross-sectional pattern by connecting the non-closed texture lines along the projected contour.

The following is an example to illustrate the step of connecting the non-closed texture lines in the same slice pattern by the auxiliary path lines along the projected contour to obtain a corresponding cross-sectional pattern.

In one embodiment, a number of texture lines are included in the slice pattern and the endpoints of each non-closed texture line fall on the projected contour of the model of the to-be-printed object onto the current slice layer. The generation module connects the endpoints of the non-closed texture lines along the projected contour by auxiliary path lines, and the texture lines and the auxiliary path lines form a continuous printing line, thereby forming a cross-sectional pattern.

In an embodiment, the generation module assigns a serial number to each non-closed texture line of the slice pattern according to a spatial position of the respective non-closed texture line, and connects endpoints of non-closed texture lines with adjacent serial numbers by auxiliary path lines along the projected contour so that the non-closed texture lines in the slice pattern together form a continuous printing line.

Herein, the generation module assigns a serial number to each non-closed texture line of the slice pattern according to a spatial position of the respective non-closed texture line, wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints. After determining the spatial position of each non-closed texture line, the system for generating 3D printing data defines a serial number of each non-closed texture line based on the spatial position of each non-closed texture line. For example, values of serial numbers assigned to non-closed texture lines are positively correlated to X coordinates of the spatial positions of the non-closed texture lines, Y coordinates of the spatial positions of the non-closed texture lines, or respective sums of X coordinates and Y coordinates of the spatial positions of the non-closed texture lines.

After assigning the serial number to each non-closed texture line, the system for generating 3D printing data connects non-closed texture lines with adjacent serial numbers by auxiliary path lines along the projected contour of the model of the to-be-printed object onto the current slice layer so that non-closed texture lines and auxiliary path lines form a continuous line, i.e., a printing line.

In this case, to improve the printing efficiency, each auxiliary path line is used to connect two closer endpoints of two non-closed texture lines with adjacent serial numbers, for example, two left endpoints of the two non-closed texture lines with the adjacent serial numbers.

In one embodiment, assuming that the two endpoints of each non-closed texture line are denoted with S and E respectively, and each non-closed texture line is denoted with its serial number, the system for generating a 3D printing model initiates a search starting from one endpoint En of a non-closed texture line n, to look for an endpoint Sn+1 of a non-closed texture line n+1, wherein the endpoint Sn+1 is closer to the endpoint En than any other endpoint of the non-closed texture line n+1, and then the system connects the endpoint En and the endpoint Sn+1 by an auxiliary path line. Similarly, the system for generating a 3D printing model then initiates a search starting from an endpoint En+1 of the non-closed texture line n+1, to look for an endpoint Sn+2 of a non-closed texture line n+2, wherein the endpoint Sn+2 is closer to the endpoint En+1 than any other endpoint of the non-closed texture line n+2, and then the system connects the endpoint En+1 and the endpoint Sn+2 by an auxiliary path line.

In another embodiment, after assigning a serial number to each non-closed texture line in the slice pattern based on its spatial location, the direction of each non-closed texture line may be further defined based on magnitudes of the coordinates of its endpoints; for example, among the two endpoints of each non-closed texture line, the one whose X or Y coordinate has a smaller magnitude is the ending point E and the one whose X or Y coordinate has a larger magnitude is the starting point S; for example, among the two endpoints of each non-closed texture line, the one whose X or Y coordinate has a larger magnitude is the ending point E and the one whose X or Y coordinate has a smaller magnitude is the starting point S. For example, endpoints on a first side of the non-closed texture lines are defined as starting points and endpoints on a second side are defined as ending points. Then, directions of each two adjacent non-closed texture lines can be configured to be opposite; for example, the non-closed texture lines n, n+2, n+4, n+6 . . . are selected and their directions are reversed. Alternatively, directions of all the non-closed texture lines with an even serial number are reversed; or directions of all the non-closed texture lines with an odd serial number are reversed.

The reversion means the starting point and the ending point of each reversed non-closed texture line are swapped. Then starting points and ending points of each two adjacent non-closed texture lines are connected by auxiliary path lines to form a continuous printing line.

In an embodiment, the generation module classifies texture lines in each slice pattern into different groups according to spatial positions of the texture lines, connects endpoints of non-closed texture lines in a first group by auxiliary path lines along the projected contour so that the non-closed texture lines in the first group form a continuous texture line of the first group, and connects continuous texture lines of different groups by auxiliary path lines so that the continuous texture lines of the different groups form a continuous printing line.

It should be understood that when the contour of the model of the to-be-printed object is irregularly shaped, the corresponding projected contour is also irregularly shaped, which may cause difficulty of planning the printing path in the corresponding slice pattern; for example, in the process of generating the slice pattern, a texture line may be cut into two or more non-closed texture lines by the projected contour in the current slice layer; although the resulted non-closed texture lines are not connected to each other, after extending them, there are situations where the extended lines overlap because they are originally of the same texture line, in which case the non-closed texture lines are relatively complex.

Therefore, in some embodiments, texture lines in each slice pattern are classified into different groups according to spatial positions of the texture lines; wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints.

After determining the spatial position of each non-closed texture line, the non-closed texture lines are classified into different groups based on predetermined rules. The predetermined rules include, but are not limited to: based on the spatial positions of the non-closed texture lines, non-closed texture lines whose X coordinates are similar (meaning their numerical values are close) are grouped together; or based on the spatial positions of the non-closed texture lines, non-closed texture lines whose Y coordinates are similar are grouped together.

Then, the generation module further connects non-closed texture lines of the same group by auxiliary path lines along the projected contour onto the current slice layer and turn them into a continuous texture line, and then connects continuous texture lines of different groups by auxiliary path lines so that the continuous texture lines of the different groups form a continuous printing line.

Of course, in some embodiments, the spatial positions of the texture lines in each slice pattern can also be used to determine serial numbers of the non-closed texture lines, and to classify the texture lines so that the non-closed texture lines form a continuous printing line.

For example, the generation module first defines the direction and serial number of each non-closed texture line based on the spatial position of the respective non-closed texture line in the slice pattern, and making the directions of each two non-closed texture lines with adjacent serial numbers opposite to each other; wherein the direction of each non-closed texture line is used to determine the starting point and ending point of the respective non-closed texture line. Then auxiliary path points are configured between the ending point of a first non-closed texture line, and the starting point of a second non-closed texture line adjacent to the first non-closed texture line, in an equidistant manner or an equal division manner; in the equidistant manner, auxiliary path points are sequentially generated between the first non-closed texture line and the second non-closed texture line, with a constant distance between each two adjacent auxiliary path points, and no auxiliary path points are generated when the total distance between the non-closed texture lines is smaller than the constant distance between the auxiliary path points; in the equal division manner, auxiliary path points are generated between the first non-closed texture line and the second non-closed texture line, with the auxiliary path points equally divide the total distance between the non-closed texture lines, and the distances between each two adjacent auxiliary path points are also constant in this case. Further, the generation module performs printing path planning for the slice pattern to generate a cross-sectional pattern based on the auxiliary path points, the starting point and ending point of each non-closed texture line, the projected contour of the model of the to-be-printed object onto the current slice layer, and each non-closed texture line in the slice pattern, whose detailed process is as follows:

projecting auxiliary path points and starting points and ending points of the non-closed texture lines onto the projected contour onto the current slice layer to obtain projected path points, projected starting points and projected ending points, respectively, and connecting projected ending point of a first non-closed texture line and the projected starting point of a second non-closed texture line adjacent to the first non-closed texture line to obtain connecting lines between adjacent non-closed texture lines. These connecting lines are auxiliary path lines. A connecting line between the ending point of a first non-closed texture line and the starting point of a second non-closed texture line adjacent to the first non-closed texture line passes through projected path points between the ending point of the first non-closed texture line and the starting point of the second non-closed texture line. The auxiliary path lines and non-closed texture lines in each slice pattern together constitute a printing line.

In some cases, when using auxiliary path lines to connect non-closed texture lines into a printing line, there may be a possibility of long auxiliary path lines along the projected contour of the model of the to-be-printed object onto the current slice layer, and to avoid negative impact of such long auxiliary path lines on the cured structure during printing, the generation module further removes auxiliary path lines whose lengths exceed a predetermined length threshold.

Non-closed texture lines that are no longer joined into a continuous printing line after the above removal may be joined by generating auxiliary path lines outside of the projected contour, as will be described later.

The steps of further processing each slice pattern to generate a corresponding cross-sectional pattern are exemplarily illustrated below.

In one embodiment, the generation module assigns serial numbers and directions to non-closed texture lines of the slice pattern and classifies the non-closed texture lines, according to spatial positions of the non-closed texture lines, thereby obtaining the processed slice pattern. In one embodiment, the serial number of each non-closed texture line is determined based on the Y coordinate of the right endpoint of each non-closed texture line. Specifically, the coordinates of the two endpoints of each non-closed texture line are first defined in a coordinate system, and the non-closed texture line corresponding whose right endpoint has the largest Y coordinate is defined as a base non-closed texture line, and non-closed texture lines whose endpoints have X coordinates close to the X coordinate of the right endpoint of the base non-closed texture line are classified together as a group, for example, the G1 group. Non-closed texture lines whose right endpoints have X coordinates relatively far from the X coordinate of the right endpoint of the base non-closed texture line are classified together as a group, for example, the G2 group. Among the two endpoints of each non-closed texture line, the one whose X coordinate has a larger magnitude is the starting point and the one whose X coordinate has a smaller magnitude is the ending point, thereby obtaining the direction of the respective non-closed texture line. Non-closed texture lines in the same group are ordered from 1 to N according to the magnitude of Y coordinates of their right endpoints. As a result, serial numbers, directions, and classification of the non-closed texture lines in a slice pattern are obtained. Serial numbers of non-closed texture lines from different groups can also be numbered consecutively or renumbered as groups. Hereinafter, serial numbers of non-closed texture lines from different groups are numbered consecutively, that is, the last serial number in group G1 and the first serial number in group G2 are consecutive.

The generation module causes each two non-closed texture lines with adjacent serial numbers in the same group to be in opposite directions so that non-closed texture lines in the same group are interconnected in a head-to-tail manner. The generation module identifies the endpoints of each non-closed texture line with "x", and connects the ending point of the Nth non-closed texture line to the starting point of the (N+1)th non-closed texture line by a line segment. The generation module generates equidistant auxiliary path points along the line segment between the ending point of the Nth non-closed texture line and the starting point of the (N+1)th non-closed texture line, with the auxiliary path points also identified with "x". Further, the generation module projects "x" points (i.e., endpoints of non-closed texture lines and auxiliary path points) onto the projected contour on the current slice layer to obtain a projected point corresponding to each "x" point. The generation module connects the projected point corresponding to the ending point of a first non-closed texture line and the projected point corresponding to the starting point of a second non-closed texture line by an auxiliary path line, wherein the first non-closed texture line and the second non-closed texture line have adjacent serial numbers, the process is repeated for each two adjacent non-closed texture lines. The generation module also removes improper auxiliary path lines within the projected contour by manual means or automatically with a preset length threshold, and then superimposes the non-closed texture lines with the auxiliary path lines to obtain printing lines.

In other cases, where it is not possible for the generation module to connect all the non-closed texture lines in the same slice pattern along the projected contour, they can also be connected by generating auxiliary path lines outside the projected contour.

To this end, in an exemplary embodiment, the generation module connects the non-closed texture lines in the same slice pattern by auxiliary path lines outside the projected contour to obtain a corresponding cross-sectional pattern.

In one embodiment, the endpoints of two non-closed texture lines may be connected outside the projected contour of the model of the to-be-printed object onto the current slice layer by means of manual drawing by an operator.

In another embodiment, the generation module can enlarge the projected contour (i.e., the original contour) of the model of the to-be-printed object onto the current slice layer by outward shifting each point of the original contour in a direction normal to the original contour at the respective point, thus generating a virtual contour outside the original contour, then mapping endpoints (i.e., the original endpoints) of not-yet-connected non-closed texture lines of the original contour onto the virtual contour, then connect each of the original endpoints to its corresponding mapped endpoint by auxiliary path lines, and then connect the mapped endpoints with each other by auxiliary path lines, thereby joining all the non-closed texture lines into a continuous texture line.

The process of connecting the non-closed texture lines in the same slice pattern by the generation module by auxiliary path lines outside the projected contour will be exemplarily illustrated by an example below.

In one embodiment, it is assumed that points A and B are endpoints of two non-closed texture lines to be connected. The generation module first outwardly shifts each point of the original contour in a direction normal to the original contour at the respective point for each slice layer, thus generating a virtual contour outside the original contour, and the points A and B on the original contour correspond to points A' and B' on the virtual contour, respectively. The generation module connects point A to point A', point B to point B', and A' to point B', such that A-A', A'-B', and B'-B form a connecting path from point A to point B; lines used to connect the points are auxiliary path lines.

After determining each cross-sectional pattern according to the above manner, a 3D printing model corresponding to the model of the to-be-printed object based on the cross-sectional patterns is obtained.

In an exemplary embodiment, referring again to FIG. 16, the system for generating a 3D printing model further comprises an interface module 302, which is used to communicate with other systems or devices so as to send the 3D printing model to the other systems or devices. Further, for example, the interface module may be communicatively connected to other computer systems so as to send the 3D printing model to the other computer systems.

In summary, the system for generating a 3D printing model in the present disclosure uses interlacing between layers to achieve a fabric structure, or generates an interlaced fabric structural pattern in a layer. As a result, the pattern of each layer can be configured according to various cosmetic and functional requirements, increasing the freedom of design while simplifying and shortening the process from design to production, which is suitable for large-scale production. In addition, the system for generating a 3D printing model can optimize printing paths, further improving printing efficiency and printing quality.

In some cases, the method of the present disclosure can also acquire an existing model of the to-be-printed object and perform printing path planning for each slice of the model to improve the efficiency and quality of printing.

It should be understood that in some non-surface-exposure 3D printing devices, a cured layer is usually formed by a point-by-point method, resulting in points that need to be connected by a printing path to finally form the cured layer. If the printing path is not planned properly, the printing efficiency and print quality may be negatively impacted. For example, for SLA printing devices, an improper printing path may result in repeated scanning of certain areas, making printing less efficient and creating over-cured areas. Another example is that for fused-deposition-molding-based printing devices, unreasonable printing paths can cause frequent nozzle pullbacks and empty walks (i.e., nozzles moving without printing materials extruded).

In view of this, the fifth aspect of the present disclosure provides a method for planning a 3D printing path.

The method for planning a 3D printing path may be performed by a system for planning a 3D printing path. The system for planning a 3D printing path may be implemented by software and/or hardware in a computer. Of course, it may also be implemented through a computer network constructed by a plurality of computers. The user may interact with the system for planning a 3D printing path directly or through a computer terminal communicatively coupled thereto (e.g., the computer terminal may be connected to the system for planning a 3D printing path via the Internet).

The computer comprises a memory, one or more processors, an I/O interface, a network interface, an electronic display, and an input structure.

The memory is used to store at least one program. The memory may include high-speed random access memory, and may also include non-volatile memory, such as one or more disk storage devices, flash memory, or other non-volatile solid state storage devices.

In some embodiments, the memory may also include memory remote from one or more processors, such as network-attached memory accessible via RF circuits or external ports and communication networks, wherein the communication networks comprise one or more of the Internet, one or more intranets, local area networks (LANs), wide area networks (WANs), storage area networks (SANs), and suitable combinations thereof. The computer may further include a memory controller that controls access to the memory by other components of the computer such as a central processing unit and peripheral interfaces. The memory may include high-speed random access memory, and may also include non-volatile memory, such as one or more disk storage devices, flash memory, or other non-volatile solid state storage devices. The computer may further include a memory controller that controls access to the memory by other components of the computer such as a central processing unit and peripheral interfaces.

The one or more processors may be operably coupled to a network interface to couple the computer to the communication networks in a communicative manner. For example, the network interface may connect the computer to a local area network (e.g., LAN), and/or a wide area network (e.g., WAN). The one or more processors may be operably coupled to an I/O port and an input structure, the I/O port may enable the computer to interact with various other electronic devices, and the input structure may enable a user to interact with the computer. Thus, the input structure may include one or more of buttons, keyboards, mice, touch pads, and the like. In addition, the electronic display may include a touch component that detects user input by the occurrence and/or location of a user touching a screen to facilitate the user's selection of printing material, or other printer setting for printing the object. A display interface of the electronic display may include graphical elements such as windows, menus, buttons, dialog boxes, and the like configured to allow the user to specifically select or control at least one aspect of the printing task, such as auxiliary path lines, the printing material used to print the to-be-printed object, and/or the printer settings for the to-be-printed object.

In the embodiments provided below, a fabric structure will be used as an example, but it should be noted that the scope of present disclosure is not limited to the fabric structure, which can be replaced with any printable object that can be 3D printed. Any method that employs the methods of the present disclosure to generate a 3D printing path falls within the scope of the present disclosure.

Figure 9:
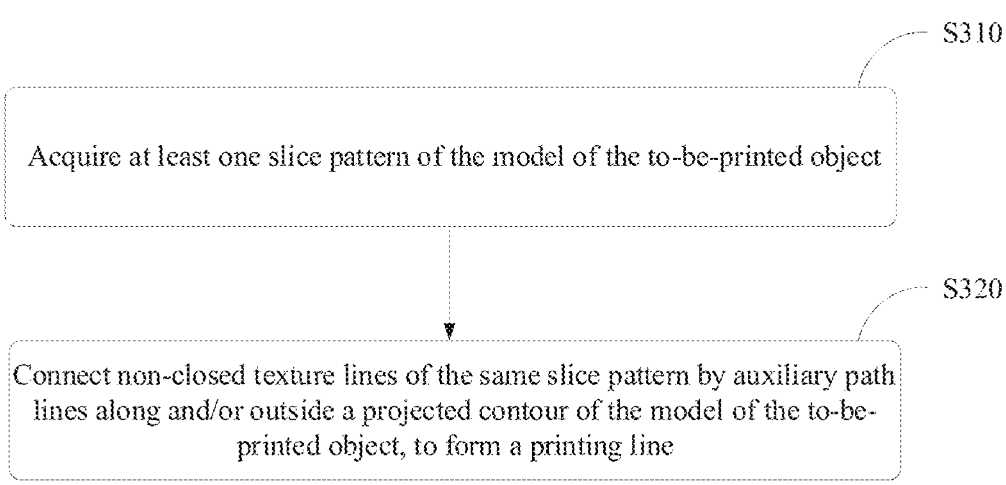
FIG. 9 is a flowchart illustrating a method for planning a 3D printing path according to one embodiment of the present disclosure.

FIG. 9 shows a flowchart illustrating a method for planning a 3D printing path according to an exemplary embodiment of the present disclosure.

As shown in FIG. 9, in step S310, the system for planning a 3D printing path acquires at least one slice pattern of the model of the to-be-printed object. Each of the at least one slice pattern comprises at least one texture line.

It should be understood that a slice pattern in some embodiments denotes a pattern corresponding to each slice resulted from the slicing of the 3D model of the to-be-printed object; the slicing is generally performed in the Z-axis direction (i.e., the vertical direction) of the 3D model of the to-be-printed object, generating layers of patterns. The at least one slice pattern may be generated using a method as in the previous embodiments of the present disclosure, or may be from slice patterns of a 3D printed model drawn by other means and sent to the system for planning a 3D printing path for further processing. The texture line includes lines in the slice pattern, which can be straight lines or curved lines according to actual needs. It should be understood that any figure or shape can be made up of line segments, and each line segment has a starting point and an ending point, which are collectively referred to as endpoints in some embodiments. For the sake of simplicity, lines segments are referred to as lines hereinafter. When a line extends from the starting point and returns to the starting point, the line constitutes a closed line, as opposed to a non-closed line which extends from the starting point and does not return to that starting point, i.e., when at least one of the ends of the start and endpoints of the line is exposed.

Referring again to FIG. 9, in step S320, the system for planning a 3D printing path connects non-closed texture lines of the same slice pattern by auxiliary path lines along and/or outside a projected contour of the model of the to-be-printed object, to form a printing line, The printing line comprises texture lines and auxiliary path lines of the slice pattern, and corresponds to an operation path of a nozzle of the 3D printing device during printing.

It should be understood that the model of the to-be-printed object is a three-dimensional model of the to-be-printed object, and that when each layer of the model of the to-be-printed object has the same contour, a projection thereof is a projection of the contour of the entire model of the to-be-printed object (when they are projected on to the same plane). When different layers of the model of the to-be-printed object have differently shaped contours, the term “projected contour” used when describing connecting operations for a slice pattern by auxiliary path lines refers to the projection of the contour of the model of the to-be-printed object onto a current slice layer, wherein the model may include a plurality of slice layers.

In an exemplary embodiments, for slice patterns where the endpoints of each non-closed texture line are located on the respective projected contour, or to reduce the impact of auxiliary path lines on the structure of the respective printing layer itself during printing, etc., the system for planning a 3D printing path connects the non-closed texture lines in the same slice pattern by the auxiliary path lines along the projected contour to obtain the printing line.

The following is an example to illustrate the step of connecting the non-closed texture lines in the same slice pattern by the auxiliary path lines along the projected contour.

In one embodiment, a number of texture lines are included in a slice pattern and the endpoints of each non-closed texture line fall on the projected contour of the model of the to-be-printed object onto the current slice layer. The system for planning a 3D printing path connects the endpoints of each non-closed texture line along the projected contour by auxiliary path lines, and the texture lines and the auxiliary path lines form a continuous printing line.

In an embodiment, the system for planning a 3D printing path assigns a serial number to each non-closed texture line of the slice pattern according to a spatial position of the respective non-closed texture line, and connects endpoints of non-closed texture lines with adjacent serial numbers by auxiliary path lines along the projected contour so that the non-closed texture lines in the slice pattern together form a continuous printing line.

Herein, the system for planning a 3D printing path assigns a serial number to each non-closed texture line of the slice pattern according to a spatial position of the respective non-closed texture line, wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints. After determining the spatial position of each non-closed texture line, the system for planning a 3D printing path defines a serial number of each non-closed texture line based on the spatial position of each non-closed texture line. For example, values of serial numbers assigned to non-closed texture lines are positively correlated to X coordinates of the spatial positions of the non-closed texture lines, Y coordinates of the spatial positions of the non-closed texture lines, or respective sums of X coordinates and Y coordinates of the spatial positions of the non-closed texture lines.

After assigning the serial number to each non-closed texture line, the system for planning a 3D printing path connects non-closed texture lines with adjacent serial numbers by auxiliary path lines along the projected contour of the model of the to-be-printed object onto the current slice layer, so that non-closed texture lines and auxiliary path lines form a continuous line, i.e., a printing line.

In this case, to improve the printing efficiency, each auxiliary path line is used to connect two closer endpoints of two non-closed texture lines with adjacent serial numbers, for example, two left endpoints of the two non-closed texture lines with the adjacent serial numbers.

In one embodiment, assuming that the two endpoints of each non-closed texture line are denoted with S and E respectively, and each non-closed texture line is denoted with its serial number, the system for planning a 3D printing path initiates a search starting from one endpoint En of a non-closed texture line n, to look for an endpoint Sn+1 of a non-closed texture line n+1, wherein the endpoint Sn+1 is closer to the endpoint En than any other endpoint of the non-closed texture line n+1, and then the system connects the endpoint En and the endpoint Sn+1 by an auxiliary path line. Similarly, the system for generating a 3D printing model then initiates a search starting from an endpoint En+1 of the non-closed texture line n+1, to look for an endpoint Sn+2 of a non-closed texture line n+2, wherein the endpoint Sn+2 is closer to the endpoint En+1 than any other endpoint of the non-closed texture line n+2, and then the system connects the endpoint En+1 and the endpoint Sn+2 by an auxiliary path line.

In another embodiment, after assigning a serial number to each non-closed texture line in the slice pattern based on its spatial location, the direction of each non-closed texture line may be further defined based on magnitudes of the coordinates of its endpoints; for example, among the two endpoints of each non-closed texture line, the one whose X or Y coordinate has a smaller magnitude is the ending point E and the one whose X or Y coordinate has a larger magnitude is the starting point S; for example, among the two endpoints of each non-closed texture line, the one whose X or Y coordinate has a larger magnitude is the ending point E and the one whose X or Y coordinate has a smaller magnitude is the starting point S. For example, endpoints on a first side of the non-closed texture lines are defined as starting points and endpoints on a second side are defined as ending points. Then, directions of each two adjacent non-closed texture lines can be configured to be opposite; for example, the non-closed texture lines n, n+2, n+4, n+6 . . . are selected and their directions are reversed. Alternatively, directions of all the non-closed texture lines with an even serial number are reversed; or directions of all the non-closed texture lines with an odd serial number are reversed.

The reversion means the starting point and the ending point of each reversed non-closed texture line are swapped. Then starting points and ending points of each two adjacent non-closed texture lines are connected by auxiliary path lines to form a continuous printing line.

In an embodiment, the system for planning a 3D printing path classifies texture lines in each slice pattern into different groups according to spatial positions of the texture lines, connects endpoints of non-closed texture lines in a first group by auxiliary path lines along the projected contour so that the non-closed texture lines in the first group form a continuous texture line of the first group, and connects continuous texture lines of different groups by auxiliary path lines so that the continuous texture lines of the different groups form a continuous printing line.

It should be understood that when the contour of the model of the to-be-printed object is irregularly shaped, the corresponding projected contour is also irregularly shaped, which may cause difficulty of planning the printing path in the corresponding slice pattern; for example, in the process of generating the slice pattern, a texture line may be cut into two or more non-closed texture lines by the projected contour in the current slice layer; although the resulted non-closed texture lines are not connected to each other, after extending them, there are situations where the extended lines overlap because they are originally of the same texture line, in which case the non-closed texture lines are relatively complex.

Therefore, in some embodiments, texture lines in each slice pattern are classified into different groups according to spatial positions of the texture lines; wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints.

After determining the spatial position of each non-closed texture line, the non-closed texture lines are classified into different groups based on predetermined rules. The predetermined rules include, but are not limited to: based on the spatial positions of the non-closed texture lines, non-closed texture lines whose X coordinates are similar (meaning their numerical values are close) are grouped together; or based on the spatial positions of the non-closed texture lines, non-closed texture lines whose Y coordinates are similar are grouped together.

Then, the system for planning a 3D printing path further connects non-closed texture lines of the same group by auxiliary path lines along the projected contour for the current slice and turn them into a continuous texture line, and then connects continuous texture lines of different groups by auxiliary path lines so that the continuous texture lines of the different groups form a continuous printing line.

Of course, in some embodiments, the spatial positions of the texture lines in each slice pattern can also be used to determine serial numbers of the non-closed texture lines, and to classify the texture lines so that the non-closed texture lines form a continuous printing line.

For example, the system for planning a 3D printing path first defines the direction and serial number of each non-closed texture line based on the spatial position of the respective non-closed texture line in the slice pattern, and making the directions of each two non-closed texture lines with adjacent serial numbers opposite to each other; wherein the direction of each non-closed texture line is used to determine the starting point and ending point of the respective non-closed texture line. Then auxiliary path points are configured between the ending point of a first non-closed texture line, and the starting point of a second non-closed texture line adjacent to the first non-closed texture line, in an equidistant manner or an equal division manner; in the equidistant manner, auxiliary path points are sequentially generated between the first non-closed texture line and the second non-closed texture line, with a constant distance between each two adjacent auxiliary path points, and no auxiliary path points are generated when the total distance between the non-closed texture lines is smaller than the constant distance between the auxiliary path points; in the equal division manner, auxiliary path points are generated between the first non-closed texture line and the second non-closed texture line, with the auxiliary path points equally divide the total distance between the non-closed texture lines, and the distances between each two adjacent auxiliary path points are also constant in this case. Further, the system for planning a 3D printing path performs printing path planning for the slice pattern to generate a cross-sectional pattern based on the auxiliary path points, the starting point and ending point of each non-closed texture line, the projected contour of the model of the to-be-printed object onto the current slice layer, and each non-closed texture line in the slice pattern, whose detailed process is as follows:

projecting auxiliary path points and starting points and ending points of the non-closed texture lines onto the projected contour onto the current slice layer to obtain projected path points, projected starting points and projected ending points, respectively, and connecting the projected ending point of a first non-closed texture line and the projected starting point of a second non-closed texture line adjacent to the first non-closed texture line to obtain connecting lines between adjacent non-closed texture lines. These connecting lines are auxiliary path lines. A connecting line between the ending point of a first non-closed texture line and the starting point of a second non-closed texture line adjacent to the first non-closed texture line passes through projected path points between the ending point of the first non-closed texture line and the starting point of the second non-closed texture line. The auxiliary path lines and non-closed texture lines in each slice pattern together constitute a printing line.

In some cases, when using auxiliary path lines to connect non-closed texture lines into a printing line, there may be a possibility of long auxiliary path lines along the projected contour of the model of the to-be-printed object onto the current slice layer, and to avoid negative impact of such long auxiliary path lines on the cured structure during printing, the system for planning a 3D printing path further removes auxiliary path lines whose lengths exceed a predetermined length threshold.

Non-closed texture lines that are no longer joined into a continuous printing line after the above removal may be joined by generating auxiliary path lines outside of the projected contour, as will be described later.

The steps of planning a printing path for each slice pattern are exemplarily illustrated below.

In one embodiment, the system for planning a 3D printing path assigns serial numbers and directions to non-closed texture lines of the slice pattern and classifies the non-closed texture lines according to spatial positions of the non-closed texture lines, to obtain a processed slice pattern. In one embodiment, the serial number of each non-closed texture line is determined based on the Y coordinate of the right endpoint of each non-closed texture line. Specifically, the coordinates of the two endpoints of each non-closed texture line are first defined in a coordinate system, and the non-closed texture line corresponding whose right endpoint has the largest Y coordinate is defined as a base non-closed texture line, and non-closed texture lines whose endpoints have X coordinates close to the X coordinate of the right endpoint of the base non-closed texture line are classified together as a group, for example, the G1 group. Non-closed texture lines whose right endpoints have X coordinates relatively far from the X coordinate of the right endpoint of the base non-closed texture line are classified together as a group, for example, the G2 group. Among the two endpoints of each non-closed texture line, the one whose X coordinate has a larger magnitude is the starting point and the one whose X coordinate has a smaller magnitude is the ending point, thereby obtaining the direction of the respective non-closed texture line. Non-closed texture lines in the same group are ordered from 1 to N according to the magnitude of Y coordinates of their right endpoints. As a result, serial numbers, directions, and classification of the non-closed texture lines in a slice pattern are obtained. Serial numbers of non-closed texture lines from different groups can also be numbered consecutively or renumbered as groups. Hereinafter, serial numbers of non-closed texture lines from different groups are numbered consecutively; that is, the last serial number in group G1 and the first serial number 2 in group G2 are consecutive.

The system for planning a 3D printing path causes each two non-closed texture lines with adjacent serial numbers in the same group to be in opposite directions so that non-closed texture lines in the same group are interconnected in a head-to-tail manner. The system for planning a 3D printing path identifies the endpoints of each non-closed texture line with "x", and connects the ending point of the Nth non-closed texture line to the starting point of the (N+1)th non-closed texture line by a line segment. The system for planning a 3D printing path generates equidistant auxiliary path points along the line segment between the ending point of the Nth non-closed texture line and the starting point of the (N+1)th non-closed texture line, with the auxiliary path points also identified with "x". Further, the system for planning a 3D printing path projects "x" points (i.e., endpoints of non-closed texture lines and auxiliary path points) onto the projected contour on the current slice layer to obtain a projected point corresponding to each "x" point. The system for planning a 3D printing path connects the projected point corresponding to the ending point of a first non-closed texture line and the projected point corresponding to the starting point of a second non-closed texture line by an auxiliary path line, wherein the first non-closed texture line and the second non-closed texture line have adjacent serial numbers; the process is repeated for each two adjacent non-closed texture lines. The system for planning a 3D printing path also removes improper auxiliary path lines within the projected contour by manual means or automatically with a preset length threshold, and then superimposes the non-closed texture lines with the auxiliary path lines to obtain printing lines.

The system for planning a 3D printing path connects the non-closed texture lines in the same slice pattern by the auxiliary path lines outside the projected contour to obtain the printing line.

In one embodiment, the endpoints of two non-closed texture lines may be connected outside the projected contour of the model of the to-be-printed object onto the current slice layer by means of manual drawing by an operator.

In another embodiment, the system for planning a 3D printing path can enlarge the projected contour (i.e., the original contour) of the model of the to-be-printed object onto the current slice layer by outward shifting each point of the original contour in a direction normal to the original contour at the respective point, thus generating a virtual contour outside the original contour, then mapping endpoints (i.e., the original endpoints) of not-yet-connected non-closed texture lines of the original contour onto the virtual contour, then connect each of the original endpoints to its corresponding mapped endpoint by auxiliary path lines, and then connect the mapped endpoints with each other by auxiliary path lines, thereby joining all the non-closed texture lines into a continuous texture line.

The process of the system for planning a 3D printing path connecting the non-closed texture lines in the same slice pattern by auxiliary path lines outside the projected contour will be exemplarily illustrated by an example below.

In one embodiment, it is assumed that points A and B are endpoints of two non-closed texture lines to be connected. The system for planning a 3D printing path first outwardly shifts each point of the original contour in a direction normal to the original contour at the respective point for each slice layer, thus generating a virtual contour outside the original contour, and the points A and B on the original contour correspond to points A' and B' on the virtual contour, respectively. The system for planning a 3D printing path connects point A to point A', point B to point B', and A' to point B', such that A-A', A'-B', and B'-B form a connecting path from point A to point B; lines used to connect the points are auxiliary path lines.

After planning the printing path for each slice pattern according to the above-mentioned manner, a 3D printing model corresponding to the model of the to-be-printed object can be obtained based on the slice patterns that have undergone printing path planning.

In summary, the method for planning a 3D printing path of the present disclosure can optimize the printing path for each slice pattern of the model of the 3D printed object, avoiding negative impact of unreasonable path planning on printing efficiency and printing quality.

Figure 17:
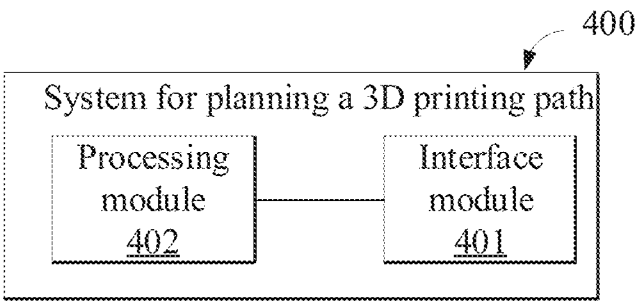
FIG. 17 shows a block diagram of a system for planning a 3D printing path according to one embodiment of the present disclosure.

FIG. 17 shows a block diagram of a system for planning a 3D printing path according to one embodiment of the present disclosure. As shown in FIG. 17, the system 400 for planning a 3D printing path includes a processing module 402, and an interface module 401.

The interface module 401 is for obtaining at least one slice pattern of a model of a to-be-printed object. Each of the at least one slice pattern comprises at least one texture line.

It should be understood that a slice pattern in some embodiments denotes a pattern corresponding to each slice resulted from the slicing of the 3D model of the to-be-printed object; the slicing is generally performed in the Z-axis direction (i.e., the vertical direction) of the 3D model of the to-be-printed object, generating layers of patterns. The at least one slice pattern may be generated using a method as in the previous embodiments of the present disclosure, or may be from slice patterns of a 3D printed model drawn by other means and sent to the processing module for further processing. The texture line includes lines in the slice pattern, which can be straight lines or curved lines according to actual needs. It should be understood that any figure or shape can be made up of line segments, and each line segment has a starting point and an ending point, which are collectively referred to as endpoints in some embodiments. For the sake of simplicity, lines segments are referred to as lines hereinafter. When a line extends from the starting point and returns to the starting point, the line constitutes a closed line, as opposed to a non-closed line which extends from the starting point and does not return to that starting point, i.e., when at least one of the ends of the start and endpoints of the line is exposed.

The processing module connects non-closed texture lines of the same slice pattern by auxiliary path lines along and/or outside a projected contour of the model of the to-be-printed object, to form a printing line.

The printing line comprises texture lines and auxiliary path lines of the slice pattern, and corresponds to an operation path of a nozzle of the 3D printing device during printing.

It should be understood that the model of the to-be-printed object is a three-dimensional model of the to-be-printed object, and that when each layer of the model of the to-be-printed object has the same contour, a projection thereof is a projection of the contour of the entire model of the to-be-printed object (when they are projected on to the same plane). When different layers of the model of the to-be-printed object have differently shaped contours, the term "projected contour" used when describing operations regarding auxiliary path lines refers to the projection of the contour of the model of the to-be-printed object onto a current slice layer, wherein the model may include a plurality of slice layers.

In an exemplary embodiment, for slice patterns where the endpoints of each non-closed texture line are located on the respective projected contour, or to reduce the impact of auxiliary path lines on the structure of the respective printing layer itself during printing, etc., the processing module connects the non-closed texture lines in the same slice pattern by the auxiliary path lines along the projected contour to obtain the printing line.

The following is an example to illustrate the step of connecting the non-closed texture lines in the same slice pattern by the auxiliary path lines along the projected contour.

In one embodiment, a number of texture lines are included in the slice pattern and the endpoints of each non-closed texture line fall on the projected contour of the model of the to-be-printed object onto the current slice layer. The processing module connects the endpoints of each non-closed texture line along the projected contour by auxiliary path lines, and the texture lines and the auxiliary path lines form a continuous printing line, thereby forming a cross-sectional pattern.

In an embodiment, the processing module assigns a serial number to each non-closed texture line of the slice pattern according to a spatial position of the respective non-closed texture line, and connects endpoints of non-closed texture lines with adjacent serial numbers by auxiliary path lines along the projected contour so that the non-closed texture lines in the slice pattern together form a continuous printing line.

Herein, the processing module assigns a serial number to each non-closed texture line of the slice pattern according to a spatial position of the respective non-closed texture line, wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints. After determining the spatial position of each non-closed texture line, the processing module assigns a serial number to each non-closed texture line based on the spatial position of respective non-closed texture line. For example, values of serial numbers assigned to non-closed texture lines are positively correlated to X coordinates of the spatial positions of the non-closed texture lines, Y coordinates of the spatial positions of the non-closed texture lines, or respective sums of X coordinates and Y coordinates of the spatial positions of the non-closed texture lines.

After assigning a serial number to each non-closed texture line, the processing module connects non-closed texture lines with adjacent serial numbers by auxiliary path lines along the projected contour of the model of the to-be-printed object onto the current slice layer so that non-closed texture lines and auxiliary path lines form a continuous line, i.e., a printing line.

In this case, to improve the printing efficiency, each auxiliary path line is used to connect two closer endpoints of two non-closed texture lines with adjacent serial numbers, for example, two left endpoints of the two non-closed texture lines with the adjacent serial numbers.

In one embodiment, assuming that the two endpoints of each non-closed texture line are denoted with S and E respectively, and each non-closed texture line is denoted with its serial number, the processing module initiates a search starting from one endpoint En of a non-closed texture line n, to look for an endpoint Sn+1 of a non-closed texture line n+1, wherein the endpoint Sn+1 is closer to the endpoint En than any other endpoint of the non-closed texture line n+1, and then the system connects the endpoint En and the endpoint Sn+1 by an auxiliary path line. Similarly, the system for generating a 3D printing model then initiates a search starting from an endpoint En+1 of the non-closed texture line n+1, to look for an endpoint Sn+2 of a non-closed texture line n+2, wherein the endpoint Sn+2 is closer to the endpoint En+1 than any other endpoint of the non-closed texture line n+2, and then the system connects the endpoint En+1 and the endpoint Sn+2 by an auxiliary path line.

In another embodiment, after assigning a serial number to each non-closed texture line in the slice pattern based on its spatial location, the direction of each non-closed texture line may be further defined based on magnitudes of the coordinates of its endpoints; for example, among the two endpoints of each non-closed texture line, the one whose X or Y coordinate has a smaller magnitude is the ending point E and the one whose X or Y coordinate has a larger magnitude is the starting point S; for example, among the two endpoints of each non-closed texture line, the one whose X or Y coordinate has a larger magnitude is the ending point E and the one whose X or Y coordinate has a smaller magnitude is the starting point S. For example, endpoints on a first side of the non-closed texture lines are defined as starting points and endpoints on a second side are defined as ending points. Then, directions of each two adjacent non-closed texture lines can be configured to be opposite; for example, the non-closed texture lines n, n+2, n+4, n+6 . . . are selected and their directions are reversed. Alternatively, directions of all the non-closed texture lines with an even serial number are reversed; or directions of all the non-closed texture lines with an odd serial number are reversed.

The reversion means the starting point and the ending point of each reversed non-closed texture line are swapped. Then starting points and ending points of each two adjacent non-closed texture lines are connected by auxiliary path lines to form a continuous printing line.

In an embodiment, the processing module classifies texture lines in each slice pattern into different groups according to spatial positions of the texture lines, connects endpoints of non-closed texture lines in a first group by auxiliary path lines along the projected contour so that the non-closed texture lines in the first group form a continuous texture line of the first group, and connects continuous texture lines of different groups by auxiliary path lines so that the continuous texture lines of the different groups form a continuous printing line.

It should be understood that when the contour of the model of the to-be-printed object is irregularly shaped, the corresponding projected contour is also irregularly shaped, which may cause difficulty of planning the printing path in the corresponding slice pattern; for example, in the process of generating the slice pattern, a texture line may be cut into two or more non-closed texture lines by the projected contour in the current slice layer; although the resulted non-closed texture lines are not connected to each other, after extending them, there are situations where the extended lines overlap because they are originally of the same texture line, in which case the non-closed texture lines are relatively complex.

Therefore, in some embodiments, texture lines in each slice pattern are classified into different groups according to spatial positions of the texture lines; wherein a method of determining the spatial position of each non-closed texture line includes, but is not limited to, determining by coordinates of a specified endpoint of each non-closed texture line, or determining by an average value of coordinates of the two endpoints of each non-closed texture line, etc. For example, the spatial position of each non-closed texture line is defined by the coordinates of a left endpoint of the non-closed texture line, or, for example, the spatial position of each non-closed texture line is determined by first obtaining the coordinates of all endpoints of each non-closed texture line and then defining the spatial position of the respective non-closed texture line by averaging the coordinates of the endpoints.

After determining the spatial position of each non-closed texture line, the non-closed texture lines are classified into different groups based on predetermined rules. The predetermined rules include, but are not limited to: based on the spatial positions of the non-closed texture lines, non-closed texture lines whose X coordinates are similar (meaning their numerical values are close) are grouped together; or based on the spatial positions of the non-closed texture lines, non-closed texture lines whose Y coordinates are similar are grouped together.

Then, the processing module further connects non-closed texture lines of the same group by auxiliary path lines along the projected contour onto the current slice layer and turn them into a continuous texture line, and then connects continuous texture lines of different groups by auxiliary path lines so that the continuous texture lines of the different groups form a continuous printing line.

Of course, in some embodiments, the spatial positions of the texture lines in each slice pattern can also be used to determine serial numbers of the non-closed texture lines, and to classify the texture lines so that the non-closed texture lines form a continuous printing line.

For example, the processing module first defines the direction and serial number of each non-closed texture line based on the spatial position of the respective non-closed texture line in the slice pattern, and making the directions of each two non-closed texture lines with adjacent serial numbers opposite to each other; wherein the direction of each non-closed texture line is used to determine the starting point and ending point of the respective non-closed texture line. Then auxiliary path points are configured between the ending point of a first non-closed texture line, and the starting point of a second non-closed texture line adjacent to the first non-closed texture line, in an equidistant manner or an equal division manner; in the equidistant manner, auxiliary path points are sequentially generated between the first non-closed texture line and the second non-closed texture line, with a constant distance between each two adjacent auxiliary path points, and no auxiliary path points are generated when the total distance between the non-closed texture lines is smaller than the constant distance between the auxiliary path points; in the equal division manner, auxiliary path points are generated between the first non-closed texture line and the second non-closed texture line, with the auxiliary path points equally divide the total distance between the non-closed texture lines, and the distances between each two adjacent auxiliary path points are also constant in this case. Further, the processing module performs printing path planning for the slice pattern to generate a cross-sectional pattern based on the auxiliary path points, the starting point and ending point of each non-closed texture line, the projected contour of the model of the to-be-printed object onto the current slice layer, and each non-closed texture line in the slice pattern, whose detailed process is as follows:

projecting auxiliary path points and starting points and ending points of the non-closed texture lines onto the projected contour onto the current slice layer to obtain projected path points, projected starting points and projected ending points, respectively, and connecting the projected ending point of a first non-closed texture line and the projected starting point of a second non-closed texture line adjacent to the first non-closed texture line to obtain connecting lines between adjacent non-closed texture lines. These connecting lines are auxiliary path lines. A connecting line between the ending point of a first non-closed texture line and the starting point of a second non-closed texture line adjacent to the first non-closed texture line passes through projected path points between the ending point of the first non-closed texture line and the starting point of the second non-closed texture line. The auxiliary path lines and non-closed texture lines in each slice pattern together constitute a printing line.

In some cases, when using auxiliary path lines to connect non-closed texture lines into a printing line, there may be a possibility of long auxiliary path lines along the projected contour of the model of the to-be-printed object onto the current slice layer, and to avoid negative impact of such long auxiliary path lines on the cured structure during printing, the processing module further removes auxiliary path lines whose lengths exceed a predetermined length threshold.

Non-closed texture lines that are no longer joined into a continuous printing line after the above removal may be joined by generating auxiliary path lines outside of the projected contour, as will be described later.

The steps of planning a printing path for each slice pattern are exemplarily illustrated below.

In one embodiment, the processing module assigns serial numbers and directions to non-closed texture lines of the slice pattern and classifies the non-closed texture lines according to spatial positions of the non-closed texture lines, to obtain a processed slice pattern. In one embodiment, the serial number of each non-closed texture line is determined based on the Y coordinate of the right endpoint of each non-closed texture line. Specifically, the coordinates of the two endpoints of each non-closed texture line are first defined in a coordinate system, and the non-closed texture line corresponding whose right endpoint has the largest Y coordinate is defined as a base non-closed texture line, and non-closed texture lines whose right endpoints have X coordinates close to the X coordinate of the right endpoint of the base non-closed texture line are classified together as a group, for example, the G1 group. Non-closed texture lines whose right endpoints have X coordinates relatively far from the X coordinate of the right endpoint of the base non-closed texture line are classified together as a group, for example, the G2 group. Among the two endpoints of each non-closed texture line, the one whose X coordinate has a larger magnitude is the starting point and the one whose X coordinate has a smaller magnitude is the ending point, thereby obtaining the direction of the respective non-closed texture line. Non-closed texture lines in the same group are ordered from 1 to N according to the magnitude of Y coordinates of their right endpoints. As a result, serial numbers, directions, and classification of the non-closed texture lines in a slice pattern are obtained. Serial numbers of non-closed texture lines from different groups can also be numbered consecutively or renumbered as groups. Hereinafter, serial numbers of non-closed texture lines from different groups are numbered consecutively, that is, the last serial number in group G1 and the first serial number in group G2 are consecutive.

The processing module causes each two non-closed texture lines with adjacent serial numbers in the same group to be in opposite directions so that non-closed texture lines in the same group are interconnected in a head-to-tail manner. The processing module identifies the endpoints of each non-closed texture line with “x”, and connects the ending point of the Nth non-closed texture line to the starting point of the (N+1)th non-closed texture line by a line segment. The processing module generates equidistant auxiliary path points along the line segment between the ending point of the Nth non-closed texture line and the starting point of the (N+1)th non-closed texture line, with the auxiliary path points also identified with “x”. Further, the processing module projects “x” points (i.e., endpoints of non-closed texture lines and auxiliary path points) onto the projected contour on the current slice layer to obtain a projected point corresponding to each “x” point. The processing module connects the projected point corresponding to the ending point of a first non-closed texture line and the projected point corresponding to the starting point of a second non-closed texture line by an auxiliary path line, wherein the first non-closed texture line and the second non-closed texture line have adjacent serial numbers, the process is repeated for each two adjacent non-closed texture lines. The processing module also removes improper auxiliary path lines within the projected contour by manual means or automatically with a preset length threshold, and then superimposes the non-closed texture lines with the auxiliary path lines to obtain printing lines.

The processing module connects the non-closed texture lines in the same slice pattern by the auxiliary path lines outside the projected contour to obtain the printing line.

In one embodiment, the endpoints of two non-closed texture lines may be connected outside the projected contour of the model of the to-be-printed object onto the current slice layer by means of manual drawing by an operator.

In another embodiment, the processing module can enlarge the projected contour (i.e., the original contour) of the model of the to-be-printed object onto the current slice layer by outward shifting each point of the original contour in a direction normal to the original contour at the respective point, thus generating a virtual contour outside the original contour, then mapping endpoints (i.e., the original endpoints) of not-yet-connected non-closed texture lines of the original contour onto the virtual contour, then connect each of the original endpoints to its corresponding mapped endpoint by auxiliary path lines, and then connect the mapped endpoints with each other by auxiliary path lines, thereby joining all the non-closed texture lines into a continuous texture line.

The process of connecting the non-closed texture lines in the same slice pattern by the processing module by auxiliary path lines outside the projected contour will be exemplarily illustrated by an example below.

In one embodiment, it is assumed that points A and B are endpoints of two non-closed texture lines to be connected. The processing module first outwardly shifts each point of the original contour in a direction normal to the original contour at the respective point for each slice layer, thus generating a virtual contour outside the original contour, and the points A and B on the original contour correspond to points A' and B' on the virtual contour, respectively. The processing module connects point A to point A', point B to point B', and A' to point B', such that A-A', A'-B', and B'-B form a connecting path from point A to point B; lines used to connect the points are auxiliary path lines.

After planning the printing path for each slice pattern according to the above-mentioned manner, a 3D printing model corresponding to the model of the to-be-printed object can be obtained based on the slice patterns that have undergone printing path planning.

In summary, the method for planning a 3D printing path of the present disclosure can optimize the printing path for each slice pattern of the model of the 3D printed object, avoiding negative impact of unreasonable path planning on printing efficiency and print quality.

The seventh aspect of the present disclosure provides a 3D printing method, and the 3D printing method may be performed by a 3D printing device. The 3D printing device may be a fused-deposition-molding-based 3D printer, such as a Freeform-Fabrication (FFF) printer, etc. It can also be a point-scanning-molding-based printer, such as one of an SLS, SLA, SLM printer, etc.

Figure 11:
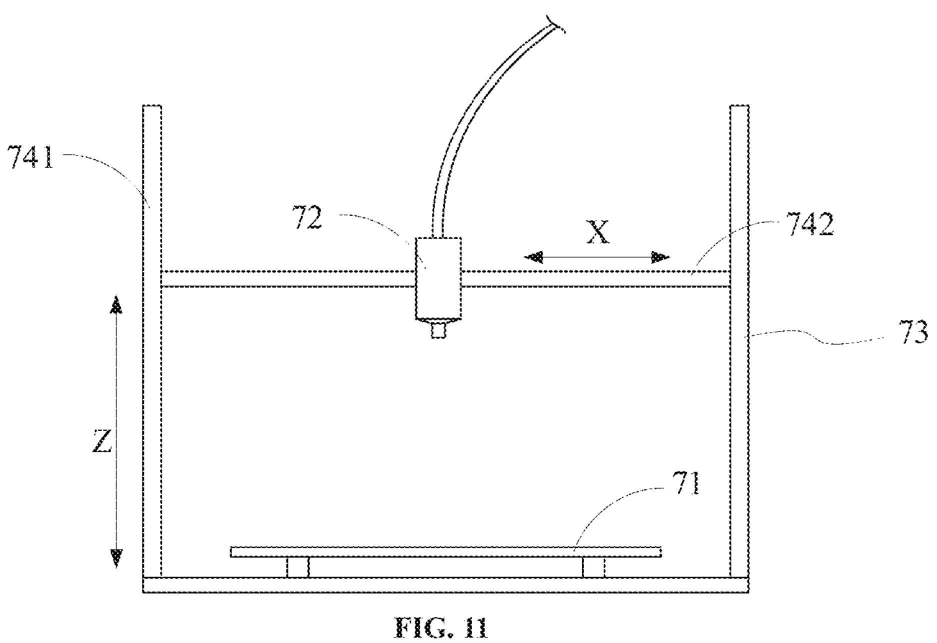
FIG. 11 is a simplified structural diagram of a 3D printing device according to one embodiment of the present disclosure.

FIG. 11 is a simplified structural diagram of a 3D printing device according to one embodiment of the present disclosure.

As shown in FIG. 11, the 3D printing device comprises: a printing platform 71, a driving device, a nozzle device 72, and a control device (not illustrated).

The driving device includes a Z-axis driving mechanism 741 capable of moving up and down relative to the printing platform 71, and an X-axis driving mechanism 742 and a Y-axis driving mechanism (not shown) provided on the Z-axis driving mechanism 741. The nozzle device 72 is provided on the X-axis driving mechanism 742 or the Y-axis driving mechanism, for melting introduced hot-melt materials and extruding them onto the printing platform 71 along the printing path. The Z-axis driving mechanism 741 is used to cause a displacement of the nozzle device 72 in the Z-direction, the Y-axis mechanism is used to cause displacement of the nozzle device 72 in the Y-direction, and the X-axis driving mechanism 742 is used to cause displacement of the nozzle device 72 in the X-direction. The printing platform 71 is provided below the X-axis driving mechanism 742 and the Y-axis driving mechanism, and allows printed objects to be adhered thereto. In some embodiments, the printing platform 71 also has a member plate for carrying printed objects, and the printing platform 71 can be moved up and down in the Z-axis direction by the Z-axis driving mechanism 741. The control device is electrically connected to the driving device and nozzle device, for controlling the driving device and nozzle device to perform printing of each layer according to the printing path based on 3D printing data read by the control device, to have molten filaments of the printing material stacked and molded on the printing platform so as to obtain the printed object; wherein the 3D printing data is obtained according to the method for generating 3D printing data as described in the first aspect of the present disclosure. Formation of the stacked molten filaments is as follows: during the operation of the printing device based on fused-deposition-molding, filaments of the printing materials are molten by the nozzle device and then are extruded onto the printing platform, and the filaments then form a thin cured layer after cooling; One layer is molded before the next layer is printed; the next layer is printed by spraying molten filaments of the printing materials onto the thin cured layer, and stacked layers are formed after repeating the above steps, thereby forming the printed object.

In an embodiment as shown in FIG. 11, the 3D printing device further comprises a frame 73, used to carry or fix other devices.

In an embodiment, the control device comprises a storage unit, a processing unit, and an interface unit.

The storage unit comprises one or more of a non-volatile memory, a volatile memory, etc. The non-volatile memory is, for example, a solid-state disk or a USB disk, etc. The storage unit is connected to the processing unit via a system bus. The processing unit comprises at least one of a CPU, a chip integrated with a CPU, a field programmable gate array (FPGA), and a multi-core processor.

The interface unit comprises a plurality of drive-reserved interfaces, wherein each of the drive-reserved interfaces is electrically connected to and controls a device that is independently packaged in a 3D printing device and transmits data or performs driving through the interface, such as the nozzle device or the driving device. The control device also includes at least one of a prompting device, and a human-computer interaction unit. The interface type of the interface unit is determined according to the device it is connected to, and the interface type may include one of a universal serial interface, a video interface, and an industrial control interface. For example, the drive-reserved interfaces include one or more of a USB interface, a HDMI interface, and a RS232 interface, wherein there are multiple USB interfaces and RS232 interfaces, the USB interface can be connected to the human-computer interaction unit, and the RS232 interface is connected to the nozzle device and the driving device, etc., thereby controlling the nozzle device, and driving device, etc.

In an embodiment, the nozzle device may further comprise a guiding section, a heating section, and a nozzle. The guiding section includes a guiding tube and a filament feeding gear, whereby printing materials provided by a filament feeding mechanism are conveyed to the heating section for heating. The heating section is provided with a thermistor to measure the temperature of the printing materials in order to controllably increase the temperature to the melting point of the printing materials. Molten printing materials are sprayed on the printing platform by means of the nozzle. Herein, the printing material are hot-melt materials, which include, but are not limited to, one or more of thermoplastic polyurethanes (TPU), thermoplastic polyester elastomer (TPEE), nylon-based elastomer, and other thermoplastic elastomer materials. In some embodiments, the filament feeding mechanism is a mechanism that provides filaments of the printing materials to the nozzle device, and includes a storage structure for storing the filaments of the printing materials; by placing one end of a filament of the printing materials into an inlet of the nozzle device, the nozzle device can draw in the filament and melt it before discharging the filament from the nozzle when operating. In other embodiments, the filament feeding mechanism further comprises a feeding/guiding device for guiding filaments of the printing materials to the inlet of the nozzle device, so that the filaments of the printing materials are conveyed/guided to the inlet of the nozzle device when the nozzle device is operating, ensuring a smooth introduction of the filaments of the printing materials into the nozzle device for melting. The control device is used to control the driving device and the nozzle to work together to print the to-be-printed object based on read data of each slice layer of the to-be-printed object. Alternatively, the nozzle device in one embodiment may be a micro screw extruding deposition head fed with bulk materials in a granular form, and the corresponding printing materials are in a granular form, i.e. granular materials or pellets. Herein, the nozzle device may include: a hopper, a feeding device, an extrusion screw, and a hot melt nozzle. The hopper is used to hold the granular materials, and the extrusion screw feeds the granular materials from the hopper through a real-time feeding device, and conveys the to-be-molded materials to the hot melt nozzle by spiral extrusion of the extrusion screw, and the materials are extruded by the screw as they advances to achieve fused deposition molding of the materials.

In some other cases, the printing platform also includes a heating device, a transitional environment for the molding process can be provided by heating the printing platform by the heating device, so as to avoid a large internal stress of extruded molten filaments due to a temperature difference between the melting temperature and the molding temperature of the filaments, while a large internal stress is not conducive to the structural stability of the product and affects product quality. Therefore, the heating device can provide a constant-temperature environment to control the temperature within a suitable range so that the materials can be molded without having large internal stresses during the molding process, thereby improving the quality of the molding and the accuracy of the printed object. The fused-deposition-molding-based printing device is designed to melt various filaments by heating and then stacking and molding them, and the heating nozzle is controlled by a computer to move in a plane along an X axis or a Y axis according to a cross-sectional contour of the object. Thermoplastic filamentary materials are fed by the filament feeding mechanism to a hot melt nozzle where they are heated and melted to a semi-liquid state and then extruded. Then, based on computer-based control information, the hot melt materials are selectively coated on the printing platform, forming a contour of the thin layer after rapid cooling. After one layer is formed, the printing platform is lowered along the Z-axis to a certain height and then the next layer is coated, and so on, resulting in a three-dimensional product.

Figure 12:
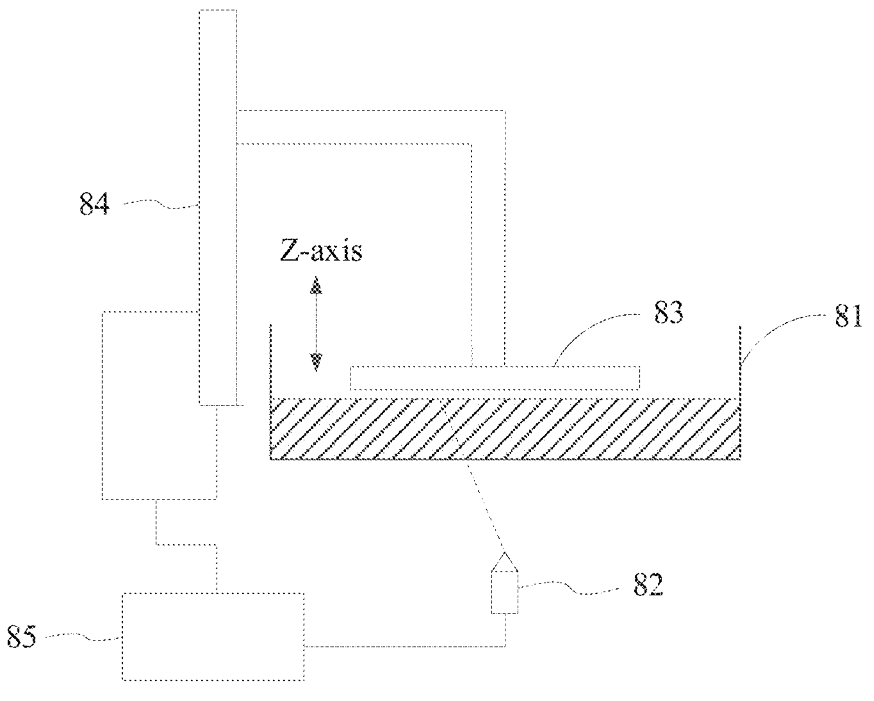
FIG. 12 is a simplified structural diagram of a 3D printing device according to one embodiment of the present disclosure.

FIG. 12 is a simplified structural diagram of a 3D printing device according to one embodiment of the present disclosure.

As shown in FIG. 12, the 3D printing device comprises: a container 81, an energy radiating device 82, a member platform 83, a Z-axis driving mechanism 84, and a control device 85.

The control device is electrically connected to the energy radiating device 82 and the Z-axis driving mechanism 84, for controlling the energy radiating device 82 and Z-axis driving mechanism 84 to perform printing of each layer according to a printing path based on 3D printing data read by the control device, to obtain a printed object on the member platform 83, wherein the 3D printing data is obtained according to the method for generating 3D printing data as described in the first aspect of the present disclosure. The container is for holding to-be-cured materials, the energy radiating device 82 is provided at a predetermined position on a bottom side of the container 81, configured to radiate energy via a control program to a printing surface inside the container 81 when a printing command is received, in order to mold the to-be-cured materials on the printing surface. Of course, in some embodiments, the energy radiating device 82 may also be provided at a predetermined position on a top side of the container, configured to radiate energy via a control program to the printing surface inside the container when a print command is received. The Z-axis driving mechanism 84 is connected to the member platform 83, for driving the member platform 83 to move so that a gap between the member platform 83 and the printing surface is filled with the to-be-cured materials.

During the printing process, the energy radiating device radiates energy to different locations of the printing surface inside the container according to the printing path, and the to-be-cured materials at the radiated locations are correspondingly cured. After printing a cross-sectional layer, the control device drives the Z-axis driving mechanism to move to continue printing the next cured layer on top of the previous cured layer until all cross-sectional layers are printed.

A selective-laser-sintering (SLS) printing device cures powdered materials and uses an infrared laser to sinter the powder for molding. Specifically, the printing device is positioned over the powder and controls the laser to selectively irradiate the powder according to received printing data, and laser energy is absorbed by the powder in selected areas and converted into heat energy. As a result, contact interfaces between powder particles heated to the sintering temperature expands, pores between them shrink, and the degree of densification of the powder in the selected areas increases, and then the powder in the selected areas cools down and solidifies into a dense, hard sintered body, which is further processed into a current layer. Subsequently, a new layer of powder is spread on top of the sintered current layer, and the printing device reads data of a new cross-sectional layer for processing, the new cross-sectional layer is bonded with the previous cross-sectional layer; the above process is repeated layer by layer until the whole object is molded. Herein, when the 3D printing device is an SLS printing device, the 3D printing device further comprises a powder spreading device for spreading powdered materials on the printing surface after each cured layer is printed.

A stereolithography (SLA) printing device cures light-curing materials. The SLA printing device includes a laser emitter, a lens set located on an emitting optical path of the laser emitter and a oscillator set located on an emitting side of the lens set, and a motor for controlling the oscillator set, wherein the laser emitter is controlled to adjust the energy of an output laser beam; for example, the laser emitter is controlled to emit a laser beam of a predetermined power and to stop emitting that laser beam; for example, the laser emitter is controlled to increase the power of the laser beam and to decrease the power of the laser beam. The lens set is used to adjust a focusing position of the laser beam, and the oscillator set is used to controllably scan with the laser beam in a two-dimensional space on the bottom or top surface of the container, and the light-curing materials scanned by the beam are cured into a corresponding patterned cured layer. After the printing task of a cured layer is completed, the control device drives the member platform to move to a printing position of the next cured layer, the energy radiating device continues to radiate energy to the printing surface to continue forming the new cured layer on the already printed cured layer, and so on until all cured layers are printed to obtain a 3D printed object.

In an embodiment, the control device comprises a storage unit, a processing unit, and an interface unit.

The storage unit comprises one or more of a non-volatile memory, a volatile memory, etc. The non-volatile memory is, for example, a solid-state disk or a USB disk, etc. The storage unit is connected to the processing unit via a system bus. The processing unit comprises at least one of a CPU, a chip integrated with a CPU, a field programmable gate array (FPGA), and a multi-core processor.

The interface unit comprises a plurality of drive-reserved interfaces, wherein each of the drive-reserved interfaces is electrically connected to and controls a device that is independently packaged in a 3D printing device and transmits data or performs driving through the interface, such as the Z-axis driving mechanism or the energy radiating device. The control device also includes at least one of a prompting device, and a human-computer interaction unit. The interface type of the interface unit is determined according to the device it is connected to, and the interface type may include one of a universal serial interface, a video interface, an industrial control interface. For example, the drive-reserved interfaces include one or more of a USB interface, a HDMI interface and a RS232 interface, wherein there are multiple USB interfaces and RS232 interfaces, the USB interface can be connected to the human-computer interaction unit, and the RS232 interface is connected to the Z-axis driving mechanism or the energy radiating device, etc., thereby controlling the Z-axis driving mechanism or the energy radiating device, etc.

Figure 10:
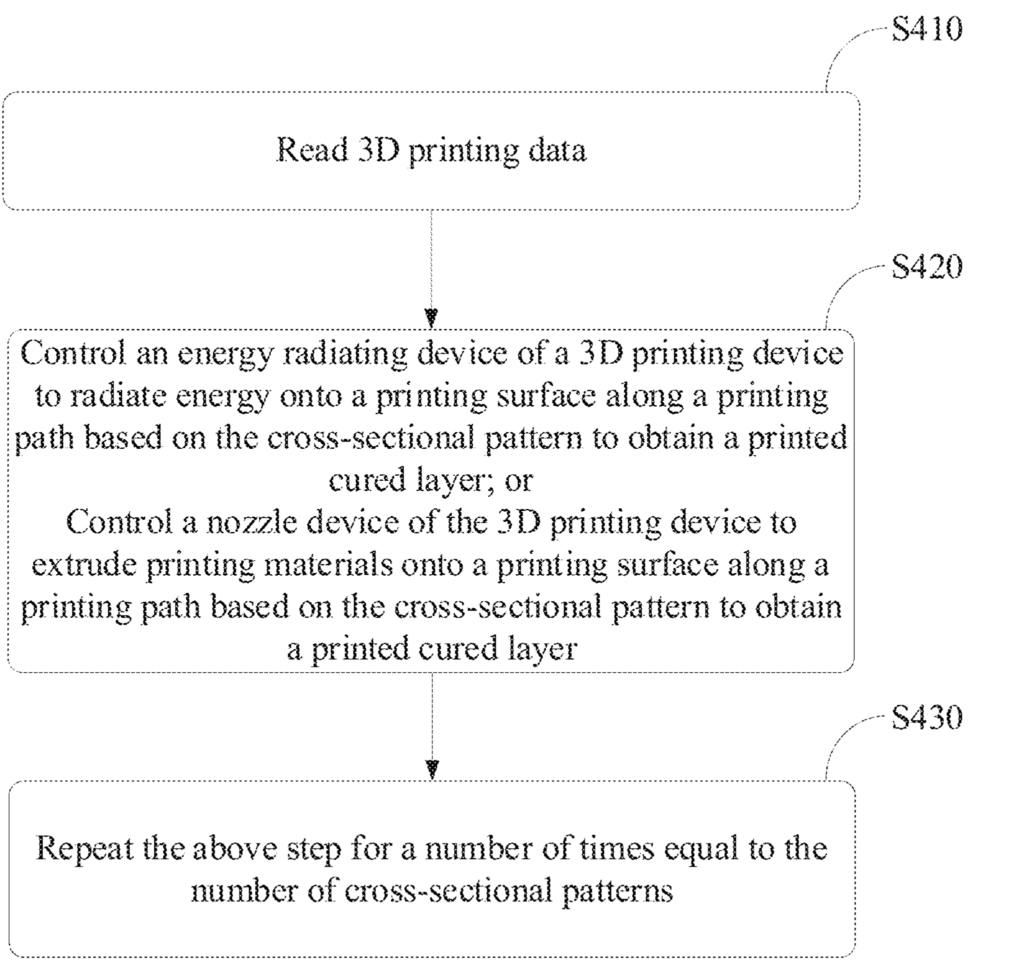
FIG. 10 is a flowchart illustrating a 3D printing method according to one embodiment of the present disclosure.

FIG. 10 is a flowchart illustrating a 3D printing method according to one embodiment of the present disclosure.

As shown in FIG. 10, in step S410, the 3D printing device reads 3D printing data.

The 3D printing data is obtained according to the method for generating 3D printing data as described in the first aspect of the present disclosure. The 3D printing data includes printing data instructions for the to-be-printed object, the to-be-printed object includes cross-sectional patterns, and therefore the printing data instructions for the to-be-printed object include data instructions corresponding to each cross-sectional pattern. The number of cross-sectional patterns corresponds to the number of printing layers of the to-be-printed object. For example, when the number of printing layers is 1, then the printing data instructions for the to-be-printed object include data instructions for one cross-sectional pattern. For example, when the number of printing layers is greater than 1, then the printing data instructions for the to-be-printed object include data instructions for more than one cross-sectional patterns.

Herein, after obtaining the 3D printing data, the 3D printing device performs step S420.

In step S420, the 3D printing device prints a cured layer based on a cross-sectional pattern in the 3D printing data.

In one embodiment, a 3D printing device based on fused deposition molding controls its nozzle device to extrude printing materials along the printing path to the printing surface based on the cross-sectional pattern to obtain a printed cured layer.

Herein, the control device in the 3D printing device controls the nozzle device to extrude printing materials along the printing path to the printing surface located on the printing platform to obtain a printed cured layer corresponding to the cross-sectional pattern according to data instructions corresponding to the cross-sectional pattern. As described in the first aspect of the present disclosure, each cross-sectional pattern includes printing lines that correspond to printing paths of the 3D printing device when printing. The coordinates of printing points in the printing lines are processed to form the data instructions, so that the control device of the 3D printing device, i.e., a control driving device, drives the nozzle to traverse the printing points and extrude the printing material to the printing surface to obtain the printed cured layer according to the data instructions.

In one embodiment, a 3D printing device based on point scanning molding controls its energy radiating device of to radiate energy onto a printing surface along a printing path based on the cross-sectional pattern to obtain a printed cured layer.

Herein, the control device in the 3D printing device controls the energy radiating device to radiate energy along the printing path onto the printing surface located on the printing platform to obtain a printed cured layer corresponding to a cross-sectional pattern, according to data instructions corresponding to the cross-sectional pattern. As described in the first aspect of the present disclosure, each cross-sectional pattern includes printing lines that correspond to printing paths of the 3D printing device when printing. The coordinates of printing points in the printing lines are processed to form the data instructions, so that the control device of the 3D printing device, i.e., a control driving device, drives the energy radiating device to traverse the printing points and radiate energy to the printing surface to obtain the printed cured layer according to the data instructions.

Referring again to FIG. 10, in step S430, the above step is repeated for a number of times equal to the number of cross-sectional patterns in order to accumulate printed cured layers layer by layer to obtain the printed object.

When the number of cross-sectional patterns is one, the printed object is obtained by performing S410 and S420. When the number of cross-sectional patterns is greater than one, step S420 is repeated according to the specific number of the cross-sectional patterns to accumulate printed cured layers on top of previous layers to obtain printed cured layers whose number corresponds to the total number of the cross-sectional patterns, thereby forming the printed object.

In an exemplary embodiment, the 3D printing method further includes a post-processing step. The post-processing step includes, but is not limited to, trimming the printed object. The 3D printing data used by the 3D printing device is obtained according to the method for generating 3D printing data as described in the first aspect of the present disclosure. If during the generation of the 3D printing, non-closed texture lines in the same slice pattern are connected by auxiliary path lines outside the projected contour to obtain a cross-sectional pattern, then the cured layer printed based on printing data of the cross-sectional pattern will also include lines outside the contour. Therefore, in some cases, these lines outside the contour may be trimmed to obtain a more desirable 3D printed object.

The 3D printing method of the present disclosure enables the printing of complex structures and is particularly suitable for the printing of fabric structures, thus providing more possibilities in the design of structures and functions to meet individual needs.

The eighth aspect of the present disclosure provides a 3D printed fabric, wherein the 3D printed fabric is obtained by the 3D printing method described in the seventh aspect of the present disclosure.

The 3D printed fabric may be any textile product, which includes but is not limited to, common fabric structures such as clothes, cloth, shoe upper, etc.

The fabric structure in the present disclosure, due to the special printing process, can have subtle structural changes in different areas of the fabric structure, achieving texture patterns and texture density variations, therefore, it has a higher degree of design freedom in structures and functions, and is able to meet more personalized needs.

A fabric structure obtained by 3D printing is also provided in the ninth aspect of the present disclosure. The fabric structure may be any textile product, which includes but is not limited to, common fabric structures such as clothes, cloth, shoe upper, etc.

In an exemplary embodiment, the fabric structure comprises at least one cross-sectional layer. Each cross-sectional layer comprises a plurality of first woven filaments that are filled and thread-like, and two endpoints of each first woven filament are located on a contour of the respective cross-sectional layer.

It should be understood that since the fabric structure is 3D printed, during the 3D printing process, each cross-sectional layer is obtained by curing, and cross-sectional layers are accumulated layer by layer to finally form the 3D printed product. Accordingly, the fabric structure comprises at least one cross-sectional layer. Each cross-sectional layer includes a contour corresponding to the cross-sectional layer and first woven filaments located within the contour, and the endpoints of each first woven filament are located at the contour of the respective cross-sectional layer, that is, i.e. the endpoints of each first woven filament is in contact with the contour of the respective cross-sectional layer.

Herein, when the at least one cross-sectional layer includes one cross-sectional layer, the fabric structure is a single-layer fabric structure. When the at least one cross-sectional layer include multiple cross-sectional layers, the fabric structure is a multi-layer fabric structure.

In one embodiment, when the fabric structure is a single-layer fabric structure, first woven filaments in the cross-sectional layer are crossed longitudinally and horizontally to form a warp-weft structure.

In another embodiment, when the fabric structure is a multi-layer fabric structure, a plurality of cross-sectional layers are stacked together, and first woven filaments in at least two cross-sectional layers are crossed with each other to form a warp-weft structure.

The number of the at least one cross-sectional layer is within a range including 1 to 20, depending on characteristics of the fabric structure.

In an exemplary embodiment, in order to for the fabric structure to have a porous structure, there are slits between different first woven filaments located in the same cross-sectional layer. The slits means that there are gaps between the first woven filaments.

Figure 13A:
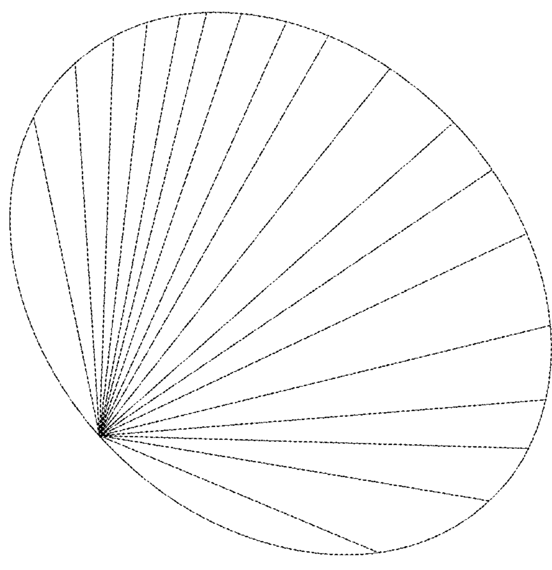
FIGS. 13A to 13C show schematic structural diagrams of a plurality of first woven filaments in cross-sectional layers according to some embodiments of the present disclosure.
Figure 13B:
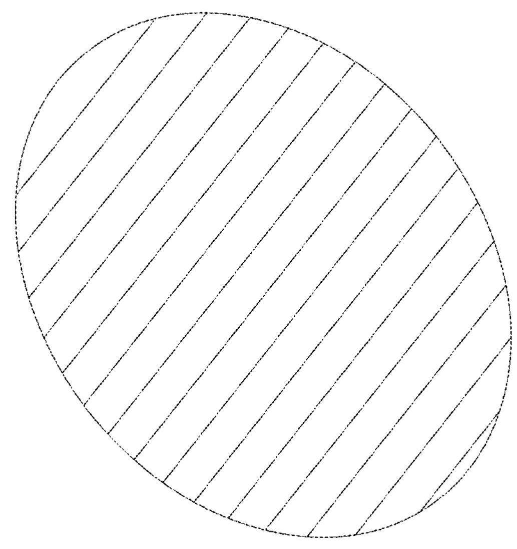
Figure 13C:
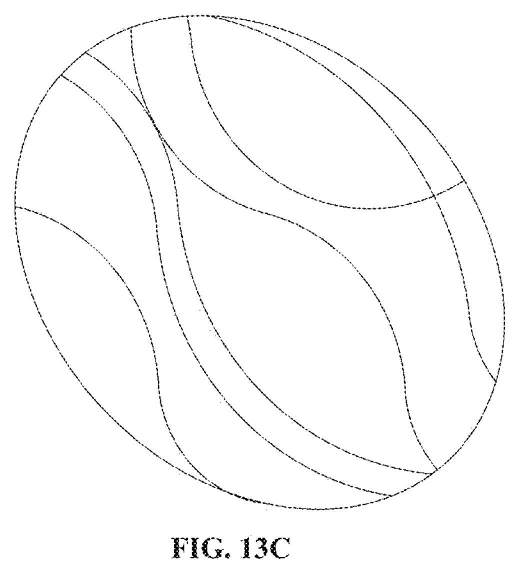

In an embodiment, as shown in FIGS. 13A to 13C, which are schematic structural diagrams of a plurality of first woven filaments in cross-sectional layers according to some embodiments of the present disclosure. As shown in the figures, first woven filaments located in the same cross-sectional layer are radial (as shown in FIG. 13A), parallel (as shown in FIG. 13B), or curved (as shown in FIG. 13C).

In an exemplary embodiment, the slits located in the same cross-sectional layer may be in the form of strips as shown in FIG. 13B, or may also be in the form of interlaced webs, or may in a hybrid form of both strips and interlaced webs in the same cross-sectional layer, depending on design needs. Moreover, first woven filaments located in different cross-sectional layers form a three-dimensional interlaced structure; that is, although first woven filaments in the same cross-sectional layer do not intersect each other, projections of first woven filaments in different cross-sectional layers onto the same plane intersect each other, so that slits of different cross-sectional layers form a plurality of pores, and first woven filaments in different cross-sectional layers form a warp-weft structure surrounding the pores.

In an exemplary embodiment, the pores may be configured to be unevenly or evenly distributed in the fabric structure, to achieve various looks and functions, depending on design requirements. For example, according to different air permeability required by different areas of the fabric structure, the pores may be configured to be unevenly distributed, with the density of pores higher in areas requiring better air permeability and the density of pores lower in areas requiring better airtightness. It should be understood that the sparseness of the pores also depends on shapes of the first woven filaments and sizes of slits between different first woven filaments.

In an exemplary embodiment, for some 3D printing devices based on non-face-exposure molding where cured layers are formed by point-by-point molding, if the respective path planning is not proper, it may have a negative impact on the printing efficiency and printing quality. For example, for SLA printing devices, an improper printing path may result in repeated scanning of certain areas, making printing less efficient and creating over-cured areas. Another example is that for fused-deposition-molding-based printing devices, unreasonable printing paths can cause frequent nozzle pullbacks and empty walks (i.e., nozzles moving without extruding printing materials). Therefore, the printing process of the fabric structure described is facilitated by a number of auxiliary path lines. These auxiliary path lines are not originally part of line structures of the fabric's model, but are used to connect the line structures during data processing to increase printing efficiency, etc., and are printed together with the line structures during the printing process. The line structures of the fabric's model are printed to form the first woven filaments, while the auxiliary path lines are printed to form second woven filaments.

Figure 14:
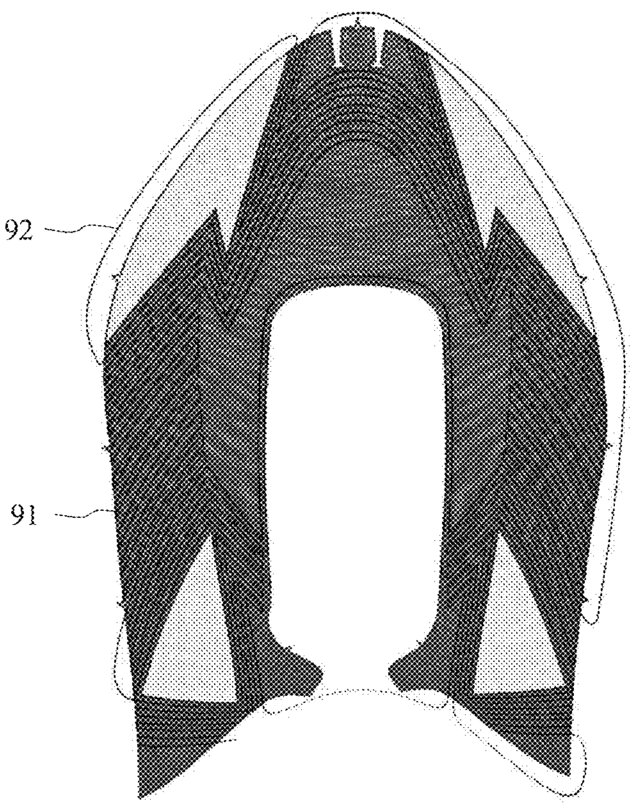
FIG. 14 shows a schematic structural diagram of a cross-sectional layer of a fabric structure according to one embodiment of the present disclosure.

FIG. 14 shows a schematic structural diagram of a cross-sectional layer of a fabric structure according to one embodiment of the present disclosure. As shown in FIG. 14, two endpoints of at least two adjacent first woven filaments located in the same cross-sectional layer are connected by a second woven filament 92 located on and/or outside a contour of the cross-sectional layer.

In an embodiment, in each cross-sectional layer, second woven filaments connect endpoints of at least two adjacent first woven filaments along the contour of the cross-sectional layer. In another embodiment, in order to avoid the influence of second woven filaments on structures of cross-sectional layers, in each cross-sectional layer, second woven filament may also connect endpoints of at least two adjacent first woven filaments outside the contour of the cross-sectional layer. In yet another embodiment as shown in FIG. 14, in each cross-sectional layer, there exist second woven filaments connecting endpoints of at least two adjacent first woven filaments along the contour of the cross-sectional layer, as well as second woven filaments connecting endpoints of at least two adjacent first woven filaments outside the contour of the cross-sectional layer.

In one embodiment, second woven filaments located outside the contour of the respective cross-sectional layer may be trimmed off by means of post-processing. For example, second woven filaments located outside the contour of the respective cross-section layer can be trimmed off uniformly after the 3D printing is completed. Thus, in the present disclosure, second woven filaments outside the contour of the cross-sectional layer are not necessarily present in the printed fabric structure, and can be either retained or removed according to specific needs.

The fabric structure in the present disclosure, due to the special printing process, can have subtle structural changes in different areas of the fabric structure, achieving texture patterns and texture density variations, therefore, it has a higher degree of design freedom in structures and functions, and is able to meet more personalized needs.

The present disclosure also provides a non-transitory computer readable and writeable storage medium storing a computer program, the computer program when executed implements at least one embodiment of a method for generating 3D printing data, or a method for generating a 3D printing model, or a method for planning a 3D printing path, or a 3D printing method, as described above, as shown in any one of FIGS. 1 to 14.

The described functions may be stored in the computer readable storage medium if implemented as software functional units and sold or used as standalone products. It is understood that the technical solution of the present disclosure, or the part of the technical solution that improves upon the prior art, may be embodied in the form of a software product that is stored in a storage medium and includes a number of instructions to cause a computer (which may be a personal computer, a server, or a network device, etc.) to perform all or some of the steps of a method described in various embodiments of the present disclosure.

In the embodiments provided herein, the computer readable and writeable storage medium may include read-only memory, random access memory, EEPROM, CD-ROM or other optical disk storage device, disk storage device or other magnetic storage device, flash memory, USB flash disk, removable hard disk, or any other medium capable of storing desired program code in the form of instructions or data structures and capable of being accessed by a computer. Alternatively, any connection may be appropriately referred to as a computer readable medium. For example, if instructions are sent from a website, server, or other remote source using coaxial cable, fiber optic cable, twisted pair, digital subscriber line (DSL), or wireless technology such as infrared, radio, and microwave, the coaxial cable, fiber optic cable, twisted pair, DSL, or wireless technology such as infrared, radio, and microwave are included in the definition of the medium. However, it should be understood that computer readable and writeable storage medium and data storage medium do not include connections, carrier wave, signals, or other transient media, but are intended for non-transient, tangible storage medium. As used in the present disclosure, disks and optical discs include compressed compact discs (CDs), laser discs, optical disks, digital versatile discs (DVDs), floppy disks, and Blu-ray discs, wherein data in disks are typically replicated magnetically, and data in optical discs are replicate optically with lasers.

In one or more exemplary aspects, the functions described by computer programs of methods described in the present disclosure may be implemented in hardware, software, firmware, or any combination thereof. When implemented in software, the functions may be stored or transferred to a computer readable medium as one or more instructions or codes. The steps of a method or algorithm disclosed herein may be embodied in a processor-executable software module, wherein the processor-executable software module may be located on a tangible, non-transitory computer readable storage medium. The tangible, non-transitory computer-readable storage medium may be any available medium to which a computer has access.

The flowcharts and block diagrams in the accompanying drawings described above illustrate possible implementations of the architecture, functionality, and operation of systems, methods, and computer program products in accordance with various embodiments of the present disclosure. Based thereon, each box in a flowchart or block diagram may represent a module, program segment, or portion of code that contains one or more executable instructions for implementing a specified logical function. It should also be noted that in some implementations as replacements, the functions indicated in the boxes may also occur in a different order than that indicated in the accompanying drawings. For example, two boxes represented one after the other can actually be executed in substantially parallel, and they can sometimes be executed in the opposite order, depending on the specific function involved. Note also that each box in a block diagram and/or flowchart, and the combination of boxes in a block diagram and/or flowchart, may be implemented by a dedicated hardware-based system that performs the specified function or operation, or may be implemented by a combination of dedicated hardware and computer instructions.

The above-mentioned embodiments are merely illustrative of the principle and effects of the present disclosure instead of limiting the present disclosure. Modifications or variations of the above-described embodiments may be made by those skilled in the art without departing from the spirit and scope of the present disclosure. Therefore, all equivalent modifications or changes made by those who have common knowledge in the art without departing from the spirit and technical concept disclosed by the present disclosure shall be still covered by the claims of the present disclosure.

What is claimed is:

1. A method for generating 3D printing data, comprising:

slicing a model of a to-be-printed object into multiple horizontal layers;

for each of the horizontal layers: projecting the to-be-printed object onto a plane corresponding to said layer to obtain a projected contour of said layer, wherein, the projected contour refers to a projection of a contour of the to-be-printed object;

generating at least two single-layer texture planes, wherein each single-layer texture plane includes at least one texture line;

adjusting spatial positions of the at least two single-layer texture planes so that their projections onto a same plane partially overlap, to obtain a multi-layer texture plane;

generating at least one slice pattern through cutting the texture plane by the projected contour, wherein each slice pattern comprises one or more texture lines, and the one or more texture lines comprise non-closed texture lines whose endpoints are located on the projected contour;

generating the 3D printing data based on spatial positions of printing lines of cross-sectional patterns, with the cross-sectional patterns determined based on the at least one slice pattern, wherein a first cross-sectional pattern is determined based on a first slice pattern of the at least one slice pattern, the first cross-sectional pattern comprises one or more printing lines, and the first slice pattern comprises first texture lines; wherein the printing lines comprise the first texture lines;

generating G-codes based on the 3D printing data; and printing the to-be-printed object layer by layer by a 3D-printer using the G-codes.

2. The method for generating 3D printing data according to claim 1, further comprising:

generating at least two texture patterns, wherein each texture pattern comprises a plurality of straight lines and/or at least one curved line; and adjusting horizontal positions of the at least two texture patterns such that their projections onto a same plane partially overlap, to obtain the single-layer texture plane.

3. The method for generating 3D printing data according to claim 1, wherein the step of generating the 3D printing data based on the spatial positions of the printing lines of the cross-sectional patterns comprises: connecting non-closed texture lines in the first slice pattern by auxiliary path lines outside the projected contour to obtain the first cross-sectional pattern.

4. The method for generating 3D printing data according to claim 1, wherein the step of generating the 3D printing data based on the spatial positions of the printing lines of the cross-sectional patterns comprises: connecting non-closed texture lines in the first slice pattern by auxiliary path lines along the projected contour to obtain the first cross-sectional pattern.

5. The method for generating 3D printing data according to claim 4, wherein the step of connecting the non-closed texture lines in the first slice pattern by the auxiliary path lines along the projected contour to obtain the first cross-sectional pattern comprises:

classifying the first texture lines in the first slice pattern into different groups according to spatial positions of the first texture lines;

connecting endpoints of non-closed texture lines in a first group by auxiliary path lines along the projected contour so that the non-closed texture lines in the first group form a continuous texture line of the first group; and connecting continuous texture lines of different groups by auxiliary path lines so that the continuous texture lines of the different groups form a continuous printing line.

6. The method for generating 3D printing data according to claim 4, wherein the step of connecting the non-closed texture lines in the first slice pattern by the auxiliary path lines along the projected contour to obtain the first cross-sectional pattern comprises:

assigning a serial number to each non-closed texture line of the first slice pattern according to a spatial position of the respective non-closed texture line; and connecting endpoints of non-closed texture lines with adjacent serial numbers by auxiliary path lines along the projected contour so that the non-closed texture lines in the first slice pattern together form a continuous printing line.

7. A non-transitory computer-readable storage medium, wherein at least one program is stored on the storage medium, and when the at least one program is called by a processor, the at least one program executes and realizes a method for generating 3D printing data, wherein the method comprises:

slicing a model of a to-be-printed object into multiple horizontal layers;

for each of the horizontal layers:

projecting the to-be-printed object onto a plane corresponding to said layer to obtain a projected contour of said layer, wherein, the projected contour refers to a projection of a contour of the to-be-printed object;

generating at least two single-layer texture planes, wherein each single-layer texture plane includes at least one texture line;

adjusting spatial positions of the at least two single-layer texture planes so that their projections onto a same plane partially overlap, to obtain a multi-layer texture plane;

generating at least one slice pattern through cutting the texture plane by the projected contour, wherein each slice pattern comprises one or more texture lines, and the one or more texture lines comprise non-closed texture lines whose endpoints are located on the projected contour;

generating the 3D printing data based on spatial positions of printing lines of cross-sectional patterns, with the cross-sectional patterns determined based on the at least one slice pattern, wherein a first cross-sectional pattern is determined based on a first slice pattern of the at least one slice pattern, the first cross-sectional pattern comprises one or more printing lines, and the first slice pattern comprises first texture lines; wherein the printing lines comprise the first texture lines;

generating G-codes based on the 3D printing data; and printing the to-be-printed object layer by layer by a 3D-printer using the G-codes.

8. The non-transitory computer-readable storage medium according to claim 7, wherein the method for generating 3D printing data further comprises:

generating at least two texture patterns, wherein each texture pattern comprises a plurality of straight lines and/or at least one curved line; and adjusting horizontal positions of the at least two texture patterns such that their projections onto a same plane partially overlap, to obtain the single-layer texture plane.

9. The non-transitory computer-readable storage medium according to claim 7, wherein the step of generating the 3D printing data based on the spatial positions of the printing lines of the cross-sectional patterns comprises: connecting non-closed texture lines in the first slice pattern by auxiliary path lines outside the projected contour to obtain the first cross-sectional pattern.

10. The non-transitory computer-readable storage medium according to claim 7, wherein the step of generating the 3D printing data based on the spatial positions of the printing lines of the cross-sectional patterns comprises: connecting non-closed texture lines in the first slice pattern by auxiliary path lines along the projected contour to obtain the first cross-sectional pattern.

11. The non-transitory computer-readable storage medium according to claim 10, wherein the step of connecting the non-closed texture lines in the first slice pattern by the auxiliary path lines along the projected contour to obtain the first cross-sectional pattern comprises:

classifying the first texture lines in the first slice pattern into different groups according to spatial positions of the first texture lines;

connecting endpoints of non-closed texture lines in a first group by auxiliary path lines along the projected contour so that the non-closed texture lines in the first group form a continuous texture line of the first group; and connecting continuous texture lines of different groups by auxiliary path lines so that the continuous texture lines of the different groups form a continuous printing line.

12. The non-transitory computer-readable storage medium according to claim 10, wherein the step of connecting the non-closed texture lines in the first slice pattern by the auxiliary path lines along the projected contour to obtain the first cross-sectional pattern comprises:

assigning a serial number to each non-closed texture line of the first slice pattern according to a spatial position of the respective non-closed texture line; and connecting endpoints of non-closed texture lines with adjacent serial numbers by auxiliary path lines along the projected contour so that the non-closed texture lines in the first slice pattern together form a continuous printing line.

* * * * *